US012062182B2

(12) United States Patent
Yu et al.

(10) Patent No.: US 12,062,182 B2
(45) Date of Patent: Aug. 13, 2024

(54) METHOD AND COMPUTING SYSTEM FOR PERFORMING OR FACILITATING PHYSICAL EDGE DETECTION

(71) Applicant: MUJIN, INC., Tokyo (JP)

(72) Inventors: Jinze Yu, Tokyo (JP); Jose Jeronimo Moreira Rodrigues, Tokyo (JP)

(73) Assignee: MUJIN, INC., Tokyo (JP)

( * ) Notice: Subject to any disclaimer, the term of this patent is extended or adjusted under 35 U.S.C. 154(b) by 570 days.

(21) Appl. No.: 17/331,878

(22) Filed: May 27, 2021

(65) Prior Publication Data

US 2021/0383550 A1    Dec. 9, 2021

Related U.S. Application Data

(60) Provisional application No. 63/034,403, filed on Jun. 4, 2020.

(51) Int. Cl.
*G06T 7/13* (2017.01)
*B25J 19/02* (2006.01)
*G06T 7/12* (2017.01)

(52) U.S. Cl.
CPC ............... *G06T 7/13* (2017.01); *B25J 19/023* (2013.01); *G06T 7/12* (2017.01)

(58) Field of Classification Search
CPC ... G06T 7/13; G06T 7/12; G06T 2207/30252; G06T 7/33; G06T 2207/10028; B25J 19/023; B25J 9/1697
(Continued)

(56) References Cited

U.S. PATENT DOCUMENTS 10,872,418 B2    12/2020   Kano et al.
10,984,228 B2*   4/2021    Huang ................. G06T 7/194
(Continued)

FOREIGN PATENT DOCUMENTS

CN    101344924 A    1/2009
CN    107917920 A    4/2018
(Continued)

OTHER PUBLICATIONS

Japanese Decision to Grant dated Jul. 1, 2022 issued in corresponding JP Application No. 2021-541627.
(Continued)

*Primary Examiner* — Matthew C Bella
*Assistant Examiner* — Pardis Sohraby
(74) *Attorney, Agent, or Firm* — MEDLER FERRO WOODHOUSE & MILLS PLLC

(57) ABSTRACT

A method and computing system for facilitating edge detection are presented. The computing system may include at least one processing circuit configured to receive image information representing a group of objects in a camera field of view, and to identify, from the image information, a
(Continued)

plurality of candidate edges associated with the group of objects. The at least one processing circuit may further determine, when the plurality of candidate edges include a first candidate edge which is formed based on a border between a first image region and a second image region, whether the image information satisfies a defined darkness condition at the first candidate edge. The at least one processing circuit may further select a subset of the plurality of candidate edges to form a selected subset of candidate edges for representing the physical edges of the group of objects.

20 Claims, 37 Drawing Sheets

(58) Field of Classification Search
USPC .......................................................... 382/153
See application file for complete search history.

(56) References Cited

U.S. PATENT DOCUMENTS

| | | | | |
|---|---|---|---|---|
| 2011/0033116 A1* | 2/2011 | Imagawa | ............. | G06V 10/421 382/199 |
| 2011/0206274 A1 | 8/2011 | Tateno et al. | | |
| 2019/0099891 A1 | 4/2019 | Tomioka et al. | | |
| 2019/0259177 A1* | 8/2019 | Hoelscher | ............ | G06V 20/653 |
| 2019/0370974 A1 | 12/2019 | Kobayashi et al. | | |
| 2020/0082202 A1* | 3/2020 | Rzeszutek | .............. | G06V 10/44 |
| 2020/0134830 A1 | 4/2020 | Yu et al. | | |
| 2021/0089808 A1 | 3/2021 | Yu et al. | | |

FOREIGN PATENT DOCUMENTS

| | | | | |
|---|---|---|---|---|
| CN | 110322457 A | * | 10/2019 | ............. G06T 5/002 |
| CN | 110322457 A | | 10/2019 | |
| CN | 111191083 A | | 5/2020 | |
| JP | 62-5480 A | | 1/1987 | |
| JP | 08-118021 A | | 5/1996 | |
| JP | 11-096378 A | | 4/1999 | |
| JP | 2007-298376 A | | 11/2007 | |
| JP | 2009037596 A | | 2/2009 | |
| JP | 2018063238 A | | 4/2018 | |
| JP | 6692107 B1 | | 5/2020 | |
| WO | 2009028489 A1 | | 3/2009 | |
| WO | 2020092433 A1 | | 5/2020 | |

OTHER PUBLICATIONS

Chinese Office Action dated Mar. 18, 2022 in corresponding Chinese Application No. 202111147155.4.

* cited by examiner

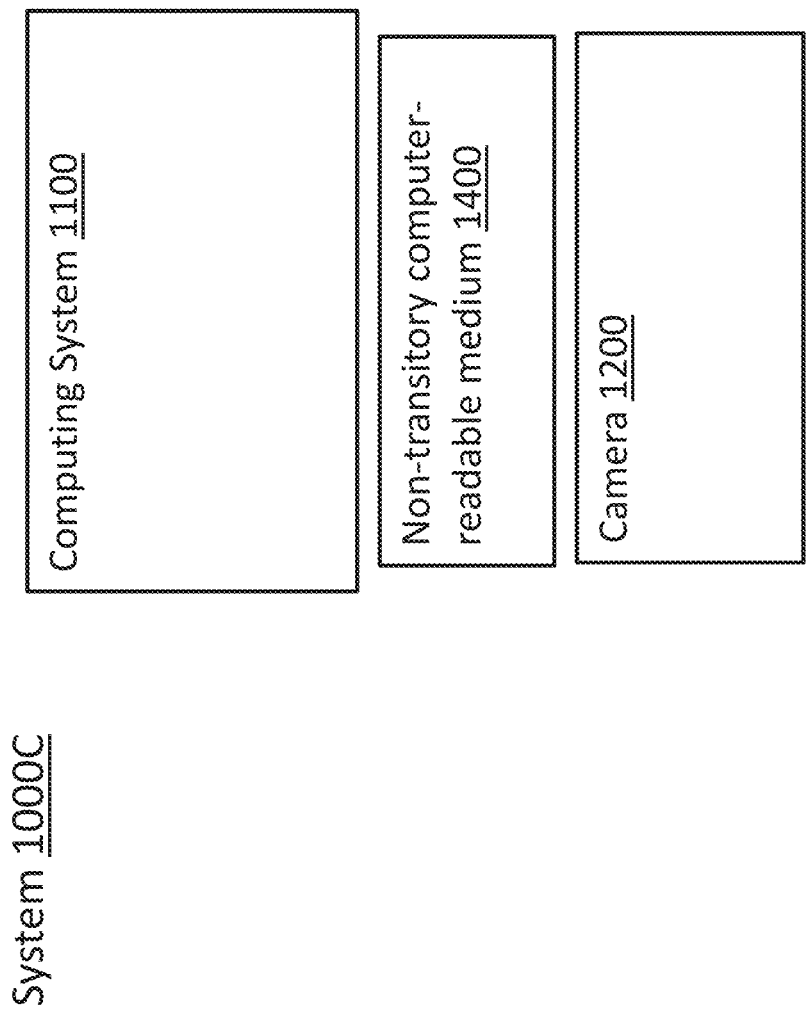

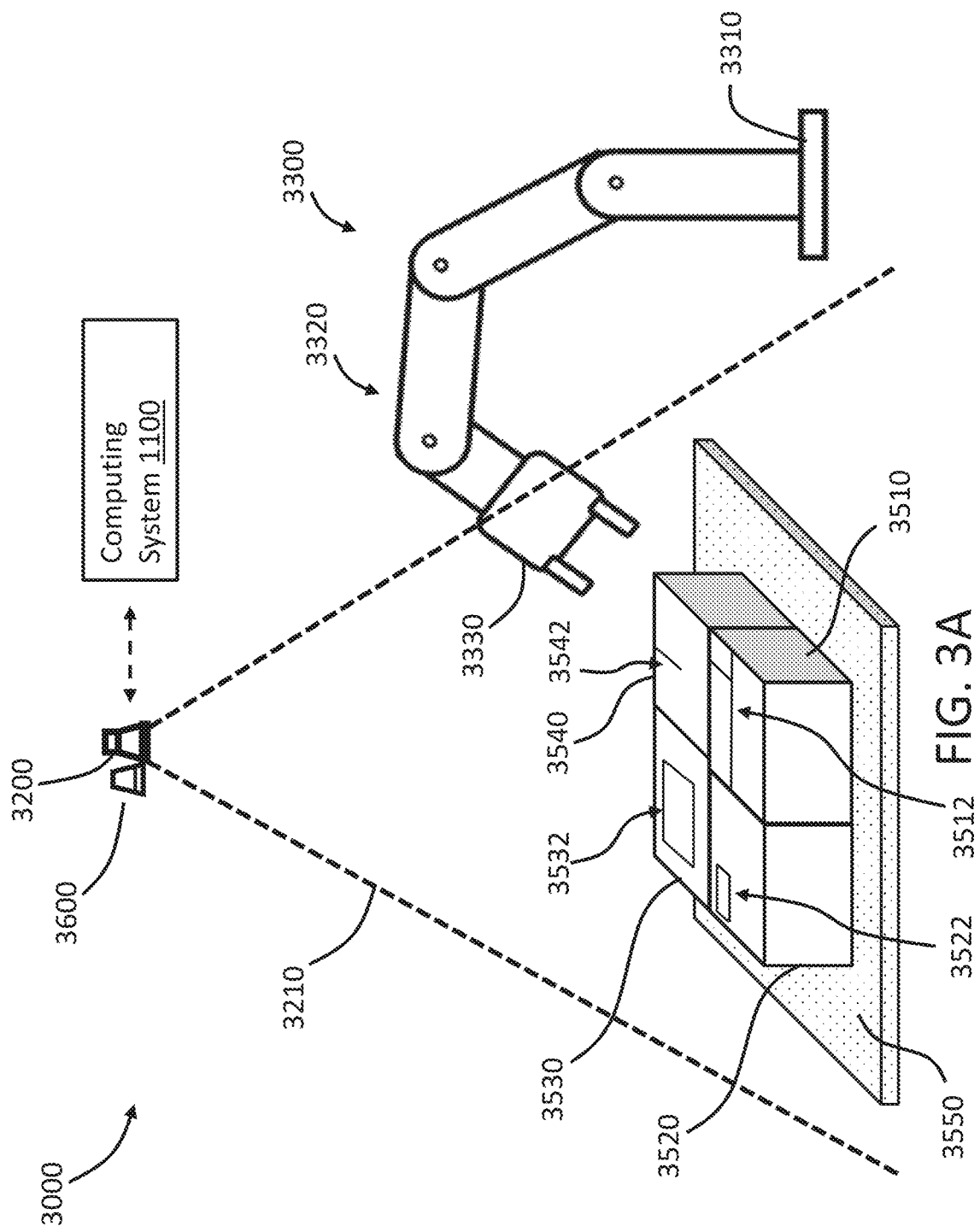

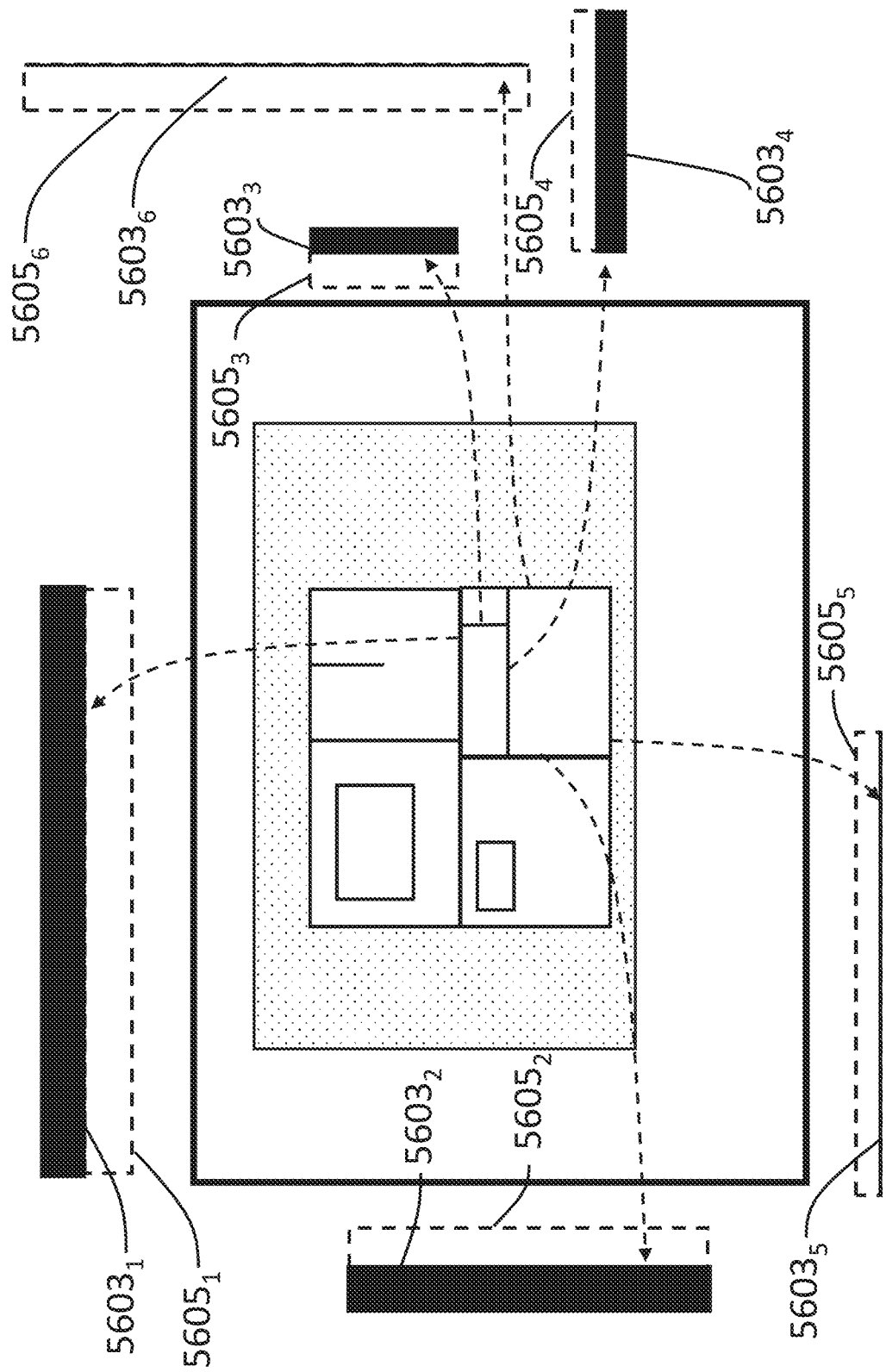

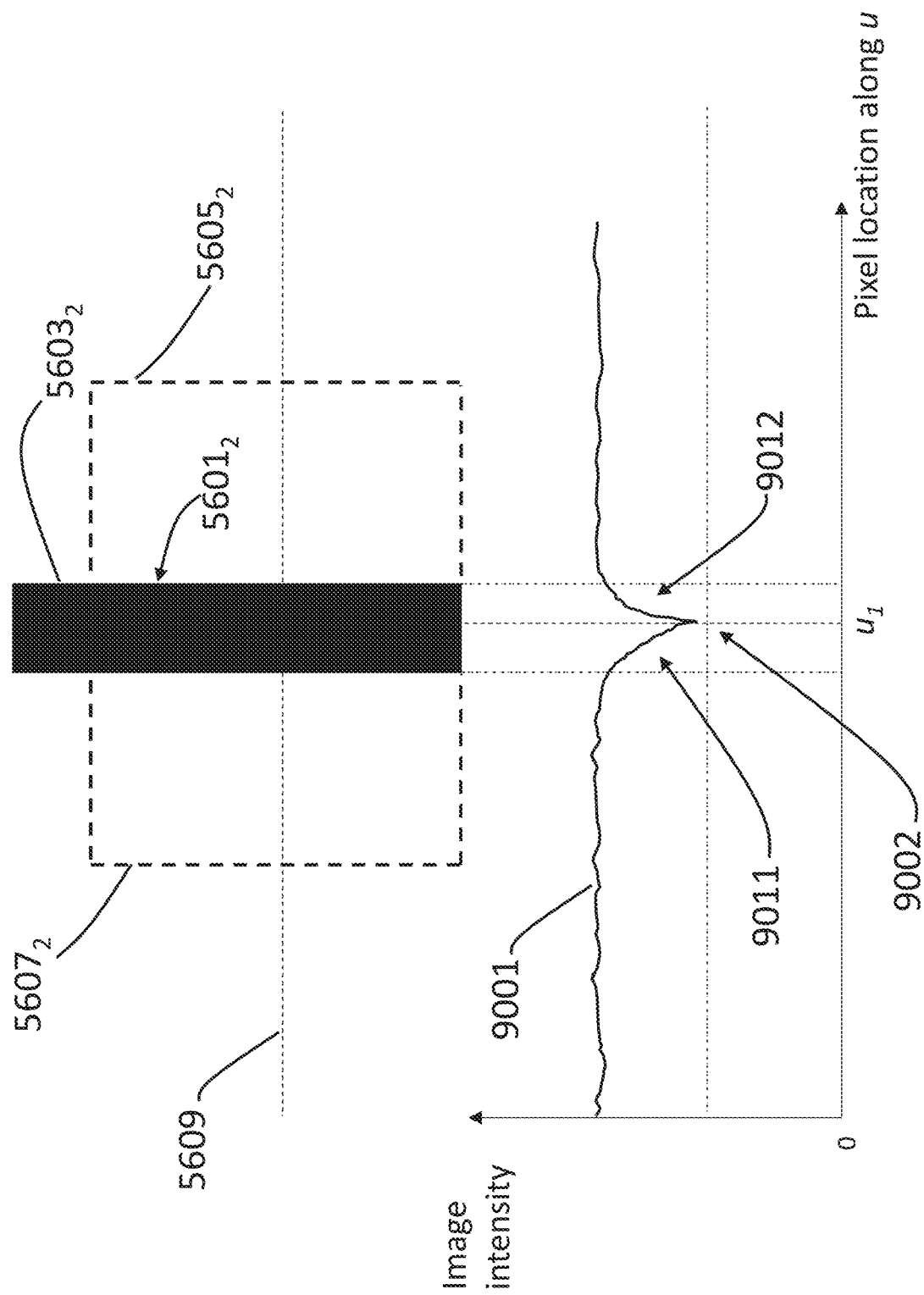

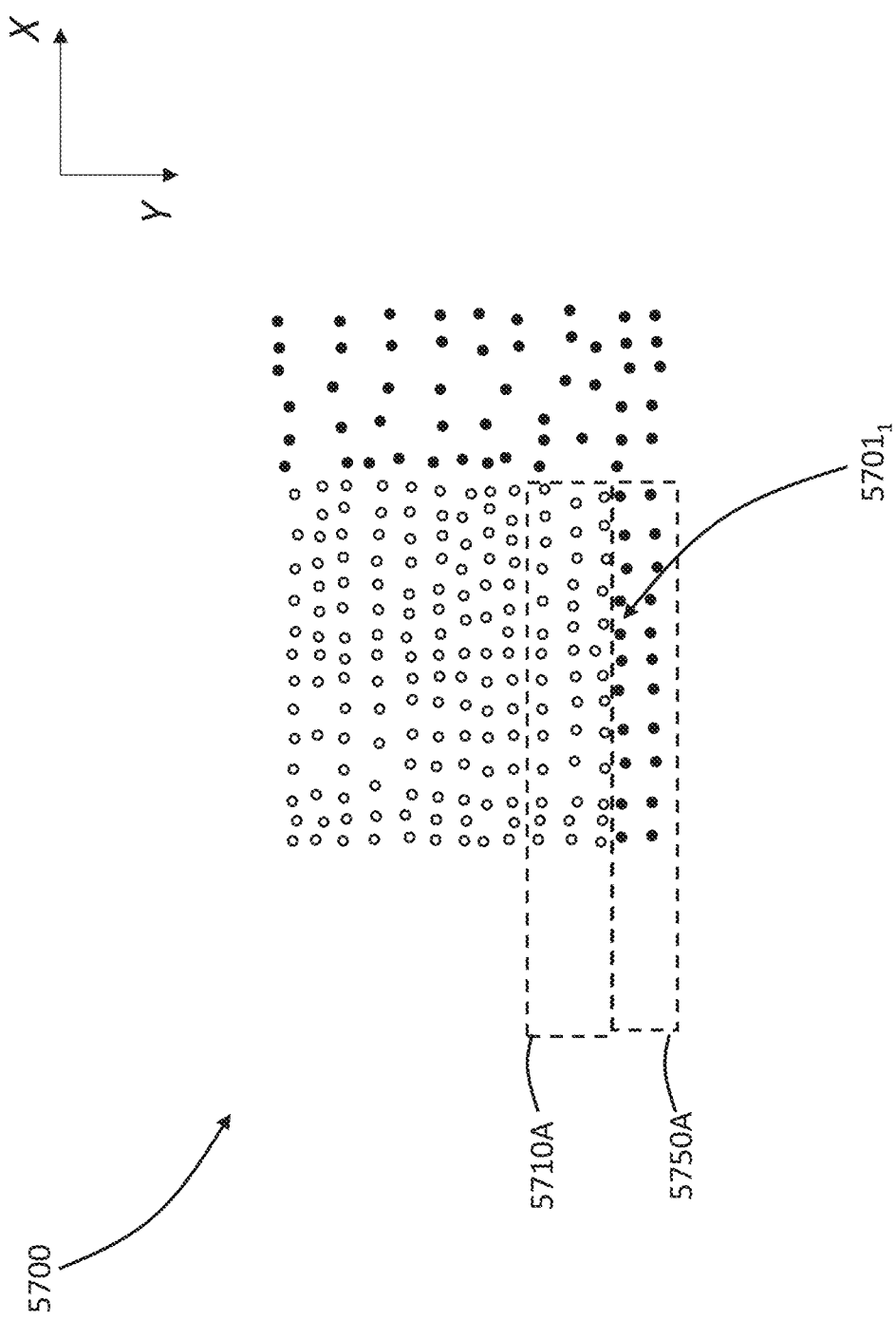

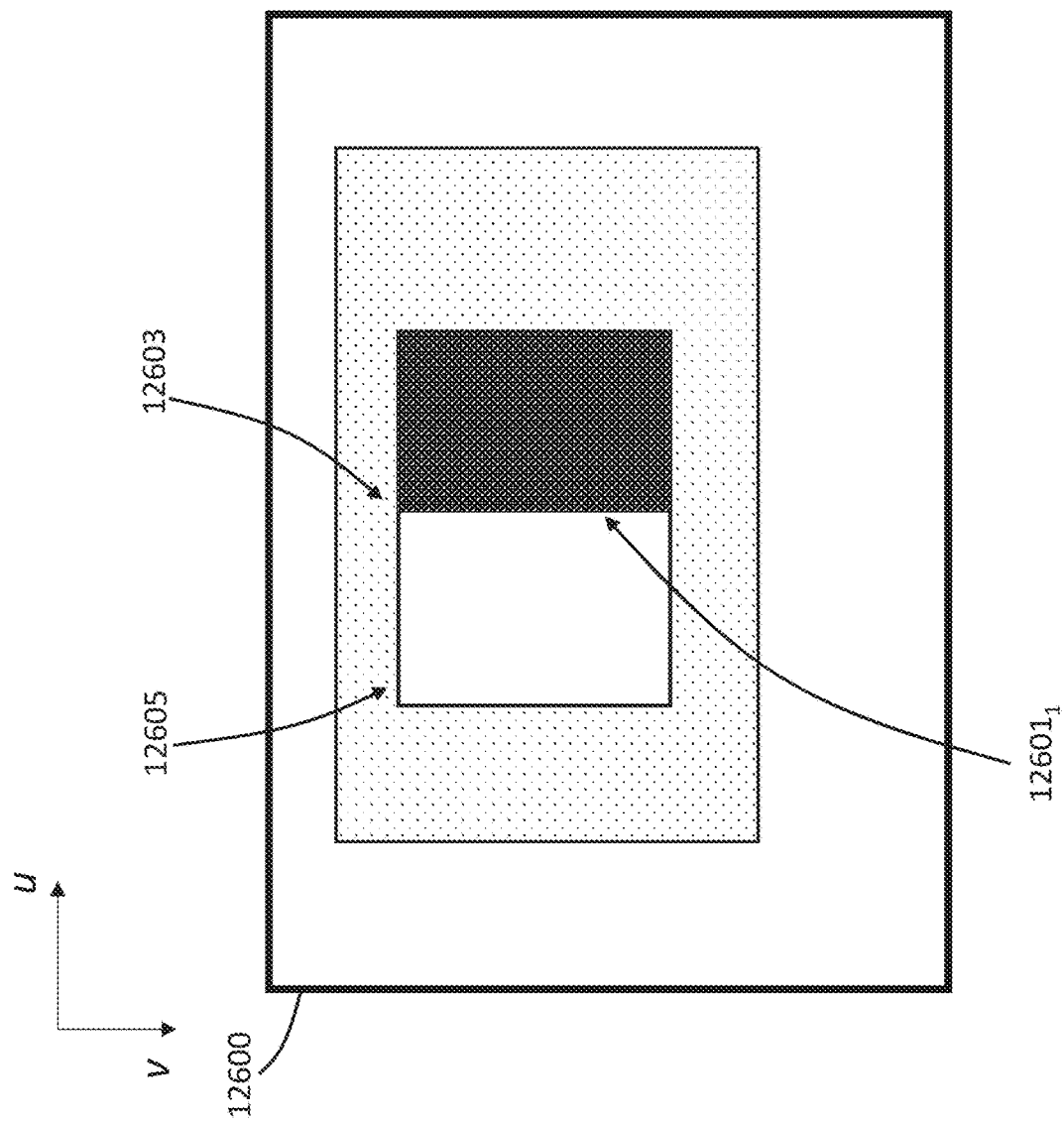

METHOD AND COMPUTING SYSTEM FOR PERFORMING OR FACILITATING PHYSICAL EDGE DETECTION

CROSS-REFERENCE TO RELATED APPLICATION(S)

The present application claims the benefit of U.S. Provisional Appl. No. 63/034,403, entitled "ROBOTIC SYSTEM WITH VISION MECHANISM" and filed Jun. 4, 2020, the entire content of which is incorporated by reference herein.

FIELD OF THE INVENTION

The present disclosure is related to computing systems and methods for performing or facilitating physical edge detection.

BACKGROUND OF THE INVENTION

As automation becomes more common, robots are being used in more environments, such as in warehousing and retail environments. For instance, robots may be used to interact with objects in a warehouse. The movement of the robot may be fixed, or may be based on an input, such as information generated by a sensor in the warehouse.

SUMMARY

One aspect of the present disclosure relates to a computing system or a method performed by the computing system. The computing system may include a communication interface and at least one processing circuit. The communication interface may be configured to communicate with a robot and with a camera having a camera field of view. The at least one processing circuit may be configured, when a group of objects are in the camera field of view, to perform the following: receiving image information representing the group of objects, wherein the image information is generated by the camera; identifying, from the image information, a plurality of candidate edges associated with the group of objects, wherein the plurality of candidate edges are or include respective sets of image locations or physical locations that form respective candidates for representing physical edges of the group of objects; determining, when the plurality of candidate edges include a first candidate edge which is formed based on a border between a first image region and a second image region, whether the image information satisfies a defined darkness condition at the first candidate edge, wherein the first image region is darker than the second image region, wherein the first image region and the second image region are respective regions described by the image information; selecting a subset of the plurality of candidate edges to form a selected subset of candidate edges for representing the physical edges of the group of objects, wherein the selecting includes: determining, based on whether the image information satisfies the defined darkness condition at the first candidate edge, whether to retain the first candidate edge as a candidate for representing at least one of the physical edges of the group of objects by including the first candidate edge in the selected subset of candidate edges.

BRIEF DESCRIPTION OF THE FIGURES

FIGS. 1A-1D illustrate systems for performing or facilitating physical edge detection, consistent with embodiments hereof.

FIGS. 3A-3C illustrate environments in which physical edge detection may be performed, according to embodiments hereof.

FIGS. 7A-7C illustrate candidate edges identified from image information, according to embodiments hereof.

FIGS. 9A-9C illustrate image intensity profiles around a candidate edge, while

FIGS. 11A-11C illustrate depth values of locations around a physical edge, according to an embodiment hereof, while

FIGS. 12A-12C illustrate an image intensity profile for an image that represents an object having an image region darker than an adjacent image region, according to an embodiment hereof.

DETAILED DESCRIPTION OF THE FIGURES

Figure 1A:
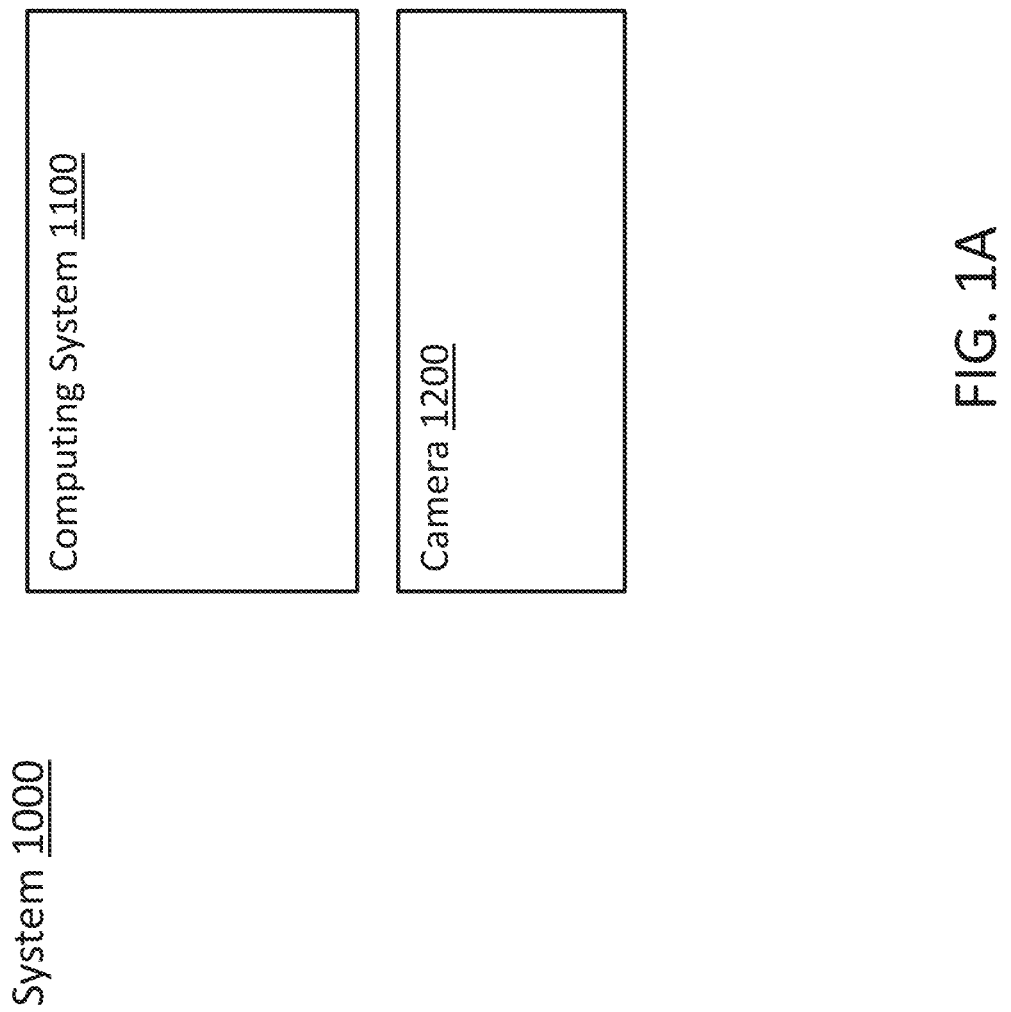

One aspect of the present disclosure relates to using image information that represents a group of objects to detect or otherwise identify physical edges of the group of objects. For instance, the 2D image may represent a group of boxes, and may include candidate edges that potentially represent physical edges of the group of boxes. A computing system may use the candidate edges in the image information to distinguish between the individual objects represented in the image information. In some instances, the computing system may use information identifying the individual boxes to control robot interaction involving the individual boxes. For example, the robot interaction may include a de-palletization operation in which a robot's end effector apparatus approaches one of the objects, picks up the object, and moves the object to a destination location.

In some scenarios, a 2D image or other image information may include a candidate edge which is a false edge, which may be a candidate edge that does not correspond to any actual physical edge of objects in a camera field of view. Thus, one aspect of the present disclosure relates to evaluating a candidate edge to determine a confidence level that the candidate edge corresponds to an actual physical edge, as opposed to being a false edge. In an embodiment, such a determination may be based on an expectation or prediction regarding how certain physical edges will likely appear in an image. More particularly, such a determination may be based on an expectation that if a physical edge is associated with a physical gap between objects (e.g., the physical edge forms one side of the physical gap), such a physical gap may appear very dark in an image, and/or may have an image intensity profile that features a spiked reduction in image intensity in an image region corresponding to the physical gap. Thus, a method or computing system of the present disclosure may operate based on an expectation that a physical gap between objects, especially a narrow physical gap, will likely be represented by an image which has certain characteristics relating to how dark the physical gap may appear in the image. Such characteristics or features of the image may be referred to as a dark prior, and the present disclosure may relate to detecting a dark prior, wherein presence of the dark prior may increase a confidence level regarding whether a candidate edge corresponds to an actual physical edge.

In an embodiment, a method or system of the present disclosure may determine whether an image satisfies a defined darkness condition at a candidate edge, wherein the defined darkness condition may be related to detecting a dark prior. More particularly, the defined darkness condition may be defined by a darkness threshold criterion, and/or a spiked intensity profile criterion, which are discussed below in more detail. In this embodiment, if the computing system or method determines that the image satisfies the defined darkness condition at a candidate edge, there may be a greater confidence level that the candidate edge corresponds to an actual physical edge, such as a physical edge forming one side of a physical gap between two objects. In some instances, if the image does not satisfy the defined darkness condition at a candidate edge, there may be a greater likelihood that the candidate edge is a false edge.

One aspect of the present disclosure relates to using 2D image information to compensate for limitations in 3D image information, and vice versa. For example, if multiple objects, such as two or more boxes, are placed closely next to each other, and are separated by a narrow physical gap, the 3D image information may not have a sufficiently high level of resolution to capture or otherwise represent the physical gap. Thus, the 3D image information may have limitations in its ability to be used for distinguishing among individual objects of the multiple objects, especially if the multiple objects have the same depth relative to a camera that generated the 3D image information. In such an example, the physical gap between the multiple objects may be represented in the 2D image information. More particularly, the physical gap may be represented by an image region which may satisfy the defined darkness condition. A candidate edge associated with such an image region may thus represent, with a high level of confidence, a physical edge of an object. In such a situation, the candidate edge in the 2D image information may be useful in distinguishing among individual objects of a group of objects. Thus, the 2D image information may provide an increased ability to distinguish among the individual objects in certain circumstances.

In certain situations, the 3D image information may compensate for limitations in the 2D image information. For instance, a 2D image may not satisfy a defined darkness condition at a certain candidate edge in the 2D image. In such instances, the candidate edge may have a low confidence level for corresponding to any actual physical edge objects in the camera field of view. The 3D image information may be used to compensate for this limitation in the 2D image information if the candidate edge in the 2D image information corresponds to a candidate edge in the 3D image information. More particularly, the candidate edge in the 2D image information may map to a location or set of locations in the 3D image information at which there is a sharp change in depth. In such a situation, the 3D image information may be used to increase a confidence level by which a candidate edge in the 2D image information corresponds to an actual physical edge.

In an embodiment, the 3D image information may be used to identify a surface (e.g., top surface) of an object, and a candidate edge may be identified based on a location at which there is a transition between two surfaces. For example, the surface may be identified based on a set of locations which have respective depth values in the 3D image information that do not deviate from each other by more than a defined measurement variance threshold. The defined measurement variance threshold may describe an effect of imaging noise, manufacturing tolerance, or other factor which may introduce random fluctuation in depth measurements in the 3D image information. A surface which is identified may be associated with a depth value which is an average of the respective depth values. In some implementations, a candidate edge may be detected in the 3D image information based on identifying a transition in depth, between two surfaces identified in the 3D image information, that is more than a defined depth difference threshold.

FIG. 1A illustrates a system 1000 for performing or facilitating physical edge detection, which may involve using image information that represents one or more objects to detect or otherwise identify physical edges of the one or more objects. More particularly, the system 1000 may include a computing system 1100 and a camera 1200. In this example, the camera 1200 may be configured to generate image information which describes or otherwise represents an environment in which the camera 1200 is located, or more specifically represents an environment in the camera 1200's field of view (also referred to as a camera field of view). The environment may be, e.g., a warehouse, a manufacturing plant, a retail space, or some other premises. In such instances, the image information may represent objects located at such premises, such as boxes, bins, cases, crates, or other containers. The system 1000 may be configured to generate, receive, and/or process the image information, such as by using the image information to distinguish between individual objects in the camera field of view, to perform object recognition or object registration based on the image information, and/or perform robot motion planning based on the image information, as discussed below in more detail (the terms "and/or" and "or" are used interchangeably in this disclosure). The robot motion planning may be used to, e.g., control a robot at the premises to facilitate robot interaction between the robot and the containers or other objects. The computing system 1100 and the camera 1200 may be located at the same premises, or may be located remotely from each other. For instance, the computing system 1100 may be part of a cloud computing platform hosted in a data center which is remote from the warehouse or retail space, and may be communicating with the camera 1200 via a network connection.

Figure 1B:
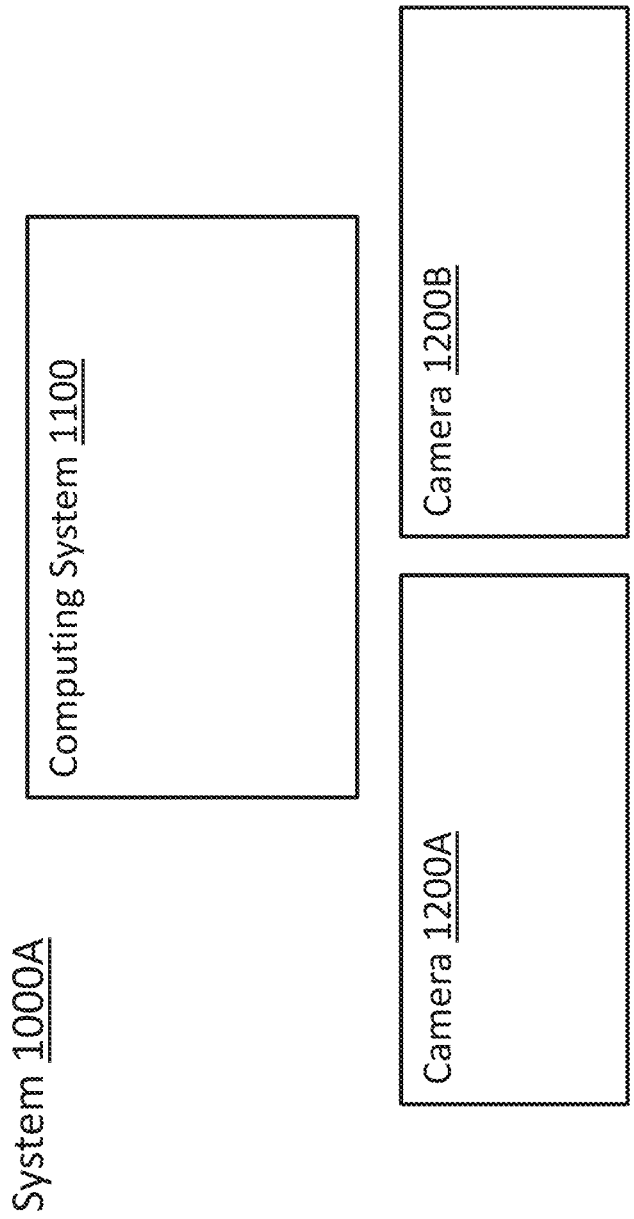

In an embodiment, the camera 1200 (also referred to as an image sensing device) may be a 2D camera and/or a 3D camera. For example, FIG. 1B illustrates a system 1000A (which may be an embodiment of the system 1000) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information (e.g., a depth map) which describes respective depth values of various locations relative to the camera 1200B, such as locations on surfaces of various objects in the camera 1200's field of view. These locations in the camera's field of view or on an object's surface may also be referred to as physical locations. The depth information in this example may be used to estimate how the objects are spatially arranged in three-dimensional (3D) space. In some instances, the spatial structure information may include or may be used to generate a point cloud that describes locations on one or more surfaces of an object in the camera 1200B's field of view. More specifically, the spatial structure information may describe various locations on a structure of the object (also referred to as an object structure).

Figure 1C:
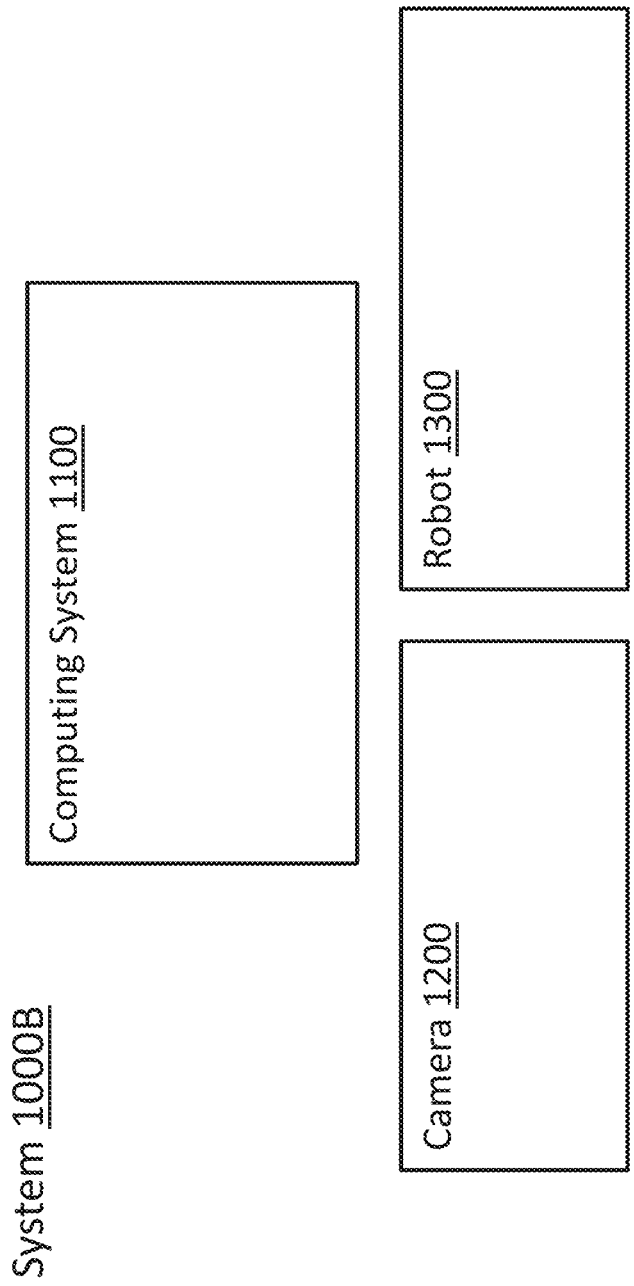

In an embodiment, the system 1000 may be a robot operation system for facilitating robot interaction between a robot and various objects in the environment of the camera 1200. For example, FIG. 1C illustrates a robot operation system 1000B, which may be an embodiment of the system 1000/1000A of FIGS. 1A and 1B. The robot operation system 1000B may include the computing system 1100, the camera 1200, and a robot 1300. As stated above, the robot 1300 may be used to interact with one or more objects in the environment of the camera 1200, such as with boxes, crates, bins, or other containers. For example, the robot 1300 may be configured to pick up the containers from one location and move them to another location. In some cases, the robot 1300 may be used to perform a de-palletization operation in which a group of containers or other objects are unloaded and moved to, e.g., a conveyor belt. In some implementations, the camera 1200 may be attached to the robot 1300, such as to a robot arm of the robot 1300. In some implementations, the camera 1200 may be separate from the robot 1300. For instance, the camera 1200 may be mounted to a ceiling of a warehouse or other structure, and may remain stationary relative to the structure.

In an embodiment, the computing system 1100 of FIGS. 1A-1C may form or be part of a robot control system (also referred to as a robot controller), which is part of the robot operation system 1000B. The robot control system may be a system that is configured to, e.g., generate commands for the robot 1300, such as a robot interaction movement command for controlling robot interaction between the robot 1300 and a container or other object. In such an embodiment, the computing system 1100 may be configured to generate such commands based on, e.g., image information generated by the camera 1200/1200A/1200B. For instance, the computing system 1100 may be configured to determine a motion plan based on the image information, wherein the motion plan may be intended for, e.g., gripping or otherwise picking up an object. The computing system 1100 may generate one or more robot interaction movement commands to execute the motion plan.

In an embodiment, the computing system 1100 may form or be part of a vision system. The vision system may be a system which generates, e.g., vision information which describes an environment in which the robot 1300 is located, or more specifically describes an environment in which the camera 1200 is located. The vision information may include the 3D image information and/or the 2D image information discussed above, or some other image information. In some scenarios, if the computing system 1100 forms a vision system, the vision system may be part of the robot control system discussed above, or may be separate from the robot control system. If the vision system is separate from the robot control system, the vision system may be configured to output information describing the environment in which the robot 1300 is located. The information may be outputted to the robot control system, which may receive such information from the vision system and performs motion planning and/or generates robot interaction movement commands based on the information.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1000C, which may be an embodiment of the system 1000/1000A/1000B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture depth information or other spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

Figure 2A:
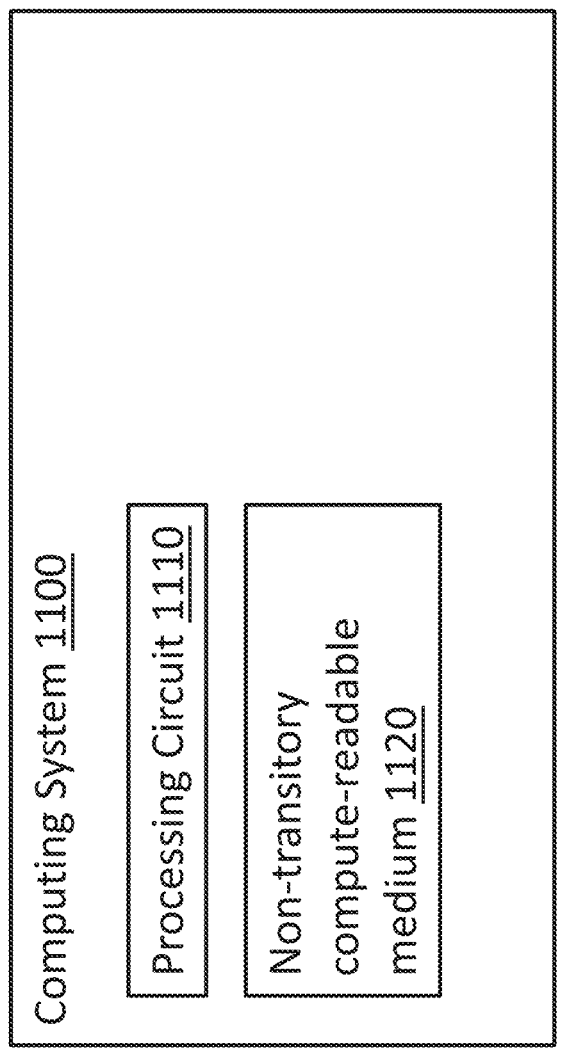
FIGS. 2A-2D provide block diagrams that illustrate a computing system configured to perform or facilitate physical edge detection, consistent with embodiments hereof.

FIG. 2A provides a block diagram that illustrates an embodiment of the computing system 1100. The computing system 1100 includes at least one processing circuit 1110 and a non-transitory computer-readable medium (or media) 1120. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. In some instances, the non-transitory computer-readable medium 1120 may store one or more object recognition templates used for performing an object recognition operation. The non-transitory computer-readable medium 1120 may alternatively or additionally store computer readable program instructions that, when executed by the processing circuit 1110, causes the processing circuit 1110 to perform one or more methodologies described here, such as the operations described with respect to FIG. 4.

Figure 2B:
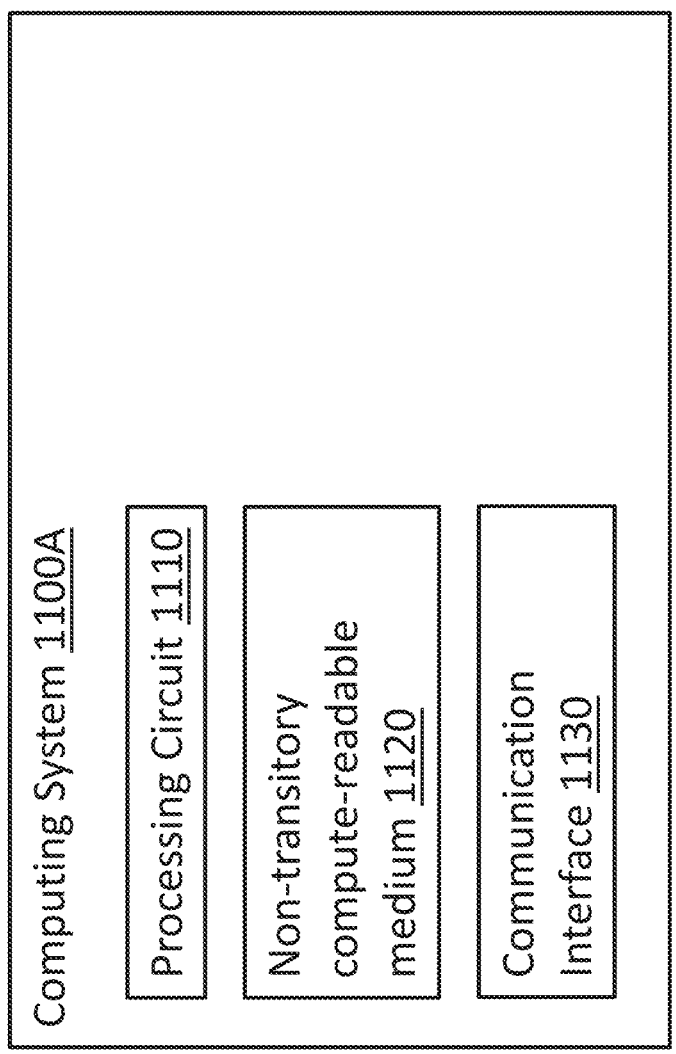

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
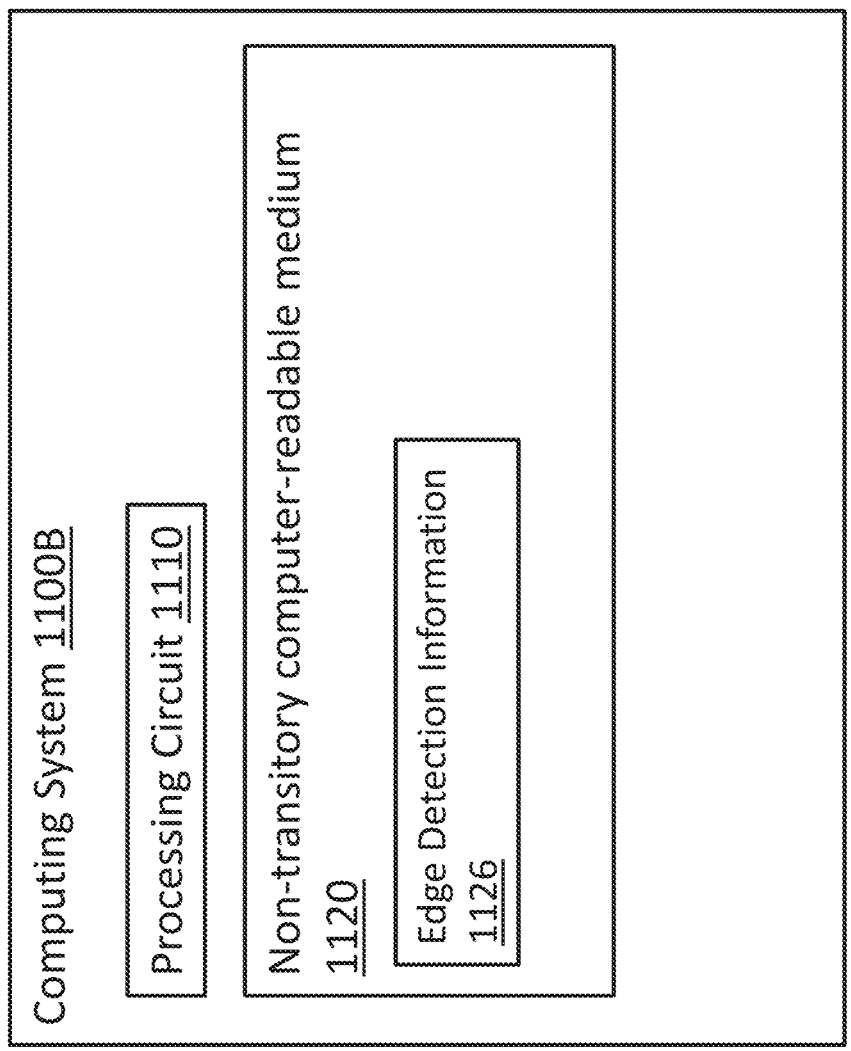

In an embodiment, as depicted in FIG. 2C, the non-transitory computer-readable medium 1120 may store edge detection information 1126, which may describe a plurality of candidate edges identified from the image information generated by the camera 1200. As discussed below in more detail, if the image information represents a group of objects, each of the candidate edges may be or may form a candidate for representing at least one of multiple physical edges of the group of objects. In some instances, the computing system 1100/1100A/11001B may determine whether a particular candidate edge in the edge detection information 1126 should be used to represent at least one of the physical edges of the group of objects. Such a determination may involve evaluating a confidence level associated with whether the candidate edge actually represents a physical edge, as opposed to being a false edge. In one example, such an evaluation may be based on whether the candidate edge is associated with image characteristics that arise from representing a physical edge. Such characteristics may be associated with an image feature referred to as a dark prior, which is discussed below in more detail. In some scenarios, the computing system 1100 may select, from the plurality of candidate edges, a subset of candidate edges which have a sufficiently high confidence level of actually representing physical edges of the group of objects, while the candidate edges which are excluded from the subset may not have a sufficiently high confidence level of actually representing physical edges of the group of objects. Thus, if the computing system 1100/1100A/1100B determines to use a particular candidate edge to represent at least one of the physical edges, the computing system may include the candidate edge in that subset. If the computing system 1100/1100A/1100B determines not to use a particular candidate edge for representing at least one of the physical edges, the computing system may determine not to include the candidate edge in the subset. The candidate edges which are not included in the subset may be filtered out from the edge detection information 1126, or more generally excluded from further consideration as a candidate for representing at least one of the physical edges of the group of objects.

Figure 2D:
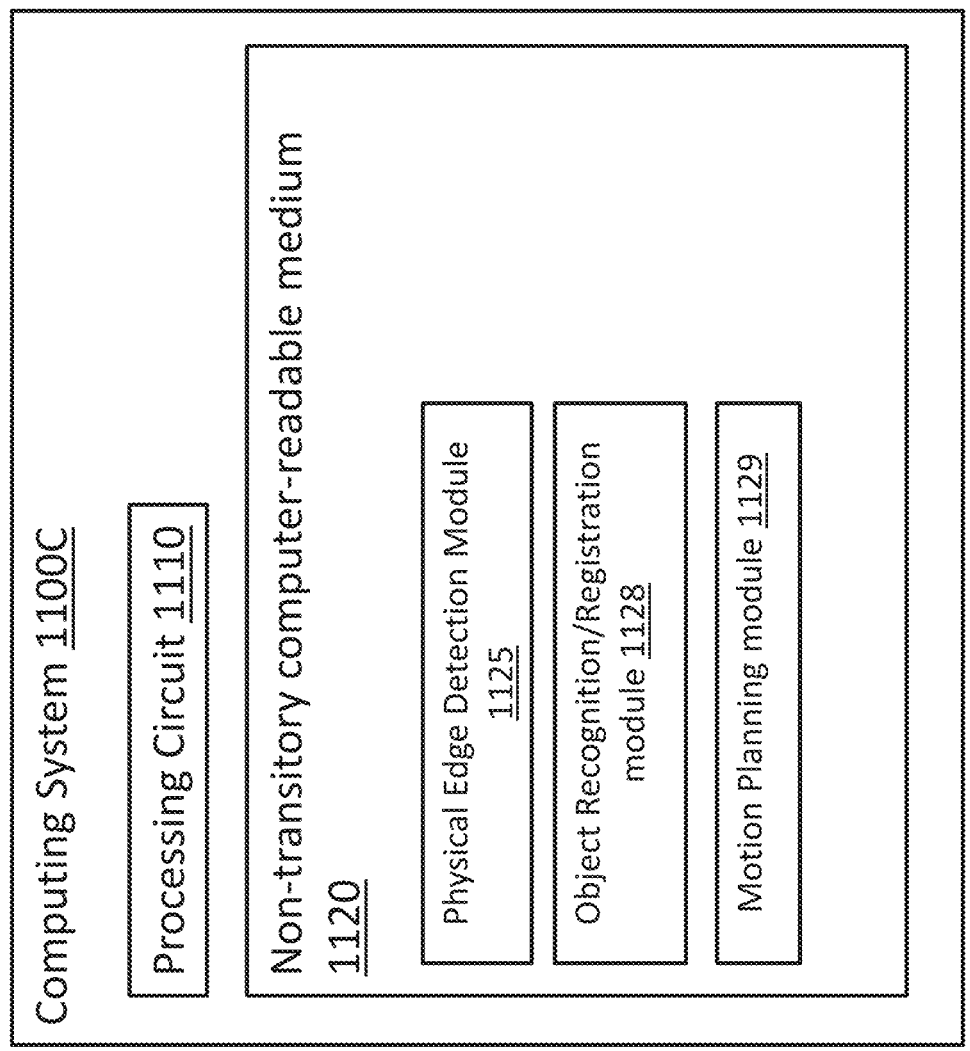

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including a physical edge detection module 1125, an object recognition/registration module 1128, and/or a motion planning module 1129.

In an embodiment, the physical edge detection module 1125 may be configured to determine which candidate edge(s), from among a plurality of candidate edges appearing in image information representing a group of objects, should be used to represent physical edges of the group of objects. In some implementations, the physical edge detection module 1125 may make such a determination based on whether a defined darkness condition is satisfied, and/or whether a depth discontinuity condition is satisfied, as discussed below in more detail. In some instances, the physical edge detection module 1125 may also be also configured to identify the plurality of candidate edges from the image information. In some instances, the physical edge detection module 1125 may be configured to perform image segmentation (e.g., point cloud segmentation), which may involve distinguishing between individual objects represented by the image information. For example, the module 1125 may extract or otherwise identify an image segment (also referred to as image portion) of the image information that represents one object of the group of objects. In some implementations, the image segmentation may be performed based on, e.g., candidate edges which the module 1125 has determined should be used to represent physical edges of the group of objects.

In an embodiment, the object recognition/registration module 1128 may be configured to perform an object recognition operation or object registration module based on a result from the physical edge detection module 1125. For instance, if the physical edge detection module 1125 identifies an image segment that represents one object of the group of objects, the object recognition/registration module 1128 may be configured to, e.g., determine whether the image segment sufficiently matches an object recognition template, and/or generate a new object recognition template based on the image segment.

In an embodiment, the motion planning module 1129 may be configured to perform robot motion planning based on a result of the physical edge detection module 1125 and/or based on a result of the object recognition/registration module 1128. As stated above, the robot motion planning may be for robot interaction between a robot (e.g., 1300) and at least one object of the group of objects. In some instances, the robot motion planning may involve, e.g., determining movements by a component of the robot (e.g., end effector apparatus) for picking up an object, and/or a trajectory for the component to follow after picking up the object.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

Figure 3B:
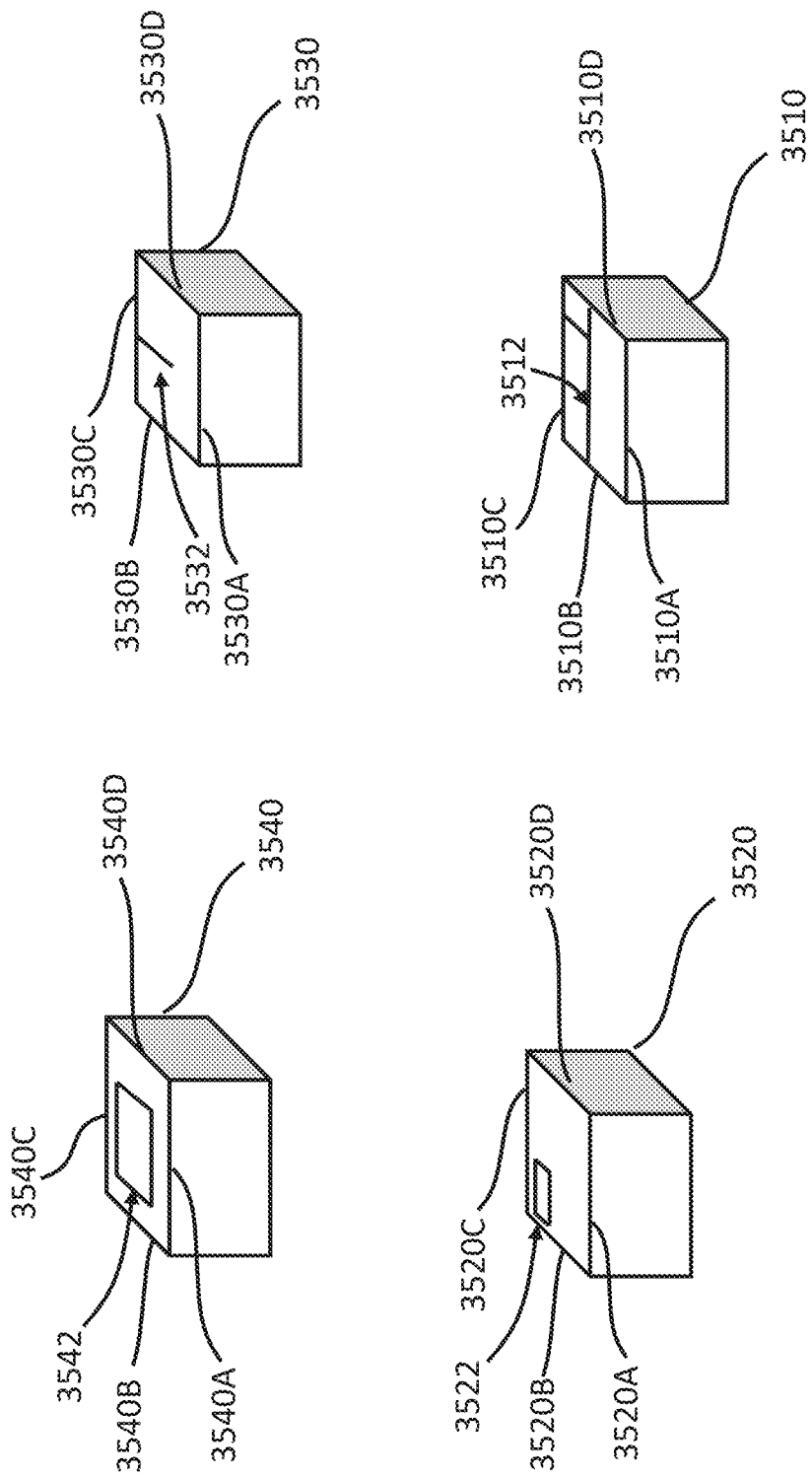
Figure 3C:
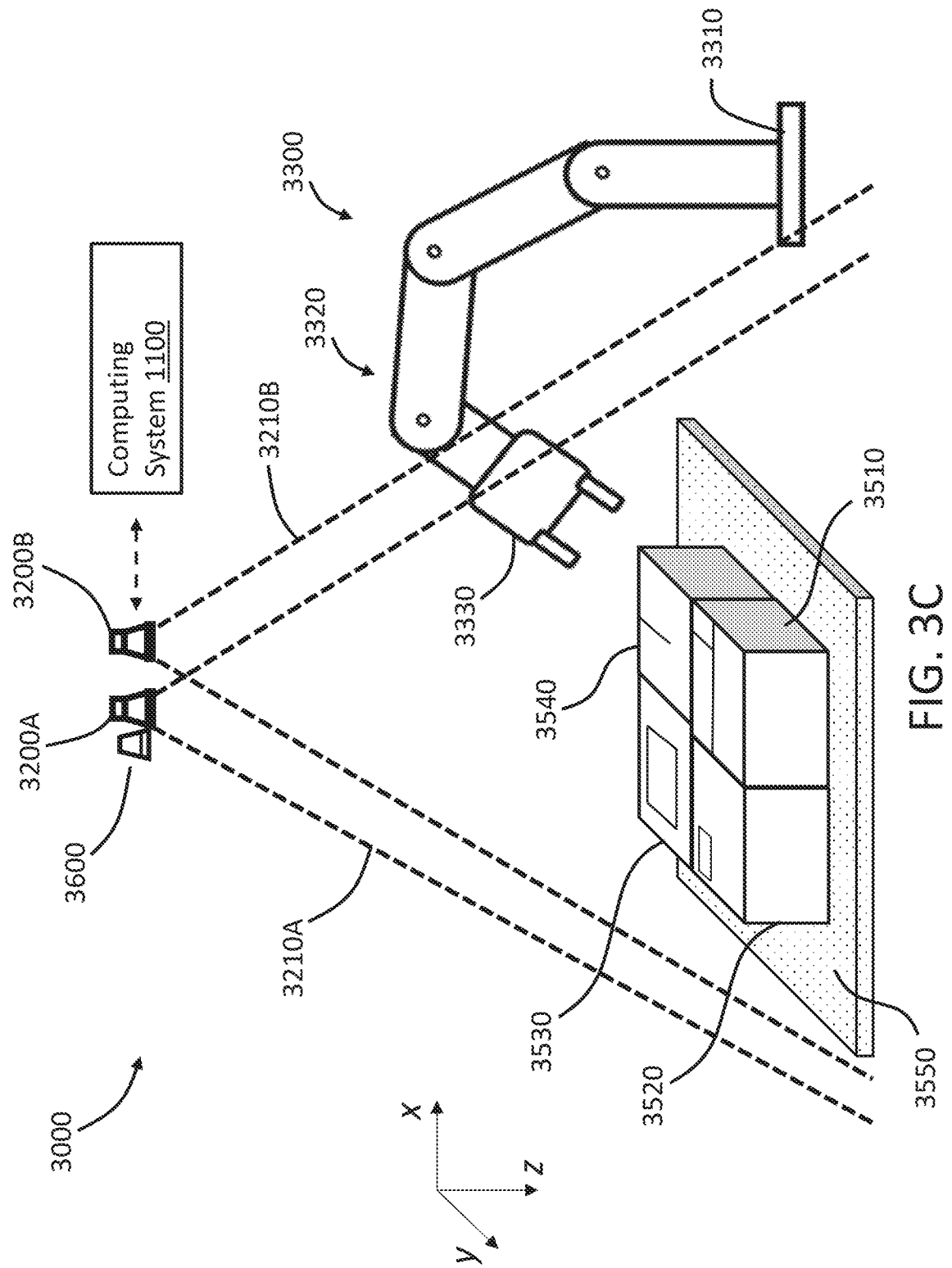

FIGS. 3A-3C illustrate an example environment in which processing of candidate edges, or more specifically physical edge detection, may be performed. More particularly, FIG. 3A depicts an environment having a system 3000 (which may be an embodiment of the system 1000/1000A/1000B/1000C of FIGS. 1A-1D) that includes the computing system 1100, a robot 3300, and a camera 3200. The camera 3200 may be an embodiment of the camera 1200, and may be configured to generate image information which represents a scene in a camera field of view 3210 of the camera 3200, or more specifically represents objects in the camera field of view 3210, such as objects 3510, 3520, 3530, 3540, and 3550. In one example, each of the objects 3510-3540 may be, e.g., a container such as a box or crate, while the object 3550 may be, e.g., a pallet on which the containers are disposed.

The objects 3510-3540 are also depicted in FIG. 3B, which more specifically shows physical edges of the objects. More particularly, the figure illustrates physical edges 3510A-3510D of a top surface of the object 3510, physical edges 3520A-3520D of a top surface of the object 3520, physical edges 3530A-3530D of a top surface of the object 3530, and physical edges 3540A-3540D of a top surface of the object 3540. The physical edges in FIG. 3B (e.g., 3510A-3510D, 3520A-3520D, 3530A-3530D, and 3540A-3540D) may be outer edges of the respective top surfaces of the objects 3510-3540. In some instances, the physical edges (e.g., 3510A-3510D) of a surface of an object may define a contour of the surface. If the object forms a polyhedron (e.g., a cube) having multiple non-coplanar surfaces (also referred to as multiple faces), a physical edge of one surface may form a border at which the surface meets another surface of the object.

In an embodiment, an object in a camera field of view may have visual detail (also referred to as visible detail), such as visual markings, on an outer surface of the object. For example, as illustrated in FIGS. 3A and 3B, the objects 3510, 3520, 3530, 3540 may have visual markings 3512, 3522, 3532, 3542, respectively, printed or otherwise disposed on respective outer surfaces (e.g., top surfaces) of the objects 3510-3540. As an example, a visual marking may include a visible line (e.g., straight line or curved line), a visible shape such as a polygon, a visual pattern, or other visual marking. In some scenarios, a visual marking (e.g., a visible line) may form or be part of a symbol or drawing that appears on an outer surface of an object. The symbol may include, e.g., a logo or written character (e.g., alphanumeric character). In some scenarios, the visual detail on an outer surface of a container or other object may be formed by a contour of a layer of material (e.g., a strip of packing tape or a sheet of mailing label) that is disposed on the outer surface of the container.

In an embodiment, the system 3000 of FIG. 3A may include one or more light sources, such as light source 3600. The light source 3600 may be, e.g., a light emitting diode (LED), a halogen lamp, or any other light source, and may be configured to emit visible light, infrared radiation, or any other form of light toward surfaces of the objects 3510-3550. In some implementations, the computing system 1100 may be configured to communicate with the light source 3600 to control when the light source 3600 is activated. In other implementations, the light source 3600 may operate independently of the computing system 1100.

In an embodiment, as illustrated in FIG. 3C, the system 3000 may include multiple cameras, including a camera 3200A (which may be an embodiment of the camera 1200A) having a camera field of view 3210A, and including a camera 3200B (which may be an embodiment of the camera 1200B) having a camera field of view 3210B. The camera 3200A may be, e.g., a 2D camera that is configured to generate a 2D image or other 2D image information, while the camera 3200B may be, e.g., a 3D camera that is configured to generate 3D image information. The 2D image (e.g., a color image or a grayscale image) may describe an appearance of one or more objects, such as the objects 3510-3550, in the camera field of view 3210/3210A. For instance, the 2D image may capture or otherwise represent visual detail, such as the visual markings 3512-3542 disposed on respective outer surfaces (e.g., top surfaces) of the objects 3510-3540, and/or contours of those outer surfaces. In an embodiment, the 3D image information may describe a structure of one or more of the objects 3510-3550, wherein the structure for an object may also be referred to as an object structure or physical structure for the object. For example, the 3D image information may include a depth map, or more generally include depth information, which may describe respective depth values of various locations in the camera field of view 3210/3210B relative to the camera 3200B or relative to some other reference point. The locations corresponding to the respective depth values may be locations (also referred to as physical locations) on various surfaces in the camera field of view 3210/3210B, such as locations on respective top surfaces of the objects 3510-3550. In some instances, the 3D image information may include a point cloud, which may include a plurality of 3D coordinates that describe various locations on one or more outer surfaces of the objects 3510-3550, or of some other objects in the camera field of view 3210/3210B.

In the example of FIGS. 3A and 3B, the robot 3300 (which may be an embodiment of the robot 1300) may include a robot arm 3320 having one end attached to a robot base 3310, and having another end that is attached to or is formed by an end effector apparatus 3330, such as a robot gripper. The robot base 3310 may be used for mounting the robot arm 3320, while the robot arm 3320, or more specifically the end effector apparatus 3330, may be used to interact with one or more objects (e.g., 3510/3520/3530/3540) in an environment of the robot 3300. The interaction (also referred to as robot interaction) may include, e.g., gripping or otherwise picking up at least one of the objects 3510-3540. For example, the robot interaction may be part of a de-palletization operation in which the robot 3300 is used to pick up the objects 3510-3540 (e.g., boxes) from the object 3550 (e.g., pallet or other platform) and move the objects 3510-3540 to a destination location.

Figure 4:
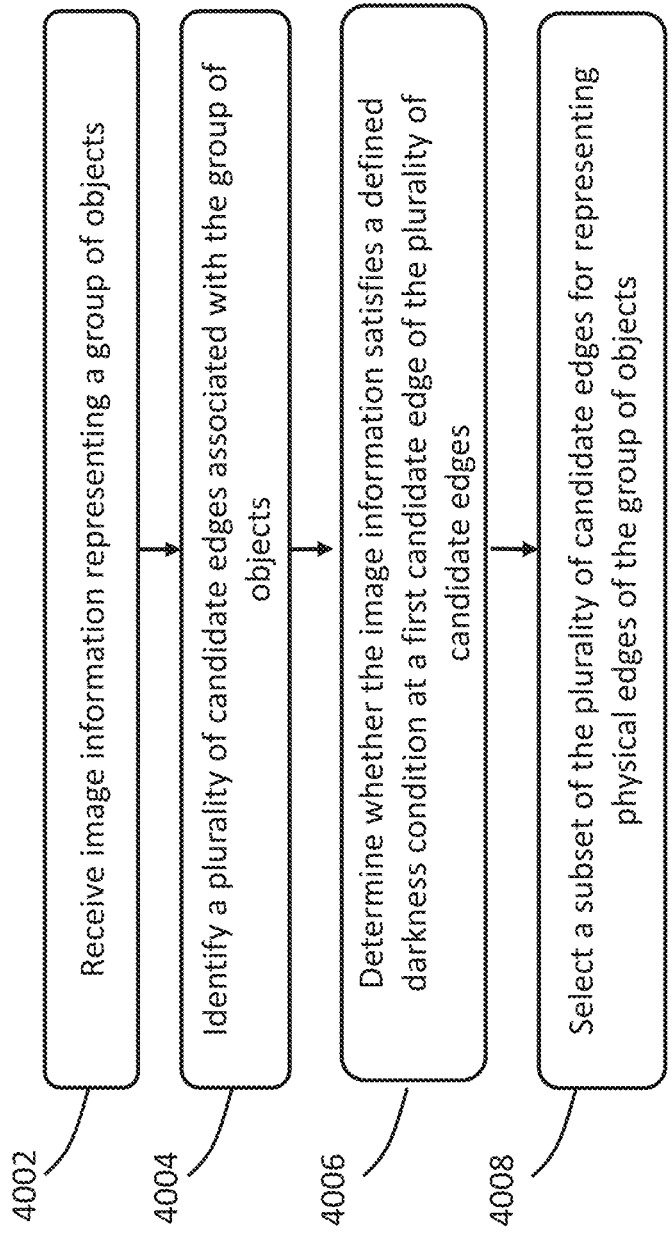
FIG. 4 provides a flow diagram that illustrates a method of processing a candidate edge, according to an embodiment hereof.

As discussed above, one aspect of the present disclosure relates to performing or facilitating detection of one or more physical edges of a group of objects, such as a group of boxes, based on image information that represents the one or more objects. FIG. 4 depicts a flow diagram for an example method 4000 for performing or facilitating physical edge detection, or more specifically for determining whether a candidate edge should be used to represent at least one of the physical edges of a group of objects. More specifically, the method may involve receiving image information which has a candidate edge that could be representing a physical edge, or could be a false edge. The false edge may be a candidate edge which represents, e.g., a visible line or other visual marking appearing on a surface of one of the group of objects. The visual marking may have an appearance that resembles a physical edge, but does not actually correspond to any physical edge. Thus, the method 4000 may in an embodiment be used to evaluate a confidence level or likelihood for whether a candidate edge corresponds to an actual physical edge, or whether the candidate edge is likely a false edge. If the candidate edge is likely a false edge, and/or does not have a sufficiently high confidence level of corresponding to an actual physical edge, the method 4000 may in an embodiment filter out or more generally exclude the candidate edge from further consideration for representing any physical edge of the group of objects.

In embodiment, the method 4000 may be performed by, e.g., the computing system 1100 of FIGS. 2A-2D or of FIG. 3A or 3C, or more specifically by the at least one processing circuit 1110 of the computing system 1100. In some scenarios, the at least one processing circuit 1100 may perform the method 4000 by executing instructions stored on a non-transitory computer-readable medium (e.g., 1120). For instance, the instructions may cause the processing circuit 1110 to execute one or more of the modules illustrated in FIG. 2D, which may perform method 4000. As an example, one or more of steps 4002-4008 discussed below may be performed by the physical edge detection module 1125. If the method 4000 includes a step of performing object recognition and/or object registration, the step may be performed by, e.g., the object recognition/registration module 1128. If the method 4000 involves planning robot interaction or generating a robot interaction movement command, such a step may be performed by, e.g., the motion planning module 1129. In an embodiment, the method 4000 may be performed in an environment in which the computing system 1100 is in communication with a robot and a camera, such as the robot 3300 and the camera 3200/3200A/3200B in FIGS. 3A and 3C, or with any other camera or robot discussed in this disclosure. In some scenarios, such as that illustrated in FIGS. 3A and 3C, the camera (e.g., 3200) may be mounted to a stationary structure (e.g., a ceiling of a room). In other scenarios, the camera may be mounted on the robot arm (e.g., 3320), or more specifically on an end effector apparatus (e.g., 3330) of the robot (e.g., 3300).

In an embodiment, one or more steps of the method 4000 may be performed when a group of objects (e.g., 3510-3550) are currently in a camera field of view (e.g., 3210/3210A/3210B) of the camera (e.g., 3200/3200A/3200B). For instance, one or more steps of the method 4000 may be performed immediately after the group of objects are in the camera field of view (e.g., 3210/3210A/3210B) or, more generally, while the group of objects are in the camera field of view. In some scenarios, the one or more steps of the method 4000 may be performed when the group of objects have been in the camera field of view. For example, when the group of objects are in the camera field of view (e.g., 3210/3210A/3210B), the camera (e.g., 3200/3200A/3200B) may generate image information representing the group of objects, and may communicate the image information to the computing system (e.g., 1100). The computing system may perform one or more steps of the method 4000 based on the image information, while the group of objects are still in the camera field of view, or even when some or all of the group of objects are no longer in the camera field of view.

Figure 5A:
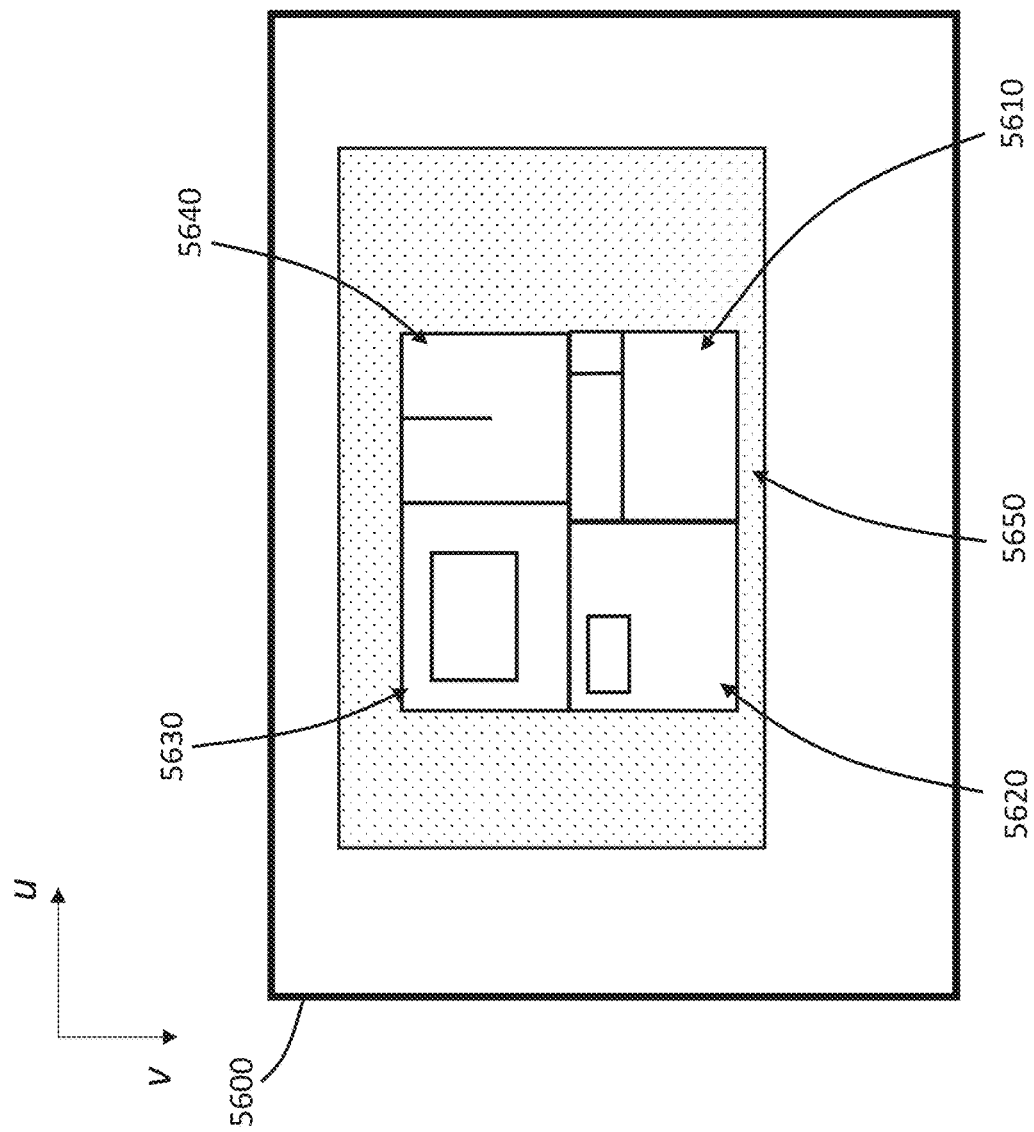
FIGS. 5A and 5B illustrate example image information from which candidate edges may be identified, according to an embodiment hereof.

In an embodiment, the method 4000 may begin with or otherwise include a step 4002, in which the computing system 1100 receives image information representing a group of objects in a camera field of view (e.g., 3210/3210A/3210B) of a camera (e.g., 3200/3200A/3200B). The image information may be generated by the camera (e.g., 3200/3200A/3200B) when the group of objects is (or has been) in the camera field of view, and may include, e.g., 2D image information and/or 3D image information. For instance, FIG. 5A depicts 2D image information, or more specifically a 2D image 5600, which is generated by the camera 3200/3200A and which represents the objects 3510-3550 of FIGS. 3A-3C. More specifically, the 2D image 5600 (e.g., grayscale or color image) may describe an appearance of the objects 3510-3550 from a viewpoint of the camera 3200/3200A. In an embodiment, the 2D image 5600 may correspond to a single color channel (e.g., red, green, or blue color channel) of a color image. If the camera 3200/3200A is disposed above the objects 3510-3550, then the 2D image 5600 may represent an appearance of respective top surfaces of the objects 3510-3550. In the example of FIG. 5A, the 2D image 5600 may include respective portions 5610, 5620, 5630, 5640, and 5650 (also referred to as image portions) that represent respective surfaces (e.g., top surfaces) of the objects 3510-3550. In FIG. 5A, each image portion of the image portions 5610-5650 of the 2D image 5600 may be an image region, or more specifically a pixel region (if the image is formed by pixels). More particularly, an image region may be a region of an image, while a pixel region may be a region of pixels. One or more of the image portions 5610-5550 may capture or otherwise represent visual markings or other visual detail which are visible or appear on the objects' surfaces. For example, the image portion 5610 may represent visual markings 3612 of FIG. 3B, which may be printed or otherwise disposed on a top surface of the object 3610.

Figure 5B:
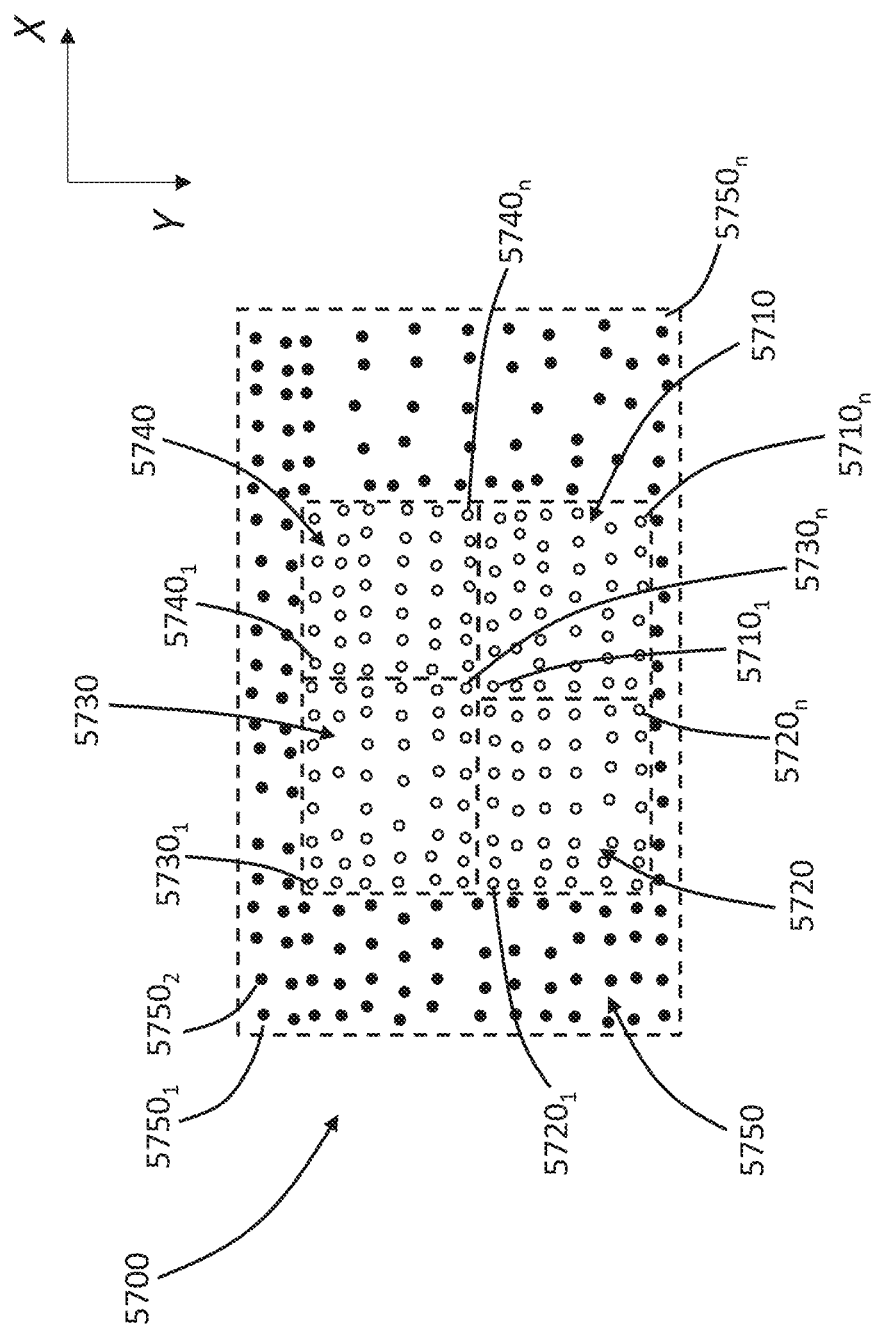

FIG. 5B depicts an example in which the image information in step 4002 includes 3D image information 5700. More particularly, the 3D image information 5700 may include, e.g., a depth map or a point cloud that indicates respective depth values of various locations on one or more surfaces (e.g., top surface or other outer surface) of the objects 3510-3550. For instance, the 3D image information 5700 may include a first portion 5710 (also referred to as image portion) that indicate respective depth values for a set of locations $5710_1$-$5710_n$ (also referred to as physical locations) on a surface of the object 3510; a second portion 5720 that indicates respective depth values for a set of locations $5720_1$-$5720_n$ on a surface of the object 3520; a third portion 5730 that indicates respective depth values for a set of locations $5730_1$-$5730_n$ on a surface of the object 3530; a fourth portion 5740 that indicates respective depth values for a set of locations $5740_1$-$5740_n$ on a surface of the object 3540; and a fifth portion 5750 that indicates respective depth values for a set of locations $5750_1$-$5750_n$ on a surface of the object 3550. The respective depth values may be relative to the camera (e.g., 3200/3200B) which generated the 3D image information, or may be relative to some other reference point. In some implementations, the 3D image information may include a point cloud which includes respective coordinates for various locations on structures of objects in the camera field of view (e.g., 3210/3210B). In the example of FIG. 5B, the point cloud may include respective sets of coordinates that describe the locations on the respective surfaces of the objects 3510-3550. The coordinates may be 3D coordinates, such as [X Y Z] coordinates, and may have values that are relative to a camera coordinate system, or some other coordinate system. As an example, the camera coordinate system may be defined by X, Y, and Z axes illustrated in FIGS. 3A, 3C, and 5B.

In an embodiment, step 4002 may involve receiving both 2D image information and 3D image information. In some instances, the computing system 1100 may use the 2D image information to compensate for limitations of the 3D image information, and vice versa. For instance, when multiple objects in a camera field of view are placed close to each other, and have substantially equal depth relative to a camera (e.g., 3200B), the 3D image information (e.g. 5700) may describe a plurality of locations with substantially equal depth values, and may lack detail for distinguishing between individual objects represented in the 3D image information, especially if spacing between the objects are too narrow for a resolution of the 3D image information. In some instances, the 3D image information may have erroneous or missing information due to noise or other source of error, which may further increase a difficulty of distinguishing between individual objects. In this example, the 2D image information may compensate for this lack of detail by capturing or otherwise representing physical edges between individual objects. In some instances, however, the 2D image information may include false edges, as discussed below, which may be candidate edges that do not correspond to any actual physical edges. In some implementations, the computing system 1100 may evaluate the likelihood that a candidate edge is a false edge, by determining whether the 2D image information satisfies a defined darkness condition at the candidate edge, as discussed below with respect to step 4006. In some implementations, the computing system 1100 may determine whether that candidate edge corresponds to a physical edge in the 3D image information, such as when the candidate edge corresponds to physical locations at which the 3D image information describes a sharp change in depth. In such a scenario, the 3D image information may be used to check whether a candidate edge is a false edge, and may supplement or replace the use of the defined darkness condition, thus providing a more robust manner of determining whether a candidate edge is a false edge or whether the candidate edge corresponds to an actual physical edge.

Figure 6A:
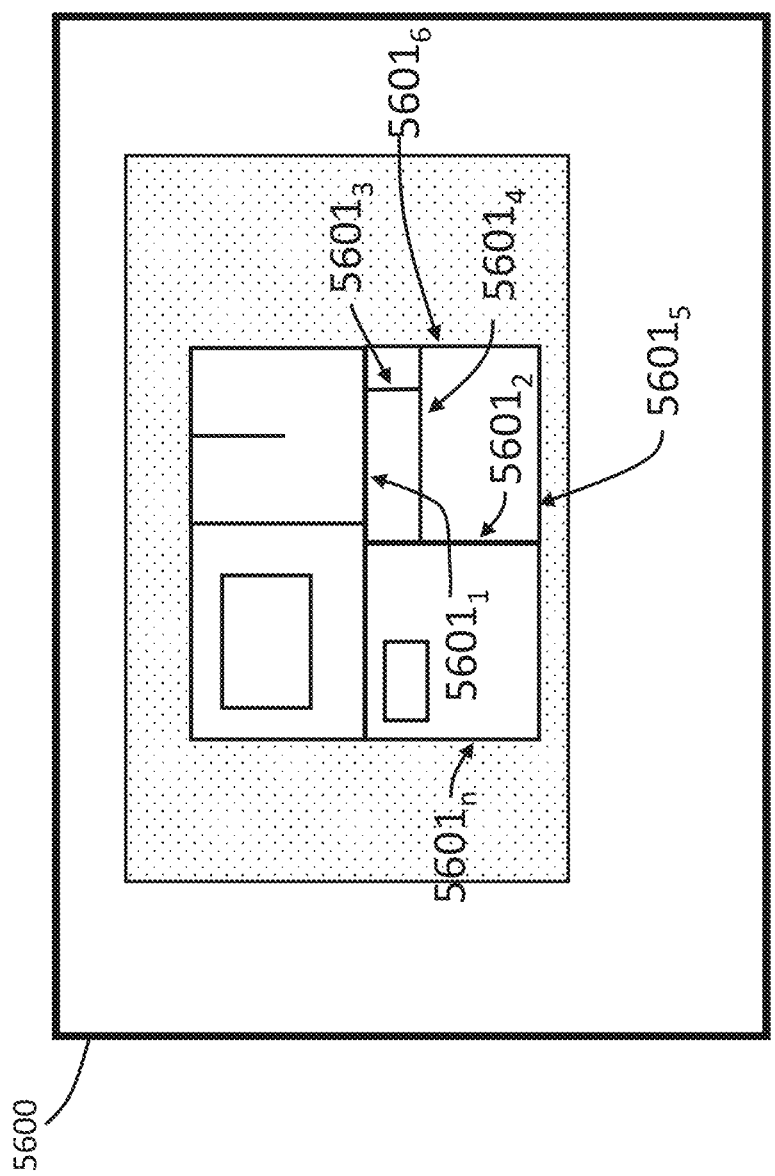
FIGS. 6A and 6B illustrate candidate edges identified from image information, according to embodiments hereof.

Returning to FIG. 4, the method 4000 may in an embodiment include a step 4004, in which the computing system 1100 identifies, from the image information of step 4002, a plurality of candidate edges associated with the group of objects (e.g., 3510-3550). In an embodiment, a candidate edge may be or may include a set of image locations or physical locations that form a candidate for representing a physical edge of an object or group of objects. In one example, if the image information includes a 2D image for representing one or more objects, a candidate edge may refer to a set of image locations, such as pixel locations (e.g., pixel locations $[u_1\ v_1]$ through $[u_k\ v_k]$). The set of pixel locations may correspond to a set of pixels that collectively resemble a physical edge. For instance, FIG. 6A depicts an example in which the computing system 1100 has identified candidate edges $5601_1$, $5601_2$, $5601_3$, $5601_4$, $5601_5$, $5601_6$, ... $5601_n$ from the 2D image 5600. Each candidate edge of the candidate edges $5601_1$-$5601_n$ may be, may include, or may be formed by a respective set of pixels locations that, e.g., define a line or line segment at which the 2D image has a sharp change in image intensity. The sharp change in image intensity may occur between, e.g., two image regions that are immediately adjacent to each other, in which one image region is darker than the other. As discussed in more detail below, a candidate edge may be formed based on a border between the two image regions. In such an example, the border may be formed by the line or line segment discussed above. A candidate edge which is identified from the 2D image (e.g., 5600) may be referred to as a 2D candidate edge or 2D edge.

In an embodiment, image information may include some candidate edges which correspond to actual physical edges, and include some candidate edges which are false edges. For instance, the candidate edges $5601_1$, $5601_2$, $5601_5$, $5601_6$ in FIG. 6A may correspond to actual physical edges of the group of objects 3510-3550, or more specifically to the physical object 3510, while the candidate edges $5601_3$ and $5601_4$ may be false edges. The candidate edges $5601_3$ and $5601_4$ may represent, e.g., visible lines or other visual markings which appear on a surface of the object 3510. These visible lines may resemble physical edges, but do not correspond to any actual physical edges of the objects 3510-3550. Thus, as discussed below with respect to step 4008, the method 4000 may in an embodiment involve determining whether a particular candidate edge should be used to represent at least one of the physical edges of a group of objects.

Figure 6B:
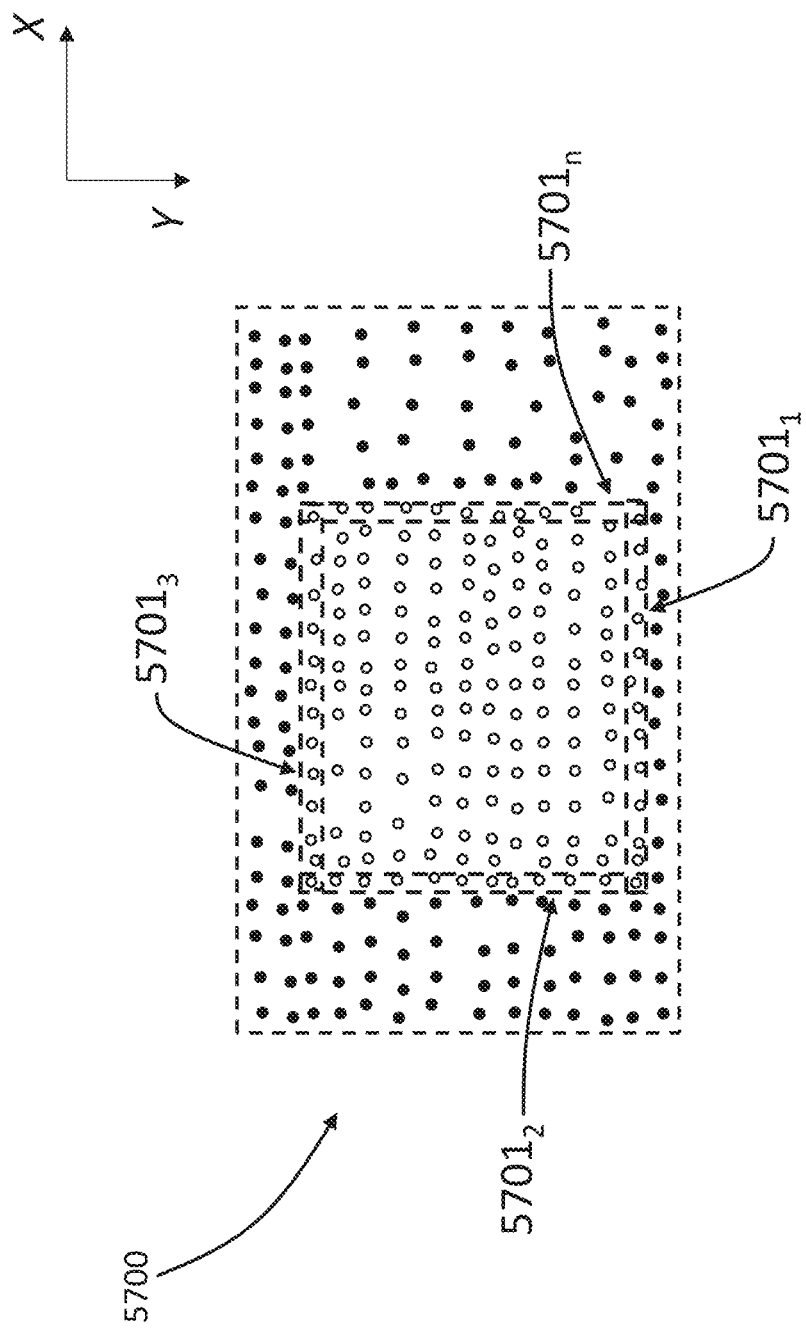

In one example, if the image information includes 3D information, a candidate edge may refer to a set of image locations or a set of physical locations. As an example, if the image locations are pixel locations, they may correspond to a set of pixels that appear like a physical edge. In another example, if the 3D image information includes a depth map, a candidate edge may include a set of pixel locations that define, e.g., a line or line segment, which may form a border at which there is a sharp change in depth in the depth map. If the 3D image information describes 3D coordinates of physical locations on an object's surface (e.g., via a point cloud), a candidate edge may include a set of physical locations that also define, e.g., an imaginary line or line segment, which may also form a border at which there is there is a sharp change in depth in the point cloud or other 3D image information. For instance, FIG. 6B depicts an example in which the computing system 1100 has identified candidate edges $5701_1$, $5701_2$, $5701_3$, $5701_n$ from the 3D image information 5700. Each candidate edge of the candidate edges $5701_1$-$5701_n$ may include, e.g., a set of physical locations $[X_1\ Y_1\ Z_1]$ through $[X_p\ Y_pZ_1]$ that define a border at which the sharp change in depth occurs. A candidate edge which is identified from the 3D image information may be referred to as a 3D candidate edge or 3D edge.

In an embodiment, if the computing system 1100 identifies both 2D candidate edges and 3D candidate edges, the computing system 1100 may be configured to determine whether any of the 2D candidate edges (e.g., $5601_5$) represent a common physical edge with one of the 3D candidate edges (e.g., $5701_1$), or vice versa. In other words, the computing system 1100 may determine whether any of the 2D candidate edges maps to one of the 3D candidate edges, or vice versa. The mapping may be based on, e.g., converting coordinates of a 2D candidate edge from being expressed in a coordinate system of the 2D image information to being expressed in a coordinate system of the 3D image information, or converting coordinates of a 3D candidate edge from being expressed in the coordinate system of the 3D image information to being expressed in the coordinate system of the 2D image information. Mapping from 2D candidate edges to 3D candidate edges is discussed in more detail in U.S. patent application Ser. No. 16/791,024, entitled "METHOD AND COMPUTING SYSTEM FOR PROCESSING CANDIDATE EDGES," the entire content of which is incorporated by reference herein.

As stated above, the computing system 1100 may identify a candidate edge from a 2D image or other 2D image information by identifying image locations (e.g., pixel locations) in the 2D image information at which there is a sharp change in image intensity (e.g., pixel intensity). In some implementations, the sharp change may occur at a border between two image regions in which one image region is darker than the other image region. For instance, the two image regions may include a first image region and a second image region. The first image region may be a region of the 2D image that is darker than one or more immediately adjacent regions, which may include the second image region. The darkness of an image region may be indicative of how much reflected light from a corresponding physical region is detected or otherwise sensed by a camera (e.g., 3200/3200A) which generated the image information (e.g., 5600). More particularly, a darker image region may indicate that the camera sensed a relatively small amount of reflected light (or no reflected light) from the corresponding physical region. In some implementations, the darkness of an image region may indicate how close is image intensity in the image region to a minimum possible image intensity value (e.g., zero). In these implementations, a darker image region may indicate that an image intensity value(s) of the image region is closer to zero, while a less dark image region may indicate that an image intensity value(s) of the image region is closer to a maximum possible image intensity value.

Figure 7B:
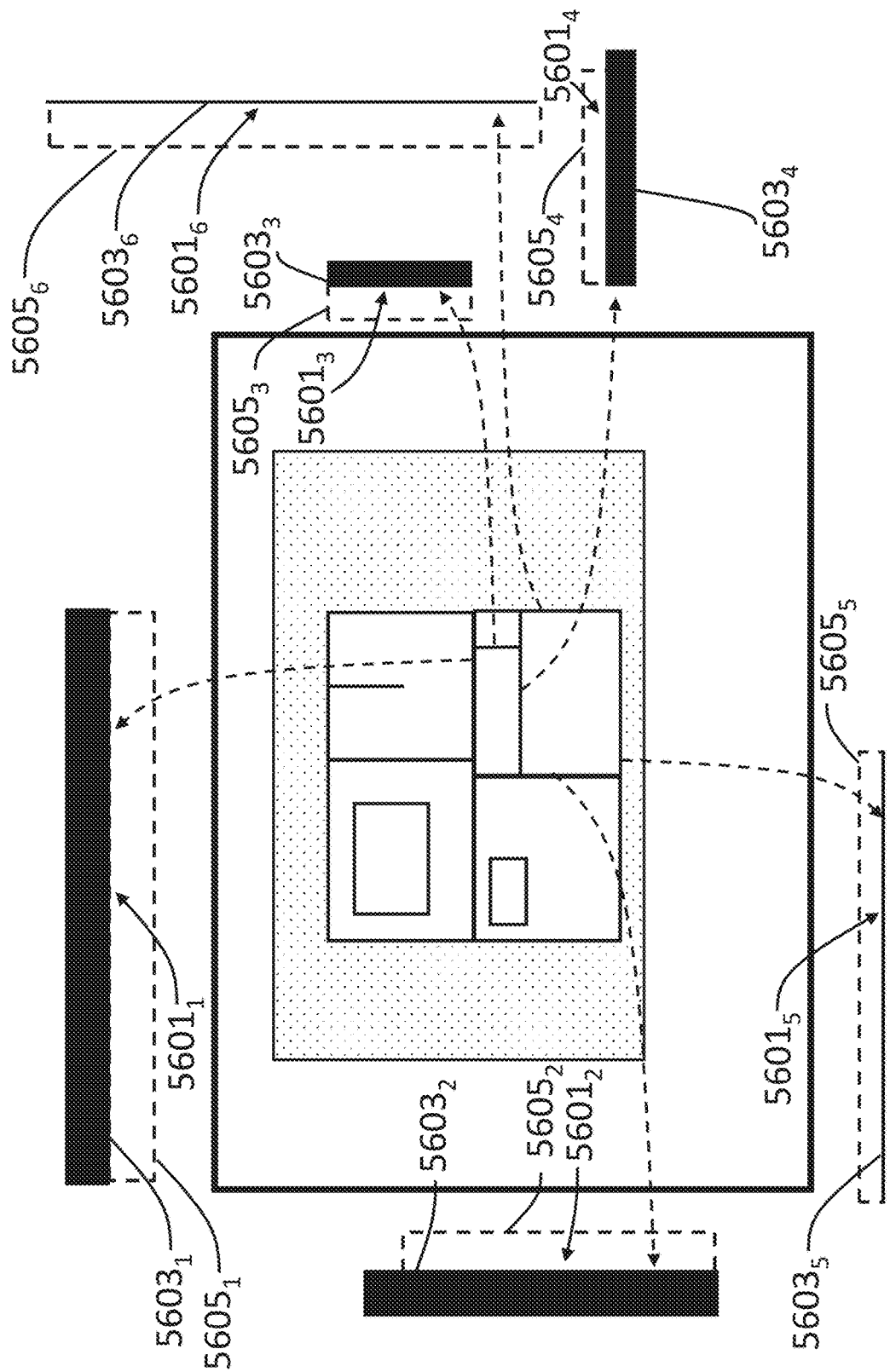

In an embodiment, the second image region may have an elongated shape, such as a rectangular band or a line or line segment. As an example, FIG. 7A illustrates example image regions $5603_1$, $5603_2$, $5603_3$, $5603_4$, $5603_5$, $5603_6$ that are darker than immediately adjacent image regions $5605_1$, $5605_2$, $5605_3$, $5605_4$, $5605_5$, $5605_6$, respectively. If the image 5600 includes pixels, the image regions in FIG. 7A may be pixel regions. The image regions $5603_1$-$5603_4$ may each be or form a band of pixels, such as a rectangular band, and may have a width of more than one pixel, while image regions $5603_5$ and $5603_6$ may each be or form a line of pixels having a width of one pixel. As stated above, a candidate edge may be formed by or formed based on a border between a first image region (e.g., one of the image regions $5603_1$-$5603_6$) and a second image region (e.g., one of image regions $5605_1$-$5605_6$), wherein the first image region may be immediately adjacent to the second image region, and may be darker than the second image region, and wherein a sharp change in image intensity may occur at the border between the two image regions. For instance, FIG. 7B illustrates candidate edges $5601_1$-$5601_6$ that are defined or formed by respective borders between the image regions $5603_1$-$5603_6$ and the corresponding immediately adjacent image regions $5605_1$-$5605_6$. As an example, the computing system 1100 may identify candidate edge $5601_1$ as a set of pixel locations which define a border between one image region $5605_1$ and another, darker image region $5603_1$. As additional examples, the computing system 1100 may identify the candidate edge $5601_5$ as a set of pixel locations which define a border between one image region $5605_5$ and a darker image region $5603_5$. In some instances, the pixel locations for the candidate edge $5601_5$ may be located in the darker image region $5603_5$. More particularly, the candidate edge $5601_5$ may be or may coincide with the image region $5603_5$, which may be, e.g., a line of pixels having a width of a single pixel.

In an embodiment, the computing system 1100 may detect or otherwise identify a candidate edge, such as one of the candidate edges $5601_1$-$5601_6$, based on an image edge detection technique, which may detect, e.g., a sharp change in image intensity. For instance, the computing system 1100 may be configured to detect a candidate edge in a 2D image or other image information by applying a Sobel operator, a Prewitt operator, or other technique for determining intensity gradient in the 2D image, and/or by applying a Canny edge detector or other edge detection technique.

Figure 7C:
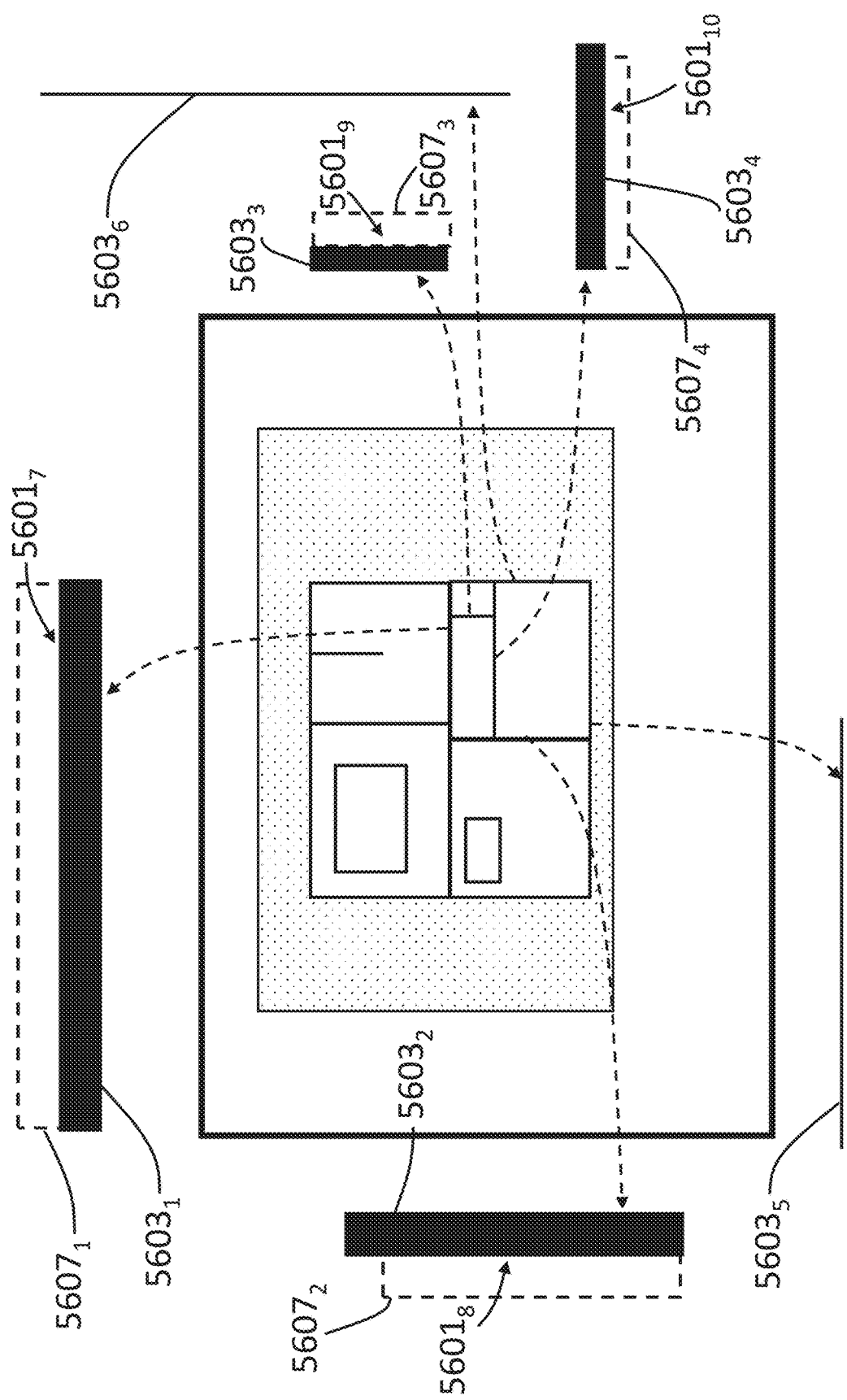

In an embodiment, if a computing system 1100 identifies an image region in a 2D image that is a band of pixels which is darker than one or more immediately adjacent image regions, the image region may in some circumstances be wide enough to form more than candidate edge. For instance, FIG. 7C illustrates the computing system 1100 identifying additional candidate edges $5601_7$-$5601_{10}$ based on the image regions $5603_1$-$5603_4$. More particularly, the additional candidate edges $5601_7$-$5601_{10}$ may be respective sets of pixel locations that define respective borders between the image regions $5603_1$-$5603_4$ and immediately adjacent image regions $5607_1$-$5607_4$. As a more specific example, the image region $5603_2$ in this example may be sufficiently wide such that an image edge detection technique may identify a candidate edge $5601_2$ that is formed by a border between one side (e.g., right side) of the image region $5603_2$ and an immediately adjacent region $5605_2$, as illustrated in FIG. 7B, and further identify another candidate edge $5601_8$ that is formed by a border between an opposite side (e.g., left side) of the image region $5603_2$ and an immediately adjacent region $5607_2$, as illustrated in FIG. 7C. In an embodiment, an image region may be so narrow such that an image edge detection technique may identify only a single candidate edge from the image region. In such an embodiment, the image region may have a width of a single pixel, or a few pixels. For example, as stated above, the image region $5603_5$ may form a line of pixels, and may have a width of one pixel. In this example, the computing system 1100 may identify only a single candidate edge $5601_5$ based on the image region $5603_5$, wherein the candidate edge $5601_5$ may, e.g., coincident with the image region $5603_5$, such that the image candidate edge $5601_5$ may be or may overlap with the line of pixels forming the image region $5603_5$.

Returning to FIG. 4, the method 4000 may in an embodiment include a step 4006, which may be performed when the plurality of candidate edges in step 4004 include a first candidate edge which is formed by a border between a first image region and a second image region, wherein the first image region may be darker than the second image region in image intensity, and may be immediately adjacent to the second image region. In this example, the first image region and the second image region may be regions described by the 2D image (e.g., 5600) or other image information. For instance, FIGS. 7A-7C provide an example of a plurality of candidate edges $5601_1$-$5601_n$, and the first candidate edge of step 4006 may be any one of the plurality of candidate edges $5601_1$-$5601_n$. As stated above, the first candidate edge may be formed by or formed based on a border between the first image region and a second, lighter image region. As an example, if the first candidate edge is candidate edge $5601_1$, then the first image region may be image region $5603_1$, and the second image region may be $5605_1$. As another example, if the first candidate edge is candidate edge $5601_2$, then the first image region may be image region $5603_2$, and the second image region may be image region $5605_2$.

In step 4006, the computing system 1100 may determine whether the image information (e.g., 2D image 5600) satisfies a defined darkness condition at the first candidate edge (e.g., $5601_2$). Such a determination may more specifically include, e.g., determining whether the first image region (e.g., $5603_2$) satisfies the defined darkness condition. In an embodiment, the defined darkness condition may be used to determine whether the first candidate edge (e.g., $5601_2$) likely corresponds to an actual physical edge of an object (e.g., 3510) in a camera field of view (e.g., 3210/3210A), or whether the first candidate edge is likely a false edge.

In an embodiment, the defined darkness condition may be used to detect an image prior, or more specifically a dark prior. An image prior may refer to an image feature which has some likelihood of appearing in an image during certain circumstances, or which may be expected in the image. More specifically, the image prior may correspond to an expectation, anticipation, or prediction of what image feature(s) will be in an image that is generated in such circumstances, such as a circumstance in which the image is being generated to represent a group of boxes or other objects that are placed next to each other in a camera field of view. In some instances, a dark prior may refer to an image feature which has a high level of darkness, and/or has a spike-shaped image intensity profile (e.g., pixel intensity profile).

The spike-shaped image intensity profile may involve a spiked increase in darkness and/or a spiked reduction in image intensity. The dark prior may correspond to a circumstance in which a group of boxes or other objects in a camera field of view are placed sufficiently close to each other such that there is only a narrow, physical gap between some or all of the objects. More particularly, the dark prior may correspond to an expectation, anticipation, or prediction that when an image is generated in such a circumstance to represent the group of objects, the physical gap will appear very dark in the image. More specifically, the dark prior may correspond to an expectation or prediction that an image region in the image which represents the physical gap will have a high level of darkness, and/or may have a spike-shaped image intensity profile, as discussed below in more detail. In some implementations, the dark prior may be used to determine whether a candidate edge likely corresponds to a physical edge, by evaluating whether an image region associated with the candidate edge corresponds to a physical gap between two objects.

In an embodiment, the defined darkness condition, which may in some scenarios be a condition for detecting a dark prior, may be based on a model of how a physical gap between two objects (e.g., 3510 and 3520 of FIGS. 3A-3C) should or is likely to appear in a 2D image, especially if the physical gap is narrow (e.g., less than 5 mm, or less than 10 mm). For instance, the defined darkness condition may be based on a Lambertian model of diffuse reflectance. Such a model of reflectance may estimate how light reflects from one or more surfaces or regions, especially surfaces or regions that cause diffuse reflection of incoming light. The model may thus estimate an intensity of reflected light from a surface or surface region, and which may be indicative of how bright or how dark the surface or surface region will appear in an image which is generated by a camera (e.g., 3200/3200A) that senses the reflected light.

Figure 8:
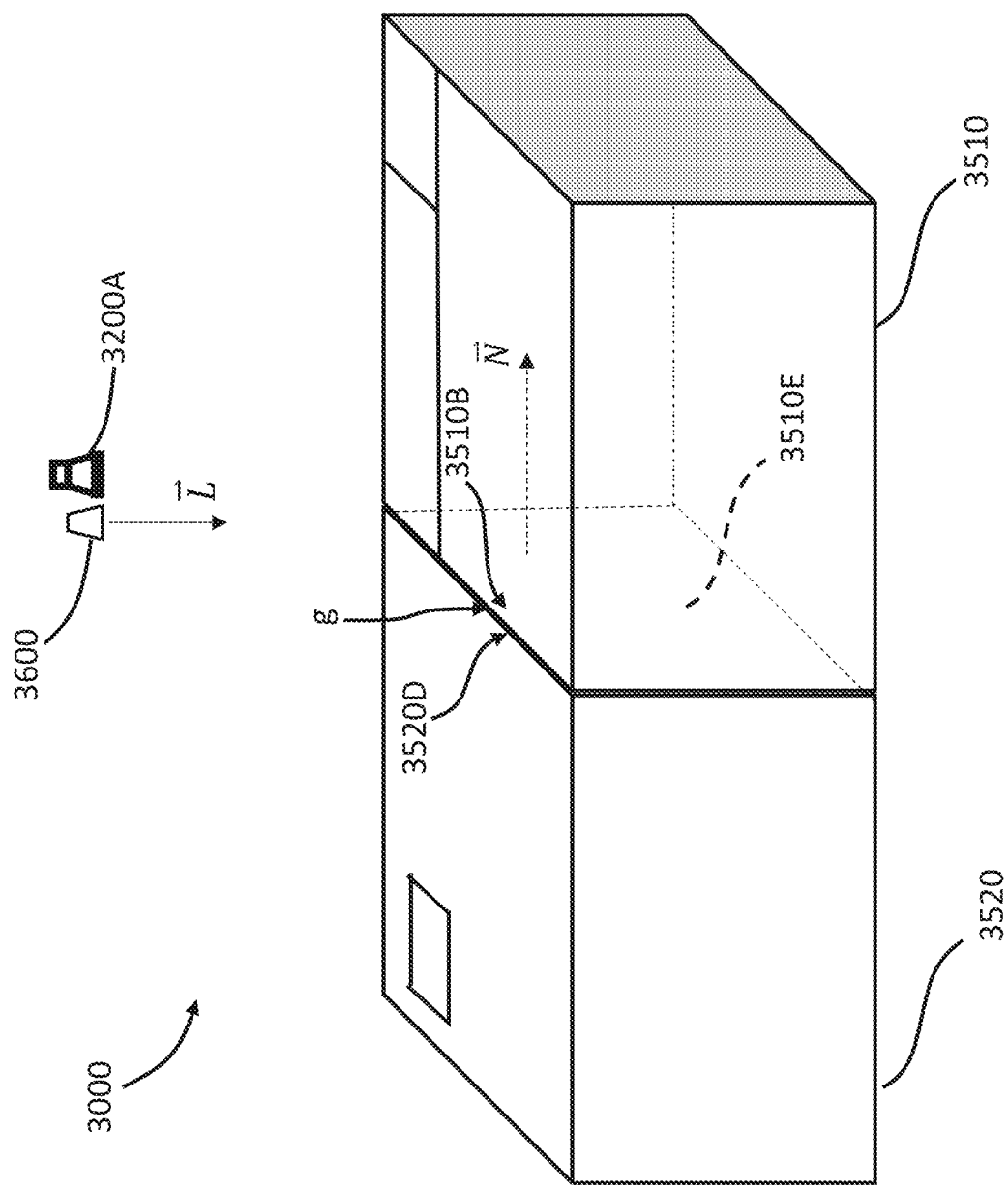
FIG. 8 illustrates an environment in which an image may be generated based on diffuse reflection in which incoming light reflects off objects in a camera field of view, according to an embodiment hereof.

As an example of how the Lambertian model applies to a group of objects (e.g., 3510-3550 of FIGS. 3A-3C), FIG. 8 depicts the camera 3200A that is configured to generate an image (e.g., 5600) which represents at least objects 3510 and 3520, by sensing reflected light that is coming from various surfaces of the objects 3510, 3520. In some scenarios, the reflected light may be a reflection of emitted light from the light source 3600. More particularly, the light source 3600 may emit the light along at least a vector L toward the objects 3510, 3520. In this example, the objects 3510 and 3520 may be placed next to each other, and may be separated by a narrow physical gap g, which may be a space between a physical edge 3510B of the object 3510 and a physical edge 3520D of the object 3520. In the scenario of FIG. 8, an image intensity of the physical gap g in an image (e.g., 5600) may depend on how much reflected light will come from various surfaces forming the physical gap, such as a surface 3510E (e.g., side surface) of the object 3510. Under the Lambertian model of diffuse reflectance, an intensity of reflected light from a particular surface may be proportional to or otherwise based on cos α, wherein α is an angle between the vector $\vec{L}$ of incoming light and a normal vector $\vec{N}$ of the surface (e.g., 3510E). As illustrated in FIG. 8A, the angle α between the vector $\vec{L}$ and a normal vector $\vec{N}$ for the surface 3510E may be substantially 90 degrees, such that an intensity of the reflected light from the surface 3510E may be extremely low, or may in some circumstances be zero. Thus, an image region which represents a physical gap between two objects may have an extremely high level of darkness. Thus, the defined darkness condition of step 4006 may in some implementations include a defined darkness threshold criterion, which may be used to evaluate whether the image region is sufficiently dark to indicate that it is representing a physical gap between two objects.

In some situations, a physical gap may appear darker at its middle than at its periphery. That is, if any reflected light leaves the physical gap, more reflected light may come from a periphery of the physical gap than from a middle of the physical gap. The periphery may refer to, e.g., locations in the physical gap which are closer to the physical edge 3520D or the physical edge 3510B. In some scenarios, a peak level of darkness may occur at the middle of the physical gap. Thus, an image region which represents a physical gap may have a spike-shaped image intensity profile (e.g., pixel intensity profile), in which the image intensity profile has a spiked increase in darkness or a spiked reduction in image intensity within the image region. Thus, the defined darkness condition in step 4006 may in some circumstances include a defined spiked intensity profile criterion, to evaluate whether the image region has, e.g., a spike-shaped image intensity profile (as opposed to, e.g., a step-shaped image intensity profile).

In an embodiment, the defined darkness condition may be defined by one or more rules, criteria, or other information which are stored in, e.g., the non-transitory computer-readable medium 1120 or elsewhere. For instance, the information may define whether the darkness condition is satisfied only by satisfying a darkness threshold criterion, only by satisfying a spiked intensity profile criterion, only by satisfying both criteria, or by satisfying any of the darkness threshold criterion or the spiked intensity profile criterion. In some instances, the information may be manually or otherwise predefined and stored in the non-transitory computer-readable medium 1120, such that the defined darkness condition may be a predefined darkness condition. In some instances, the information for the darkness condition may be dynamically defined.

In an embodiment, the defined darkness threshold criterion and/or the defined spiked intensity profile criterion may be defined by information which is stored on the non-transitory computer-readable medium 1120 or elsewhere. The information may be predefined, such that the defined darkness threshold criterion and/or the defined spiked intensity profile criterion may be a predefined criterion or predefined criteria. In an embodiment, various defined thresholds or other defined values in this disclosure may defined as stored values on the non-transitory computer-readable medium 1120 or elsewhere. For instance, a defined darkness threshold or a defined depth difference threshold, which are discussed below, may be values stored on the computer-readable medium 1120. They may be predefined values, or may be dynamically defined.

Figure 9A:
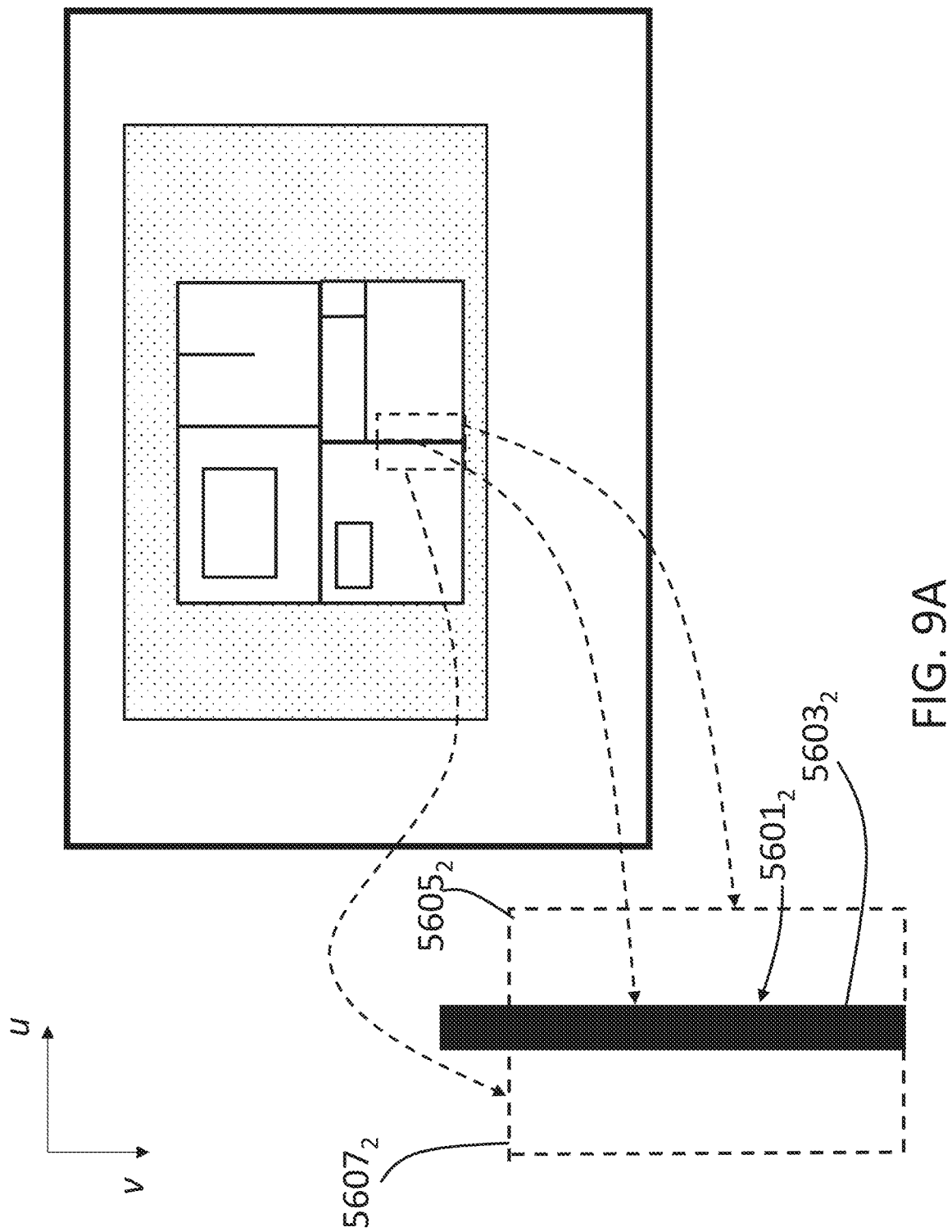
Figure 9C:
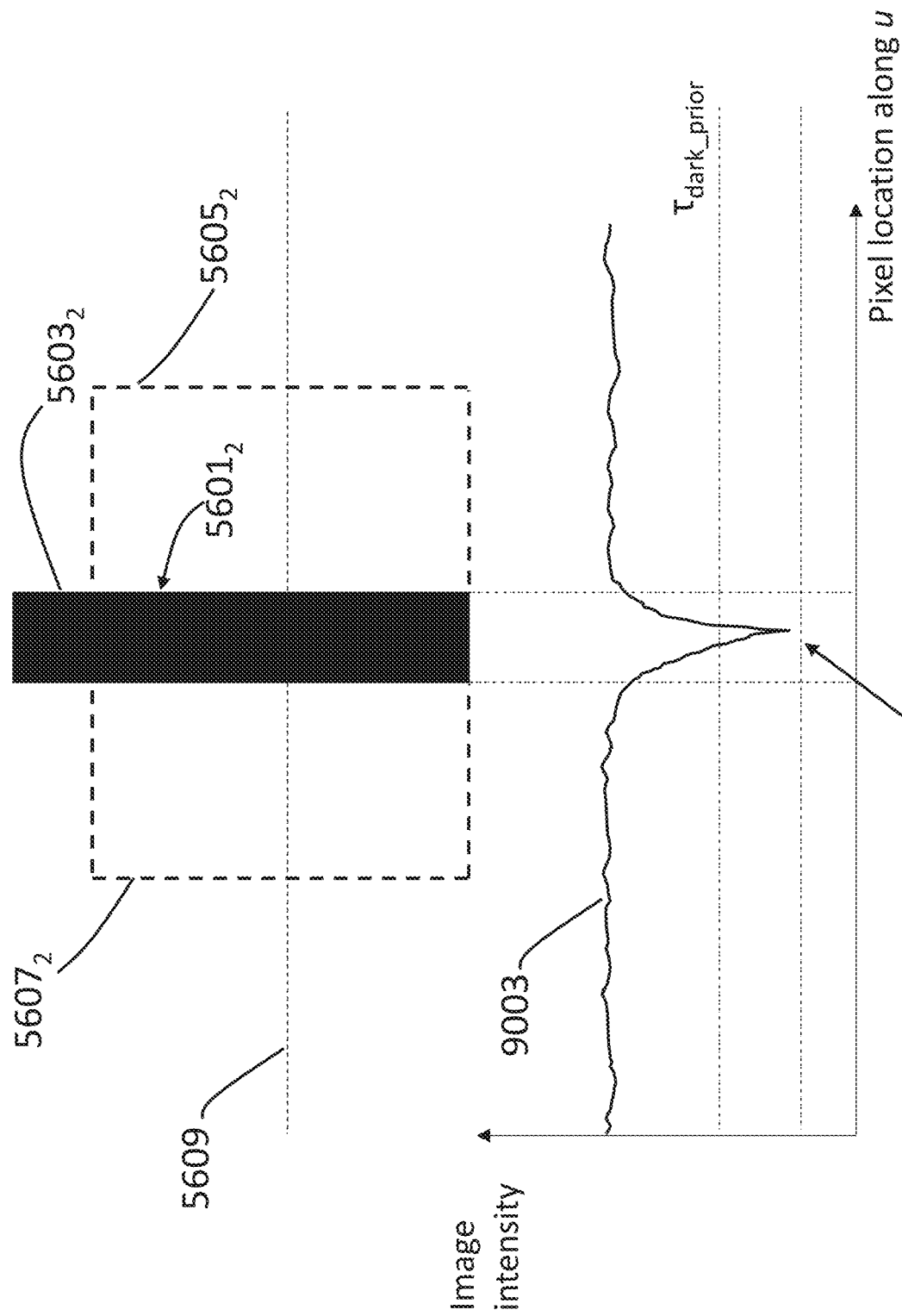

FIGS. 9A-9C illustrate embodiments for evaluating whether image information (e.g., 5600) satisfies a defined darkness condition at a candidate edge $5601_2$, or more specifically whether an image region $5603_2$ satisfies the defined darkness condition. The image region $5603_2$ may represent a physical gap between a first object, such as object 3510 of FIG. 8, and a second object, such as object 3520. In an embodiment, the candidate edge $5601_2$ may represent physical edge 5610B of the object 3510, and may be formed by or based on a border between the image region $5603_2$ and an immediately adjacent image region $5605_2$. In this example, the image region $5603_2$ may be a first image region, and the image region $5605_2$ may be a second image region. More particularly, the image region $5603_2$ may be a first pixel region that forms a band of pixels, while the image region $5605_2$ may be a second pixel region, such that the candidate edge $5601_2$ may include or may be formed by, e.g., a set of pixel locations that define a border between the first pixel region and the second pixel region. As discussed above, the computing system 1100 may identify the candidate edge $5601_2$ by, e.g., detecting a sharp change in image intensity (e.g., pixel intensity) between the image regions $5603_2$, $5605_2$.

In an embodiment, if a candidate edge is formed based on a border between a first image region and a second image region, wherein the first image region is darker than the second image region, the computing system 1100 may determine that the defined darkness condition is satisfied if the first image region satisfies a defined spiked intensity profile criterion. More particularly, the computing system may determine that the first image region (e.g., $5603_2$) satisfies the defined spiked intensity profile criterion if the first image region has a particular shape for its image intensity profile (e.g., pixel intensity profile), such as a shape in which the image intensity increases in darkness within the first image region toward a peak level of darkness at a location within the first image region, and then decreases in darkness. Such a criterion may be consistent with a spike-shaped intensity profile, in which an image intensity profile has a spiked increase in darkness within an image region, or a spiked reduction in intensity within the image region. Such a criterion may be associated with detecting a dark prior in which any physical gap appearing in an image is expected to appear darker at a middle of the gap relative to a periphery of the gap.

FIG. 9B illustrates an image intensity profile 9001, or more specifically a pixel intensity profile, that may satisfy a defined spiked intensity profile criterion. More particularly, an image intensity profile may include information that describes how image intensity, or more specifically pixel intensity, changes as a function of image location, such as pixel location. In some implementations, an image intensity profile may be represented by a curve or graph that describes values of image intensity as a function of location in an image. For instance, FIG. 9B depicts the image intensity profile 9001 a curve or graph that describes values of image intensity, or more specifically pixel intensity values, as a function of pixel location in a particular direction along an axis 5609. The axis 5609 may be an axis that extends across and along a width dimension of the image region $5603_2$, while the direction along the axis 5609 may be a particular direction along the axis 5609. In the example of FIG. 9B, the width dimension may be aligned with, e.g., the coordinate axis u of the image 5600 of FIG. 5A, and the direction along the axis 5609 may be a positive direction, in which pixel coordinates [u, v] along that direction have an increasing value of u.

In an embodiment, the computing system 1100 may determine whether the image region $5603_2$ satisfies the defined spiked intensity profile criterion by determining whether the image region $5603_2$ has a pixel intensity profile (e.g., 9001) which includes: (i) a first profile portion (e.g., 9011) in which image intensity (e.g., pixel intensity) increases in darkness within the first image region as a function of location along a first direction (e.g., a positive direction along axis 5609), to reach a peak level of darkness (e.g., 9002) at a location $u_1$ within the first image region, followed by (ii) a second profile portion (e.g., 9012) in which image intensity decreases in darkness within the first image region, away from the peak level of darkness, as a function of location along the same direction (e.g., positive direction). The image intensity profile 9001 in FIG. 9B may more specifically be a spike-shaped intensity profile that has a spiked reduction in image intensity within the image region 95032.

In some implementations, an image intensity profile that increases in darkness may correspond to the image intensity profile having values that are decreasing in image intensity. For example, an image (e.g., 5600) may have pixel intensity values that are in a range from a minimum possible pixel intensity value (e.g., zero) to a maximum possible pixel intensity value (e.g., 255 for pixel intensity values encoded with 8 bits). In this example, lower pixel intensity values may represent lower levels of brightness, and thus higher levels of darkness, while higher pixel intensity values may represent higher levels of brightness, and thus lower levels of darkness. Further in this example, a peak level of darkness (e.g., 9002) of an image intensity profile may correspond to a minimum image intensity value of the image intensity profile (e.g., 9001).

In the above example, the computing system 1100 may determine whether an image region satisfies a defined spiked intensity profile criterion by determining whether the image intensity profile has a shape in which image intensity values (e.g., pixel intensity values) begin by decreasing in image intensity toward a minimum image intensity value, and then switches to increasing in image intensity away from the minimum image intensity value. For instance, the image intensity profile 9001 in FIG. 9B may describe respective pixel intensity values for a series of pixels extending across a width dimension of the image region 5603$_2$. The computing system 1100 may determine whether image region 5603$_2$ satisfies the spiked intensity profile criterion by determining whether the image intensity profile has a shape in which the respective pixel intensity values decrease toward a minimum pixel intensity value in the image region 5603$_2$, and then switches to increasing in the image region 5603$_2$ away from the minimum pixel intensity value. In this example, the minimum pixel intensity value may correspond with the peak level 9002 of darkness in the image intensity profile 9001.

In an embodiment, if a candidate edge is formed based on a border between a first image region and a second image region, wherein the first image region is darker than the second image region, satisfying the defined darkness threshold criterion may involve comparison with a defined darkness threshold. Such a criterion may correspond with detecting a dark prior in which any physical gap which appears in an image is expected to be extremely dark in appearance. FIG. 9C illustrates another image intensity profile 9003 for the an image region 5603$_2$ and immediately adjacent image regions. In this example, the first image region may bean image region 5603$_2$ that is immediately adjacent to a second, brighter image region (e.g., 5605$_2$), while the darker image region 5603$_2$ may be the first image region. As stated above, the image region 5603$_2$ may form a band of pixels. In FIG. 9C, the computing system 1100 may determine whether the image region 5603$_2$ satisfies the defined darkness threshold criterion by determining whether the image region 5603$_2$ has at least one portion which is darker in image intensity than a defined darkness threshold $\tau_{dark\_prior}$. As stated above, higher levels of darkness may in some instances correspond to lower image intensity values. In such instances, the computing system 1100 may determine whether the image region 5603$_2$ has an image intensity profile with image intensity values (e.g., pixel intensity values) that are less than the defined darkness threshold $\tau_{dark\_prior}$. In some situations, the computing system 1100 may more specifically determine whether a minimum intensity value of the image intensity profile 9003 is less than or equal to the defined darkness threshold $\tau_{dark\_prior}$, wherein the minimum intensity value may correspond to a peak level 9004 of darkness of the intensity profile 9003. In an embodiment, if the image region 5603$_2$ has the image intensity profile 9003, it may satisfy both the defined darkness threshold criterion and the defined spiked intensity profile criterion.

In an embodiment, the computing system 1100 may determine that the defined darkness condition is satisfied for a candidate edge and/or image region if at least one of the defined darkness threshold criterion or the defined spiked intensity profile criterion is satisfied, such that any one of the above criteria may be used to satisfy the defined darkness condition. In an embodiment, the computing system 1100 may determine that the defined darkness condition is satisfied only in response to a determination that the defined spiked intensity profile criterion is satisfied (regardless of whether the defined darkness threshold criterion is satisfied), only in response to a determination that the defined darkness threshold criterion is satisfied (regardless of whether the defined spiked intensity profile criterion is satisfied), or only in response to a determination that both the defined darkness threshold criterion and the defined spiked intensity profile criterion are satisfied.

In an embodiment, the computing system 1100 may identify a candidate edge (e.g., 5601$_2$) based on 2D image information, such as the 2D image 5600, and determine whether the candidate edge satisfies a defined darkness condition. As stated above, if the computing system 1100 receives both 2D image information and 3D image information, the computing system 1100 may use the 2D image information to compensate for limitations in the 3D image information or for missing 3D image information, and vice versa. For instance, when a camera (e.g., 3200B) generates 3D image information to represent a group of objects, the 3D image information may lack information to distinguish between individual objects within the group, especially if the group of objects have equal depth values relative to the camera. More particularly, the 3D image information may lack information for detecting a narrow physical gap between objects, and thus may have limited usefulness in identifying a physical edge associated with the physical gap.

Figure 9D:
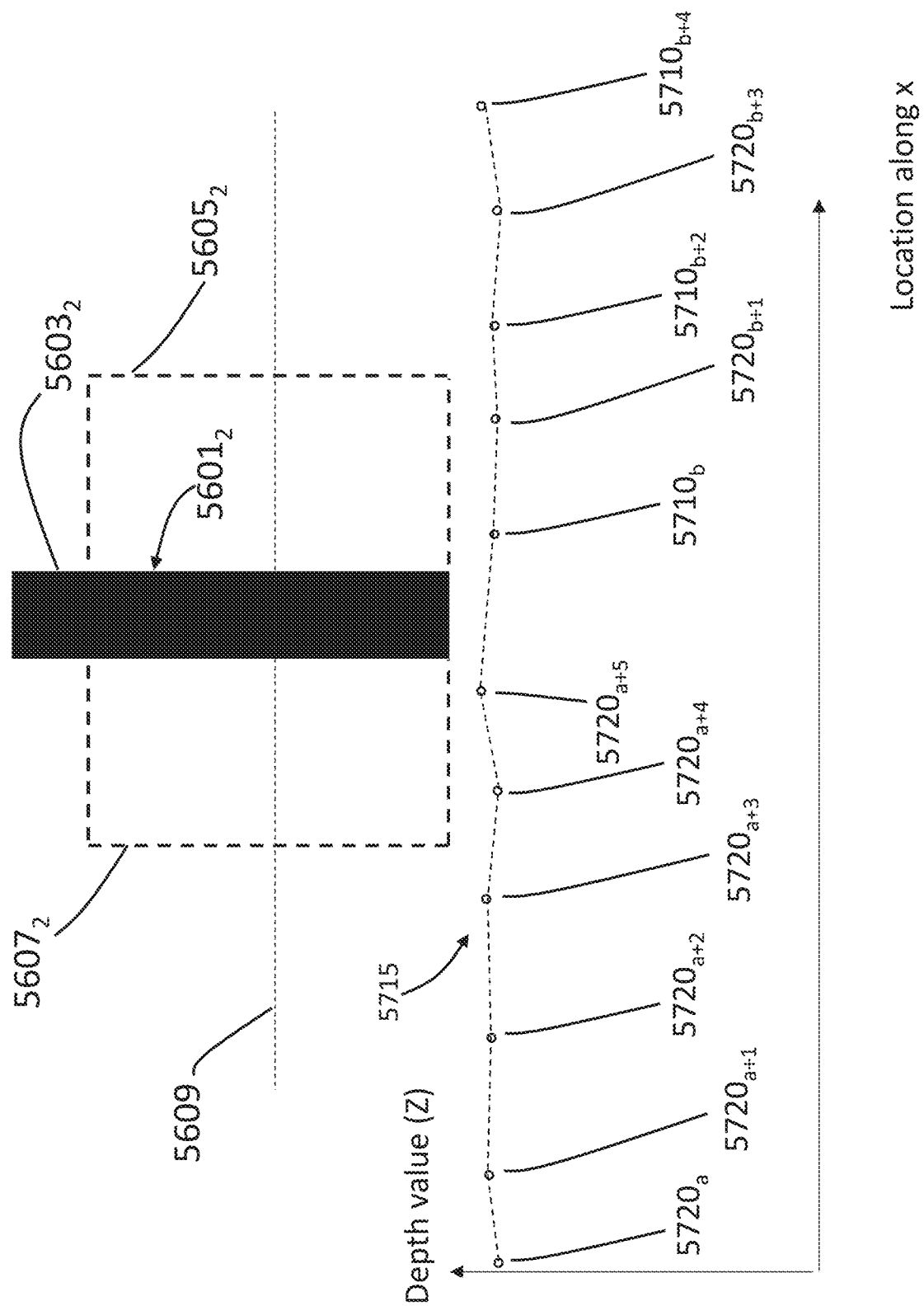
FIG. 9D illustrates depth values of a region which is around a location corresponding to the candidate edge, according to embodiments hereof.

As an example, FIG. 9D illustrates depth values associated with a portion 5715 of the 3D image information 5700 of FIG. 5B. More specifically, the portion 5715 may describe respective depth values for physical locations 5720$_a$ through 5720$_{a+5}$ on a top surface of the object 3520 and locations 5710$_b$ through 5710$_{b+4}$ on a top surface of the object 3510. These physical locations may map or otherwise correspond to image locations that are in or around the image region 5603$_2$, or to image locations that are around the candidate edge 5601$_2$. As illustrated in FIG. 8, the image region 5603$_2$ may represent a physical gap g between the objects 3510, 3520. As stated above, the computing system 1100 may use 3D image information to attempt to detect one or more locations at which there is a sharp change in depth. However, a physical gap such as that of FIG. 8 may be too narrow, or otherwise too small relative to a resolution of the 3D image information, to be captured by the 3D image information 5700. Thus, in the example of FIG. 9D, the computing system 1100 may determine that the locations 5720$_a$ through 5720$_{a+5}$ and 5710$_b$ through 5710$_{b+4}$ do not have a sharp change in depth, and thus determine that the 3D image information does not indicate a candidate edge at any of those locations. Further, in some circumstances, the 3D image information may be missing depth information for some of the locations $5720_a$ through $5720_{a+5}$ and $5710_b$ through $5710_{b+4}$, or more specifically for one or more locations corresponding to the candidate edge $5601_1$. In some circumstances, a portion of the 3D image information that maps or otherwise corresponds to the candidate edge $5601_1$ may be affected by a level of imaging noise which is greater than a defined noise tolerance threshold, which may be a value defined in the non-transitory computer-readable medium 1120. In the above example, the 2D image information may compensate for these limitations of the 3D image information, because the 2D image information may include a candidate edge $5601_1$ that represents a physical edge 3510B of the object 3510, and include an image region $5603_2$ that does represent a physical gap between the object 3510 and object 3520. In the above examples involving the limitations of the 3D image information, the computing system 1100 may further use the defined darkness condition to determine whether the candidate edge $5601_2$ should be used to represent one of the physical edges (e.g., 3510B) of the group of objects.

Figure 10A:
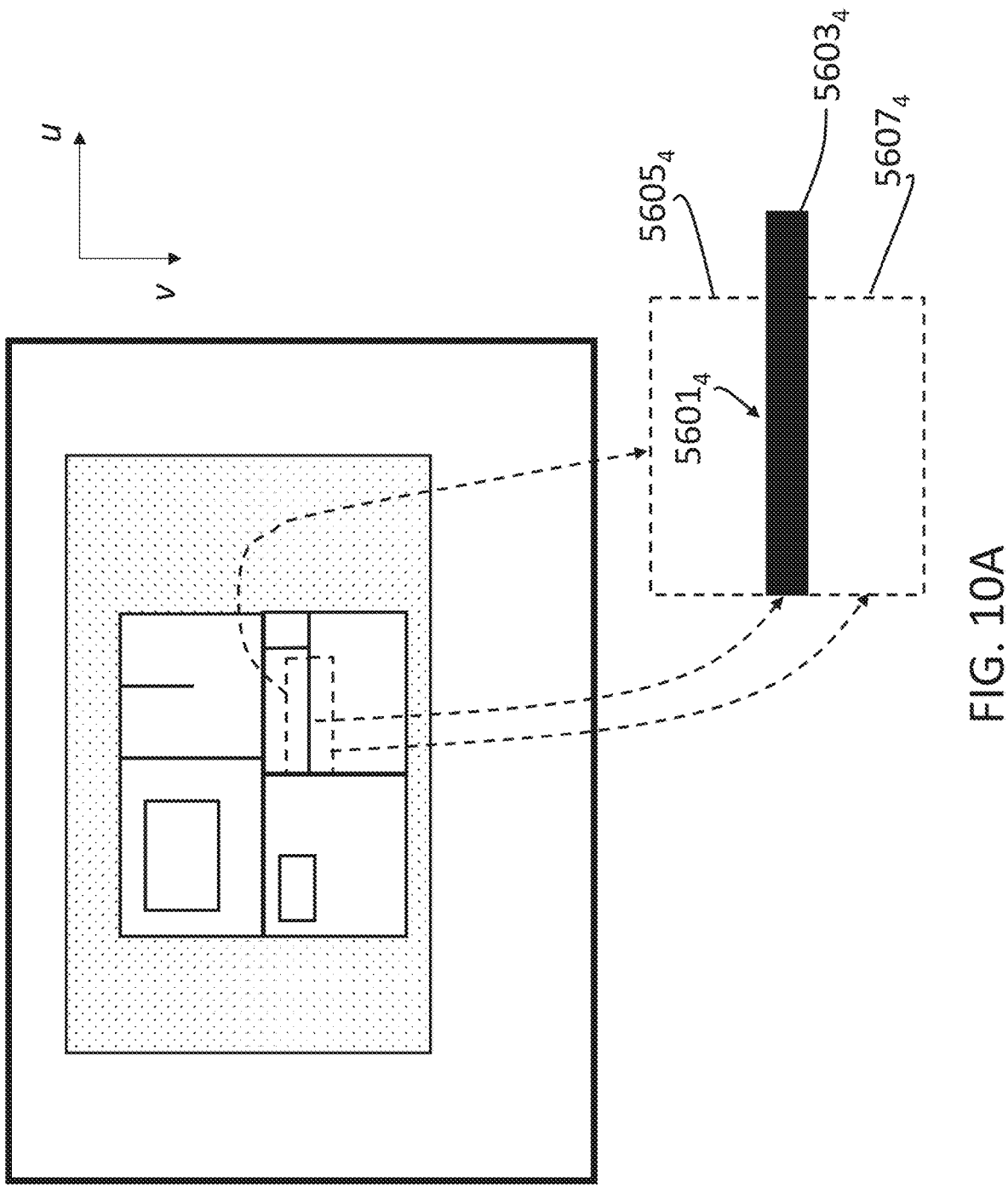
FIGS. 10A-10C illustrate image intensity profiles around a candidate edge, according to embodiments hereof.
Figure 10B:
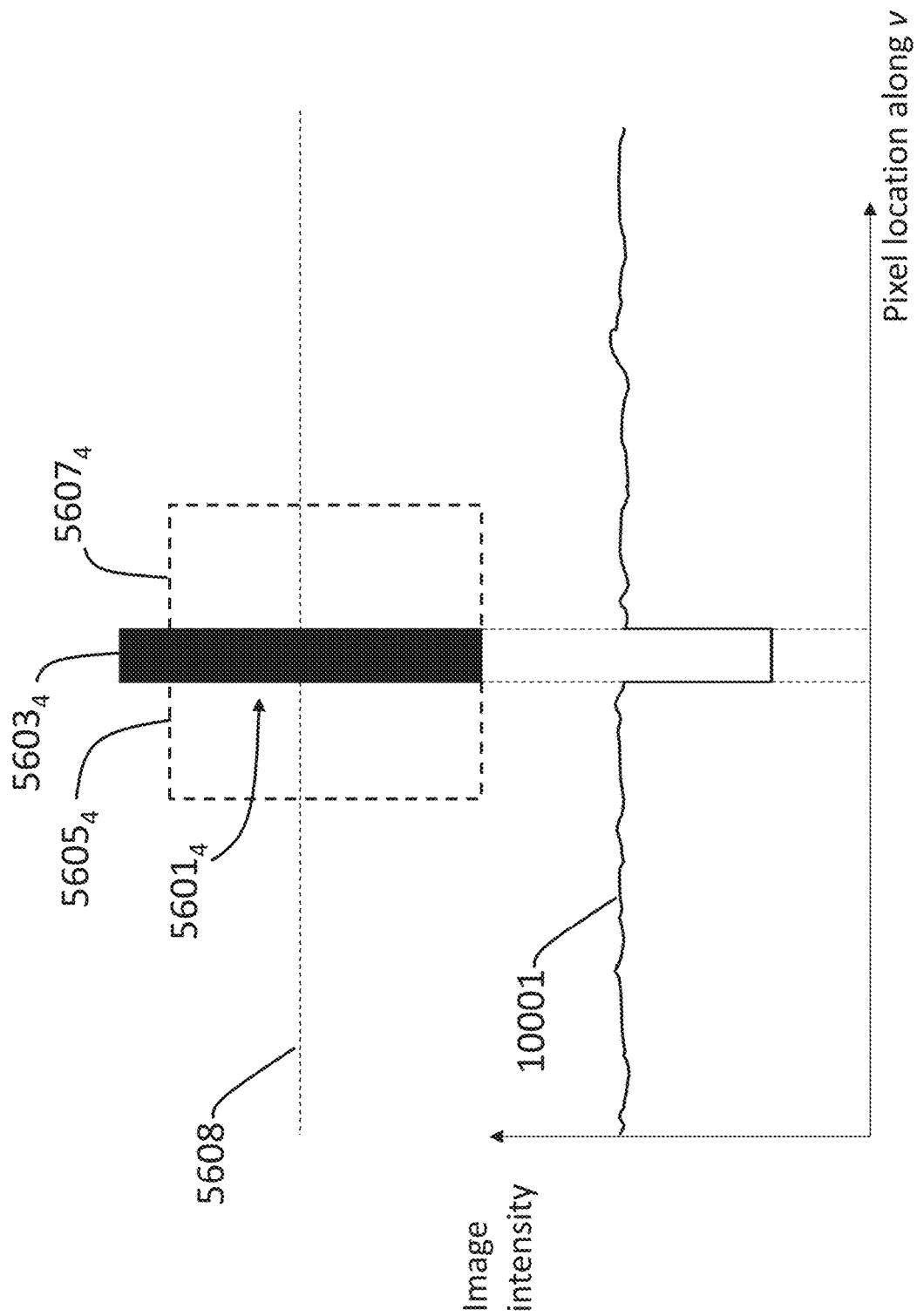
Figure 10C:
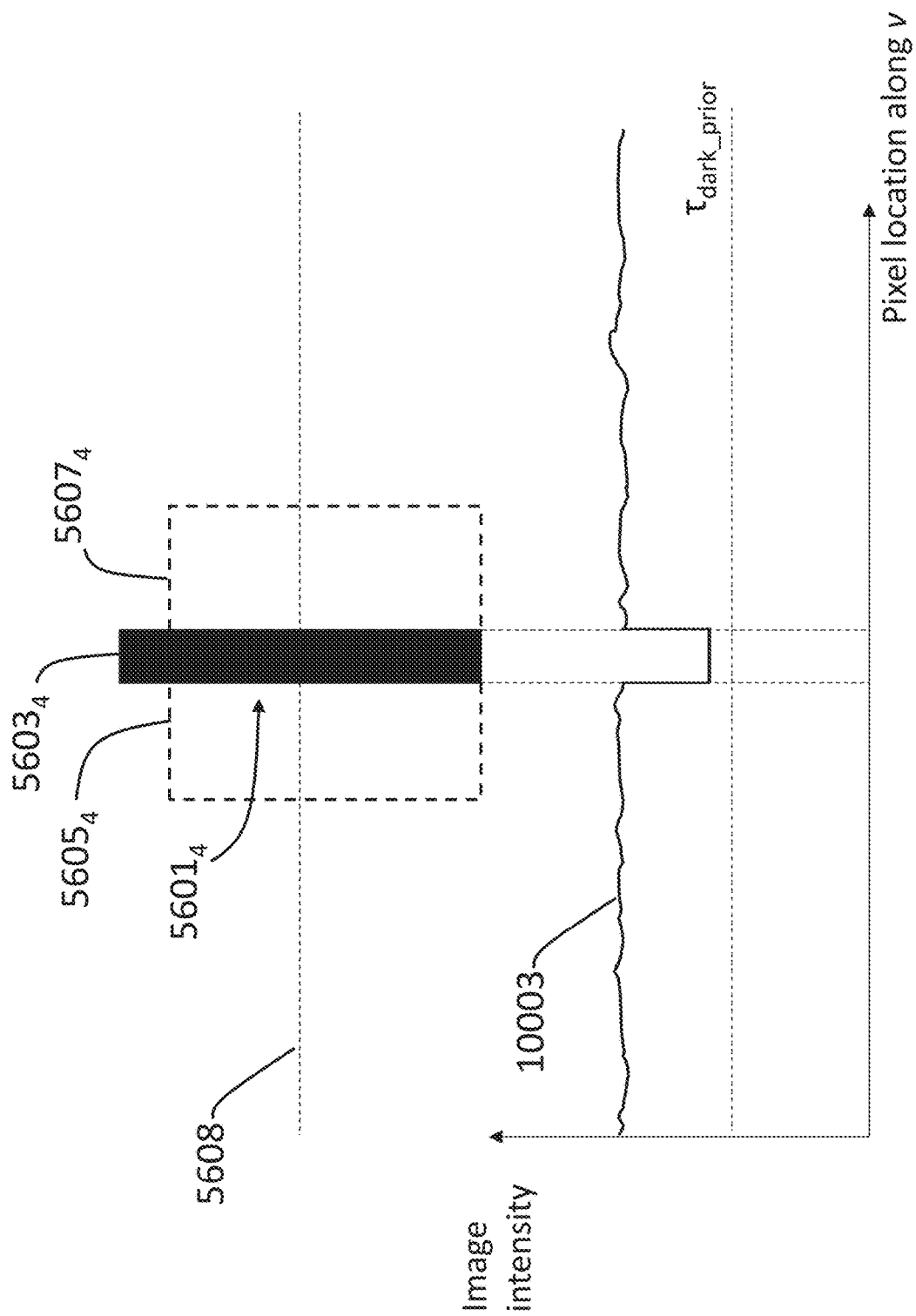

FIGS. 10A-10C depict examples for determining whether a candidate edge $5601_4$ and/or an image region $5603_4$ satisfies the defined darkness condition. The image region $5603_4$ may represent part of the visual markings 3512 of FIG. 3B, such as a visible line printed on a top surface of the object 3510. In this example, the image region $5603_4$ may be darker than immediately adjacent image regions, such as image regions $5605_4$ and $5607_4$. The candidate edge $5601_4$ may be formed based on a border between the darker image region $5603_4$ and the immediately adjacent region $5605_4$.

FIG. 10B depicts the image region $5603_4$ having an image intensity profile 10001 that fails to satisfy a defined spiked intensity profile criterion, because the image intensity profile 10001 does not change within the image region $5603_4$ in a manner in which the image intensity profile 10001 increases in darkness as a function of location toward a peak level of darkness, and then decreases in darkness away from the peak level of darkness. The image intensity profile 10001 in this example may describe pixel intensity values as a function of pixel location along an axis 5608, which may be aligned with a width dimension of the image region $5603_4$. As stated above, the spiked intensity profile criterion may correspond with an expectation that a physical gap between physical edges of objects may appear darker at a middle of the physical gap relative to a periphery of the physical gap. Thus, an image region that represents the physical gap may have an image intensity profile that changes as a function of image location within the image region, and that more specifically increases in darkness as a function of image location along a particular direction, from an image location corresponding to a periphery of the physical gap to an image location corresponding to the middle of the physical gap, and that then decreases in darkness as a function of location along the same direction. More particularly, the image intensity profile may have a spiked increase in darkness or a spiked reduction in image intensity in the image region representing the physical gap. In an embodiment, an image region which instead represents a visual line or other visual marking may lack such an image intensity profile, and may instead have a more uniform level of darkness within the image region. Thus, as illustrated in FIG. 10B, an image region $5603_4$ that represents part of the visual markings 3512 may have an image intensity profile 10001 that is more uniform within the image region $5603_4$, such that the profile 10001 does not substantially change within the image region $5603_4$. Further, the image intensity profile 10001 may have a step-shaped change in image intensity at a border of the image region $5603_4$, from an image intensity associated with a brighter neighboring image region (e.g., $5605_4$) to a uniform image intensity within the image region $5603_4$. Thus, the image intensity profile 10001 does not have a shape that begins by increasing in darkness, along a particular direction that traverses the image region $5603_4$, toward a peak level of darkness, and then switches to decreasing in darkness along that direction. More particularly, the image intensity profile 10001 does not exhibit a spiked decrease in image intensity. Thus, computing system 1100 in this example may determine that the image region $5603_4$ does not satisfy the defined spiked intensity profile criterion, which may lead to a determination that the 2D image 5600 does not satisfy the defined darkness condition at the candidate edge $5601_4$ and/or at the image region $5603_4$.

FIG. 10C depicts the image region $5603_4$ having an image intensity profile 10003 that may fail to satisfy the defined darkness threshold criterion, because the image intensity profile 10003 may indicate that the image region $5603_4$ is not sufficiently dark. More specifically, the computing system 1100 may determine that most or all of the pixel intensity values in the image intensity profile 10003 in the image region $5603_4$ is above the defined darkness threshold $\tau_{dark\_prior}$. Thus, the computing system 1100 in FIG. 10C may determine that the image region $5603_4$ does not satisfy the defined darkness threshold criterion, which may lead to a determination that the image 5600 does not satisfy the defined darkness condition at the candidate edge $5601_4$ and/or the image region $5603_4$. The image intensity profile 10003 may also fail to satisfy the defined spiked intensity profile criterion, as discussed above for FIG. 10B.

In an embodiment, an image region may have a width which is too small for a reliable assessment of whether the image region satisfies the defined spiked intensity profile criterion. For instance, the image region may have a width of only a single pixel, or only a few pixels. In some instances, the computing system 1100 may determine that such an image region does not satisfy the defined darkness condition. In other instances, the computing system 1100 may determine whether the image region satisfies the defined darkness condition based on whether the image region satisfies the defined darkness threshold criterion. In some instances, the computing system 1100 may decide not to evaluate such an image region or associated candidate edge with respect to the defined darkness condition.

As stated above, one aspect of the present disclosure relates to a situation in which the computing system 1100 identifies a plurality of candidate edges based on at least 2D image information, such as the 2D image 5600. In such an embodiment, the plurality of candidate edges may include at least a first candidate edge (e.g., $5601_1/5601_2/5601_3/5601_4$) that is identified based on the 2D image. For example, the first candidate edge may be formed based on a border between two image regions of the 2D image. In some instances, the computing system 1100 may identify the plurality of candidate edges based on 2D image information and 3D image information. In such instances, the plurality of candidate edges may include the first candidate edge which is from the 2D image information, as discussed above, and further include a second candidate edge (e.g., $5701_1$ of FIG. 6B) which is identified based on the 3D image information.

Figure 11B:
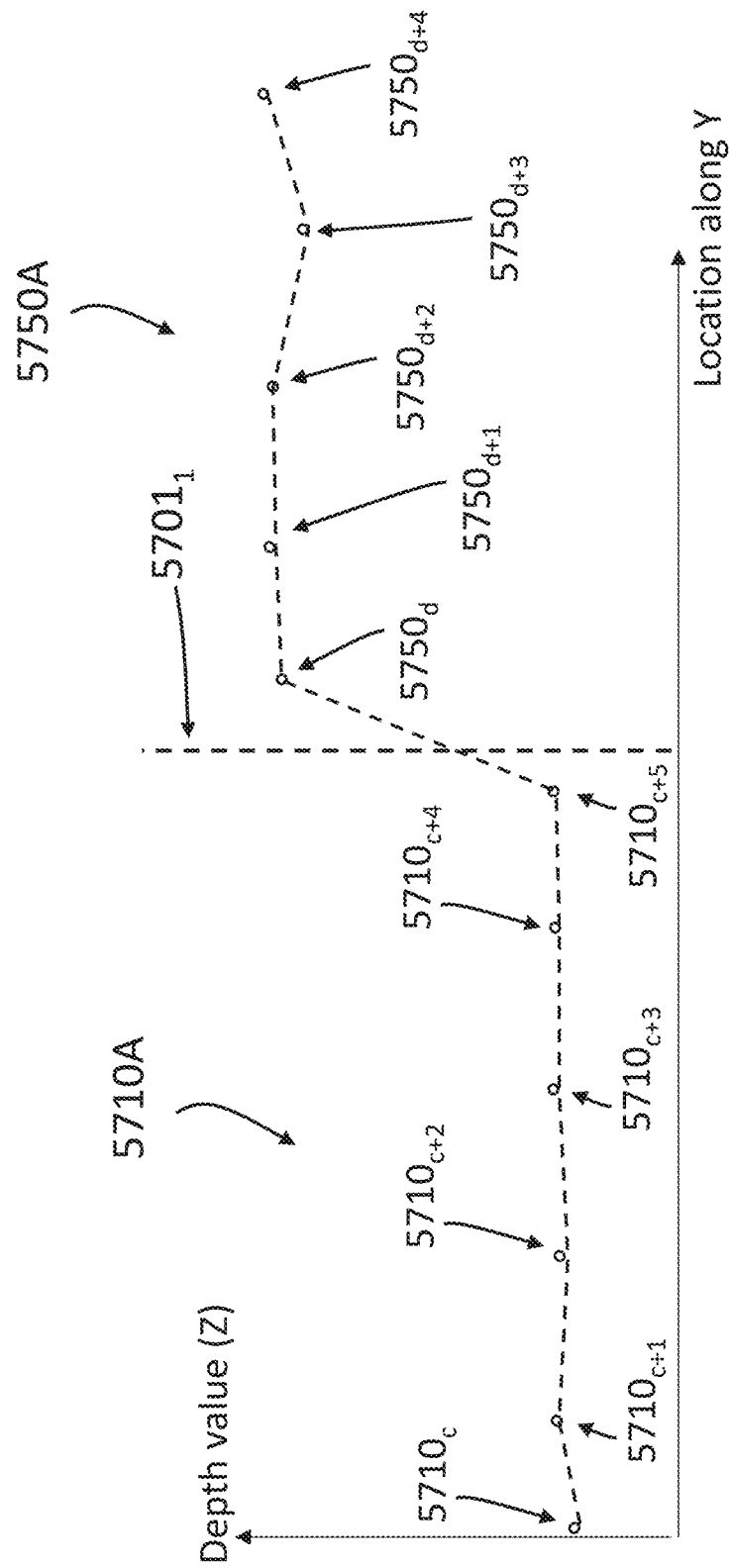

As an example, FIGS. 11A-11B illustrate the computing system 1100 identifying, as a second candidate edge of a plurality of candidate edges, candidate edge $5701_1$ based on the 3D image information 5700. In this example, the computing system 1100 may identify the candidate edge $5701_1$ based on detecting a sharp change in depth at the candidate edge $5701_1$ between a first portion 5710A and a second portion 5750A of the 3D image information 5700. The first portion 5710A may represent, e.g., a region of locations on a top surface of the object 3510 of FIGS. 3A-3C, while the second portion 5750A may represent, e.g., a region of locations on a top surface of the object 3550. More particularly, as depicted in FIG. 11B, the first portion 5710A of the 3D image information may include respective depth values for locations $5710_c$ through $5710_{c+5}$ on a top surface of the object 3510, while the second portion 5750A may include respective depth values for locations $5750_d$ through $5750_{d+4}$ on a top surface of the object 3550. In this example, the locations $5710_c$ through $5710_{c+5}$ and $5750_d$ through $5750_{d+4}$ may be a series of locations aligned along the Y-axis of FIG. 11A.

In an embodiment, the computing system 1100 may identify the candidate edge $5701_1$ of FIG. 11B based on detecting a sharp change in depth between two consecutive or otherwise adjacent locations of a series of locations described by the 3D image information 5700. Such a sharp change may be referred to as a depth discontinuity condition. The sharp change may be detected when, e.g., a difference between respective depth values of the two locations exceeds a defined depth difference threshold. For example, the computing system 1100 may determine that a difference between a depth value of location $5710_{c+5}$ and a depth value of location $5750_d$ exceeds the defined depth difference threshold. As a result, the computing system 1100 may identify the candidate edge $5701_1$ based on these two locations $5710_{c+5}$, $5750_d$. For instance, the candidate edge $5701_1$ may be identified to include a location which is between the locations $5710_{c+5}$, $5750_d$ on the Y-axis.

Figure 11C:
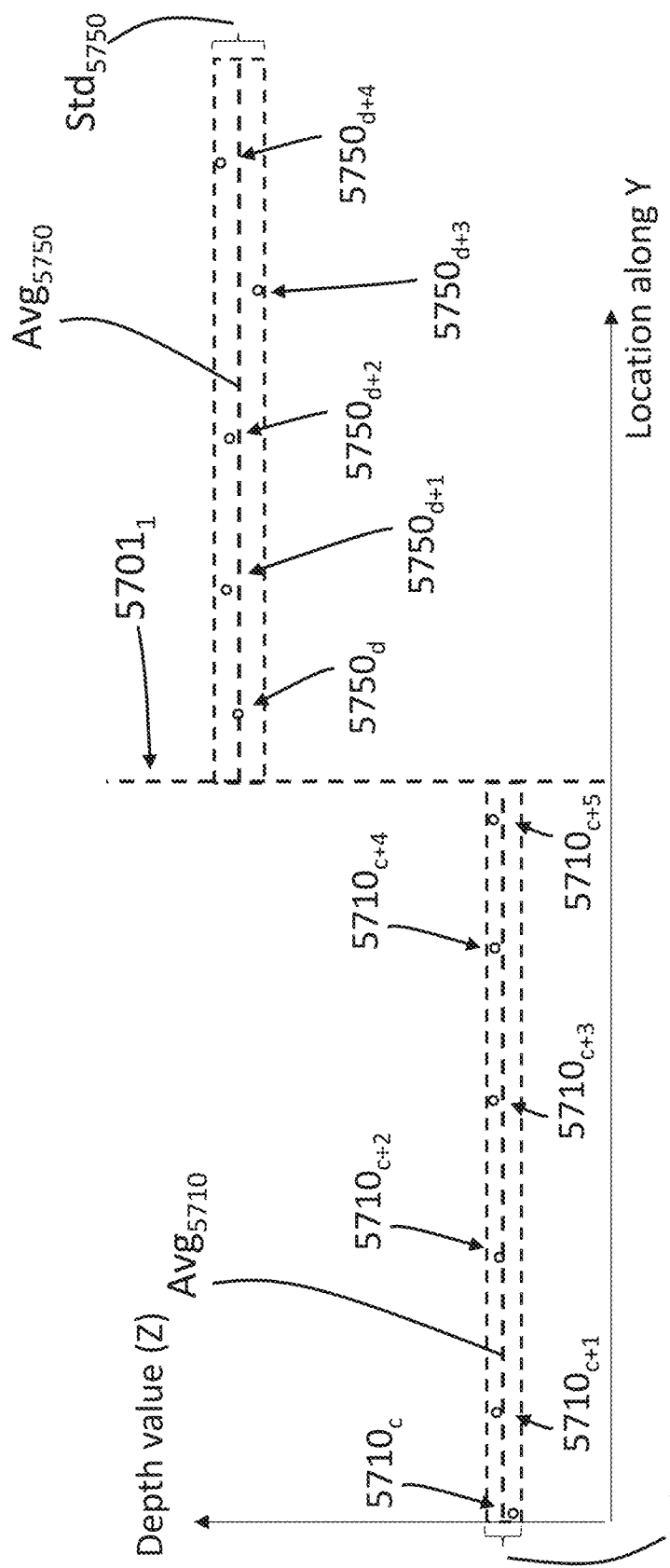

In an embodiment, the computing system 1100 may identify a candidate edge by identifying, based on the 3D image information, two surfaces which have a depth difference that exceeds the defined depth difference threshold. For example, as illustrated in FIG. 11C, the computing system 1100 may identify a first surface of the group of objects 3510-3550 based on a first set of locations which are described by the 3D image information 5700, wherein the first set of locations have respective depth values that do not deviate from each other by more than a defined measurement variance threshold. Similarly, the computing system 1100 may identify a second surface of the group of objects 3510-3550 based on a second set of locations which are described by the 3D image information 5700, wherein the second set of locations have respective depth values that do not deviate from each other by more than the defined measurement variance threshold. In the example of FIG. 11C, the first set of locations may include locations $5710_c$ through $5710_{c+5}$, which may represent a top surface of the object 5710, while the second set of locations may include locations $5750_d$ through $5750_{d+4}$, which may represent a top surface of the object 5750.

In this embodiment, the defined measurement variance threshold may describe an effect of imaging noise, manufacturing tolerance, or other factor which may introduce random fluctuation in depth measurements made by a camera (e.g., 3200B). Such sources of random fluctuation cause depth values of various locations to have some natural variance, even if the various locations are part of a common surface and actually have the same depth relative to the camera. In some instances, the defined measurement variance threshold may be equal to or based on a nominal standard deviation that is used to describe the expected random fluctuation in the depth measurements, or more generally how susceptible the camera is to noise or other source of error. The nominal standard deviation may describe a baseline standard deviation or other form of variance that is expected for depth values or other depth information generated by the camera. The nominal standard deviation, or more generally the defined measurement variance threshold, may be a value which is stored in, e.g., the non-transitory computer-readable medium 1120, and may be a predefined value or a dynamically defined value. In an embodiment, if a set of locations have respective depth values which do not deviate from each other by more than the defined measurement variance threshold, the computing system 1100 may determine that the set of locations are part of a common surface. In a more specific embodiment, the computing system 1100 may determine that the set of locations are part of a common surface if a standard deviation (e.g., $Std_{5710}$ or $Std_{5750}$) of their respective depth values is less than the defined measurement variance threshold.

In the above embodiment, the computing system 1100 may identify a candidate edge from 3D image information based on two surfaces which have a sufficient depth difference. For example, the first set of locations in FIG. 11C, which describe a top surface of the object 5710, may have or otherwise be associated with an average depth value $Avg_{5710}$. Similarly, the second set of locations, which describe a top surface of the object 5750, may have or otherwise be associated with an average depth value $Avg_{5750}$. The computing system 1100 may determine whether a difference between $Avg_{5710}$ and $Avg_{5750}$ is greater than or equal to a defined depth difference threshold. In some instances, the defined depth difference threshold may be determined as a multiple of the defined measurement variance threshold (e.g., twice the defined measurement variance threshold, or five times the defined measurement variance threshold). If the difference between $Avg_{5710}$ and $Avg_{5750}$ associated with the two surfaces is greater than or equal to the defined depth difference threshold, the computing system 1100 may determine that a depth discontinuity condition is satisfied. More particularly, the computing system 1100 may determine that a candidate edge (e.g., $5701_1$) exists at a location between the two surfaces, and more specifically identify the candidate edge based on a location at which there is a transition between the two surfaces.

Figure 11D:
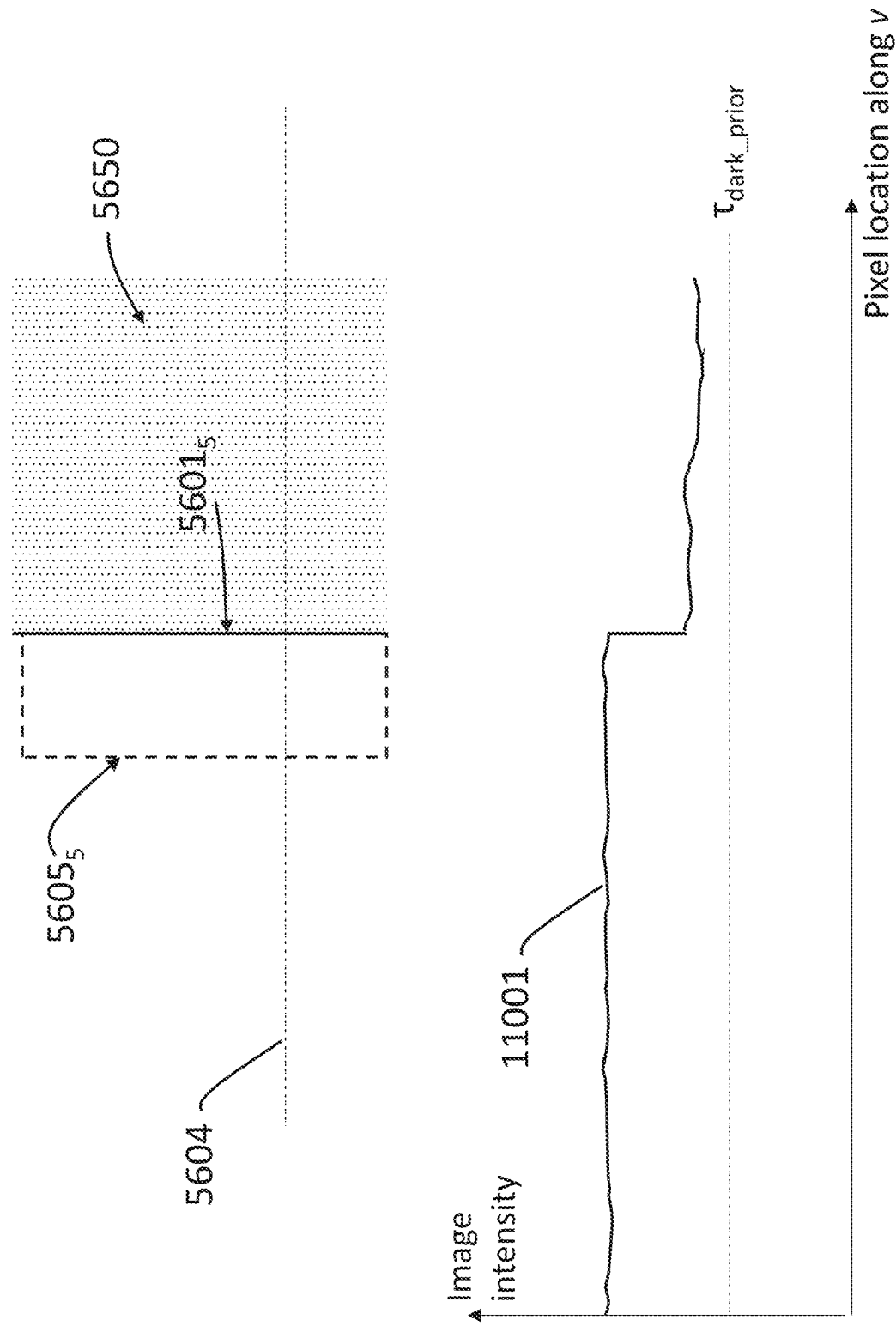
FIG. 11D illustrates an image intensity profile of an image that represents the physical edge, according to embodiments hereof.
Figure 12A:
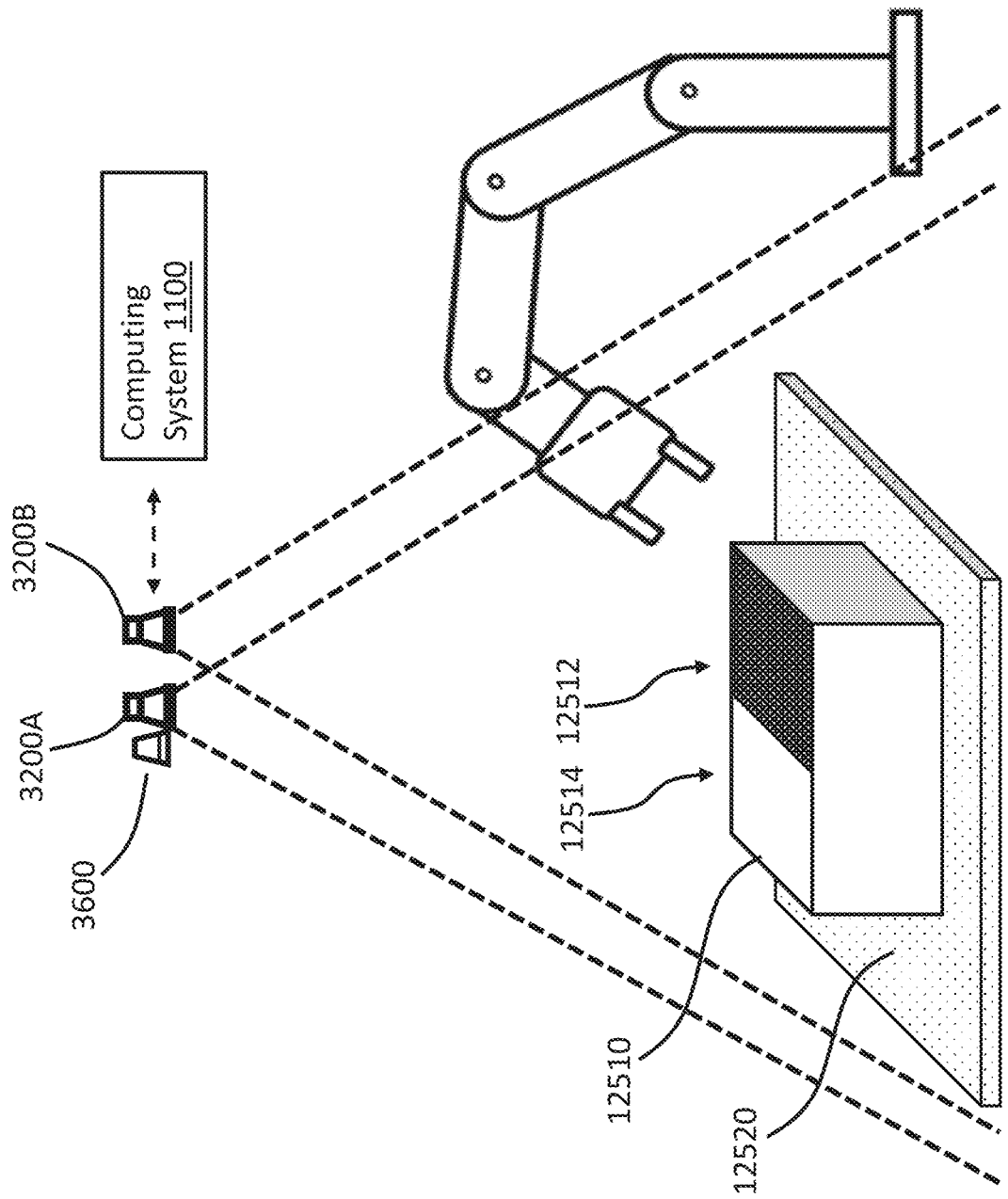
Figure 12C:
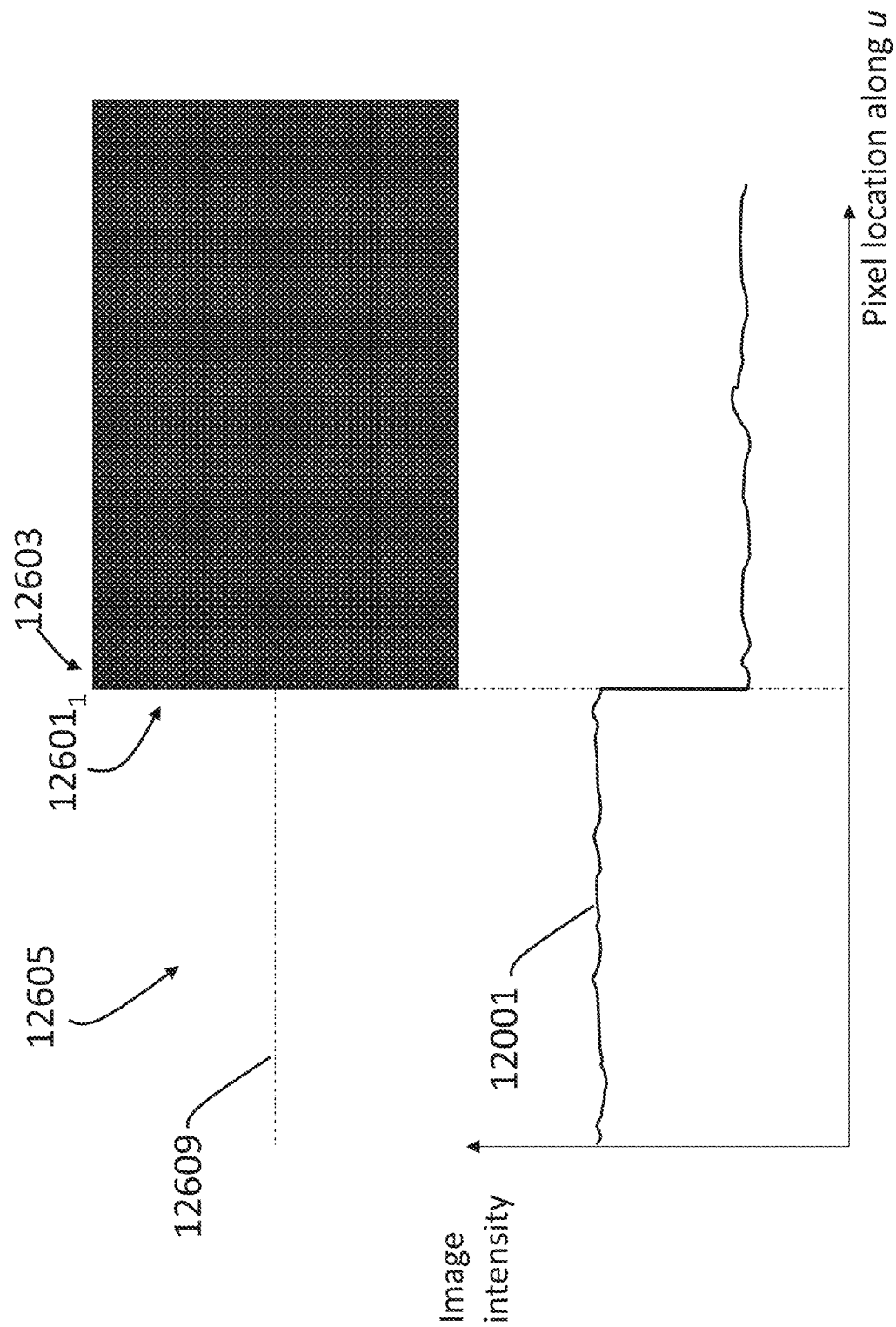

As stated above, one aspect of the present disclosure relates to using 2D image information and 3D image information to compensate for each other, such that the 3D image information may compensate for limitations in the 2D image information (and vice versa). In some instances, physical edges detected from the 3D image information may be associated with a higher level of confidence than physical edges detected solely from the 2D image information. In some instances, if a physical edge (e.g., 3510A of FIG. 3B) is represented in both the 2D image information and the 3D image information, the computing system 1100 may identify a candidate edge (e.g., $5601_5$) that represents the physical edge in the 2D image information, and identify a corresponding candidate edge (e.g., $5701_1$) that represents the physical edge in the 3D image information. As stated above, the corresponding candidate edges may map to each other. For instance, the candidate edge in the 3D image information (e.g., $5701_1$) may map to the candidate edge (e.g., $5601_5$) in the 2D image information. The candidate edge (e.g., $5601_5$) may be formed based on a border between two image regions, such $5605_5$ and 5650. In some circumstances, however, the computing system 1100 may be unable to determine, with a high level of confidence, whether the candidate edge (e.g., $5601_5$) from the 2D image information corresponds to an actual physical edge. For example, as illustrated in FIG. 11D, the 2D image 5600 may have a step-shaped change in image intensity at the candidate edge $5601_5$. In this example, the computing system 1100 may determine that the 2D image 5600 does not satisfy the defined darkness condition at the candidate edge $5601_5$, or more specifically at the two image regions $5605_5$ and 5650. Thus, the computing system 1100 may determine that there is not a sufficiently high confidence level associated with the candidate edge $5601_5$ representing a physical edge.

In such circumstances, the computing system 1100 may use the 3D image information to provide additional input. More particularly, the computing system 1100 may identify the candidate edge $5701_1$ based on the 3D image information, as discussed above with respect to FIGS. 11A-11C, wherein the candidate edge $5601_5$ in the 2D image information may map or otherwise correspond to the candidate edge $5701_1$ in the 3D image information. In some instances, because the candidate edge $5701_1$ is identified based on depth information, the computing system 1100 may determine that there is a sufficiently high likelihood of the candidate edge $5701_1$ representing a physical edge, namely physical edge 3510A of FIG. 3B. Thus, the 2D image information may not lead to detection of the physical edge 3510A, or may lead to detection of the physical edge 3510A with a low level of confidence, while the 3D image information may be used by the computing system 1100 to detect the physical edge 3510A with a higher level of confidence.

Returning to FIG. 4, the method 4000 may in an embodiment include a step 4008, in which the computing system 1100 may select a subset of the plurality of candidate edges (e.g., a subset of the plurality of candidate edges $5601_1$ to $5601_n$) to form a selected subset of candidate edges for representing the physical edges for a group of objects (e.g., 3510-3540). In an embodiment, this step may involve excluding, from the subset, one or more candidate edges which are each likely to be a false edge. The one or more candidate edges that are likely to be a false edge may be filtered out from the subset of candidate edges, or more generally ignored from further consideration for representing physical edges of the group of objects (e.g., 3510-3540). In one example, the computing system 1100 may select the subset of the plurality of candidate edges by determining which candidate edge(s) to filter out from the plurality of candidate edges, wherein the plurality of candidate edges, after being filtered, form the resulting subset. In one example, if the plurality of candidate edges are represented or described by the edge detection information 1126 of FIG. 2C, filtering out a candidate edge may involve deleting information about that candidate edge from the edge detection information 1126.

As stated above, the plurality of candidate edges (e.g., $5601_1$ to $5601_n$, or $5601_1$ to $5601_n$ and $5701_1$ to $5701_n$) may include at least a first candidate edge (e.g., $5601_1$ or $5601_4$) which is formed based on a border between a first image region and a second image region darker than the first image region. Further, the first candidate edge may be identified from the 2D image information. In an embodiment, step 4008 may involve determining whether to include the first candidate edge in the subset (also referred to as a subset of candidate edges). Including the first candidate edge (e.g., $5601_1$) in the subset may allow the first candidate edge to be used to represent at least one physical edge (e.g., 3510B) of a group of objects in a camera field of view. More specifically, if the first candidate edge (e.g., $5601_1$) is included in the subset, such an inclusion may be an indication that the first candidate edge (e.g., $5601_1$) is still a candidate that remains under consideration for representing at least one of the physical edges of the group of objects. In other words, the computing system 1100 may determine whether to retain the first candidate edge as a candidate for representing the at least one physical edge. If the computing system 1100 determines to retain the first candidate edge as such a candidate, it may include the first candidate edge in the subset (which may also be referred to as a selected subset of candidate edges). This determination may be part of the step of selecting the subset of the plurality of candidate edges, and may be performed based on whether the image satisfies the defined darkness condition at the first candidate edge. In some instances, inclusion of the first candidate edge in the subset may be an indication that the first candidate edge has a sufficiently low likelihood of being a false edge. In some instances, inclusion of the first candidate edge in the subset may be an indication that the first candidate edge (e.g., $5601_1$) has a sufficiently high confidence level of corresponding to an actual physical edge of the group of objects, such that the computing system 1100 will use the first candidate edge for representing at least one physical edge of the group of objects, or will at least continue to consider the first candidate edge for representing at least one physical edge of the group of objects. If the computing system 1100 determines not to include the first candidate edge (e.g., $5601_4$) in the subset, such that the first candidate edge (e.g., $5601_4$) is filtered or otherwise excluded from the subset, such an exclusion may be an indication that the first candidate edge (e.g., $5601_4$) is no longer a candidate for representing at least one of the physical edges of the group of objects. In some instances, exclusion of the first candidate edge from the subset may be an indication that the first candidate edge (e.g., $5601_4$) is likely a false edge.

In an embodiment, the determining of whether to include the first candidate edge in the selected subset of candidate edges may be based on whether the image information (e.g., 5600) satisfies the defined darkness condition at the first candidate edge, as stated above. In some implementations, if the image information satisfies the defined darkness condition at the first candidate edge, such a result may indicate that the first candidate edge has a sufficiently low likelihood of being a false edge, because the first candidate edge in such a situation is likely associated with an image region that represents a physical gap between two objects. Thus, the first candidate edge may likely represent a physical edge which forms one side of the physical gap. In such a situation, the computing system 1100 may determine to include the first candidate edge in the selected subset. In some instances, if the image information does not satisfy the defined darkness condition at the first candidate edge, the computing system 1100 may determine not to include the first candidate edge in the selected subset. In some instances, if computing system determines that 2D image information does not satisfy the defined darkness condition at the first candidate edge, the computing system 1100 may use 3D image information to further evaluate the first candidate edge. For instance, if the computing system 1100 determines that the 2D image 5600 does not satisfy the defined darkness condition at the candidate edge $5601_5$, the computing system 1100 may determine whether that candidate edge $5601_5$ maps to a candidate edge $5701_1$ described by the 3D image information and whether the candidate edge $5701_1$ in the 3D image information indicates a depth change which is greater than a defined depth difference threshold, as discussed above with respect to FIGS. 11A-11D.

In an embodiment, the method 4000 may perform steps 4006 and/or 4008 multiple times (e.g., via multiple iterations) to determine whether the image information satisfies the defined darkness condition at multiple candidate edges, and to select the subset discussed above based on these determinations. As an example, if the plurality of candidate edges includes at least candidate edges $5601_1$ through $5601_n$, the computing system 1100 may perform step 4006 multiple times to determine whether the 2D image 5600 satisfies the defined darkness condition at, e.g., candidate edges $5601_1$ through $5601_n$. The computing system 1100 may further perform step 4008 multiple times to determine which of these candidate edges will be included in the subset and remain candidates for representing physical edges, and which of these candidate edges will be excluded from the subset and thus are no longer candidates for representing physical edges. For instance, the computing system 1100 may determine that the subset will include candidate edges $5601_1$ and $5601_2$ because the 2D image 5600 satisfy the defined darkness condition at those candidate edges, and that the subset will not include candidate edges $5601_3$ and $5601_4$, because the 2D image does not satisfy the defined darkness condition at those candidate edges. In some situations, the computing system 1100 may determine not to include a candidate edge $5601_5$ in the subset, because the 2D image 5600 does not satisfy the defined darkness condition at the candidate edge. In some situations, the computing system 1100 may determine to still include the candidate edge $5601_5$ in the subset if the candidate edge $5601_1$ maps to a candidate edge $5701_1$ in the 3D image information that indicates a depth change which exceeds the depth difference threshold.

In an embodiment, the method 4000 may include a step in which the computing system 1100 outputs a robot interaction movement command. The robot interaction movement command may be used for robot interaction between a robot (e.g., 3300) and at least one object of the group of objects (e.g., 3510-3550). The robot interaction may involve, e.g., the robot (e.g., 3300) performing a de-palletization operation or other operation in which the robot picks up an object (e.g., box) from a pallet and moves the object to a destination location.

In an embodiment, the robot interaction movement command may be generated based on the selected subset of candidate edges of step 4008. For example, the computing system 1100 may use the selected subset of candidate edges to distinguish between individual objects from among the group of objects described by the image information. In some instances, the computing system 1100 may use the selected subset to perform segmentation of the image information. For instance, if the image information includes a point cloud, the computing system may use the selected subset of candidate edges to perform point cloud segmentation, which may involve identifying a portion of the point cloud that corresponds to an individual object among a group of objects. Point cloud segmentation is discussed in more detail in U.S. patent application Ser. No. 16/791,024, the entire content of which is incorporated by reference herein. In one example, if the image information includes 2D image information, the computing system 1100 may use the selected subset of candidate edges to isolate a portion of the 2D image information that corresponds to an individual object among a group of objects. The isolated portion may, e.g., be used as a target image or target image portion, which is used to perform an object recognition operation or an object registration operation (e.g., by module 1128). Object registration and object recognition are discussed in more detail in U.S. patent application Ser. No. 16/991,466, and in U.S. application Ser. No. 17/193,253, the entire contents of which are incorporated by reference herein. In such an example, the robot interaction movement command may be generated based on a result of the of the object recognition operation or object registration operation. For instance, the object recognition operation may yield a detection hypothesis, which may be an estimate of what object or object type is represented by the image information, or by a portion thereof. In some instances, the detection hypothesis may be associated with an object recognition template, which may, e.g., include information which describes a physical structure of one of the objects 3510-3540. This information may be used by the computing system 1100 to plan movement of the robot (e.g., 3300) for picking up and moving the object (e.g., via module 1129).

Figure 13A:
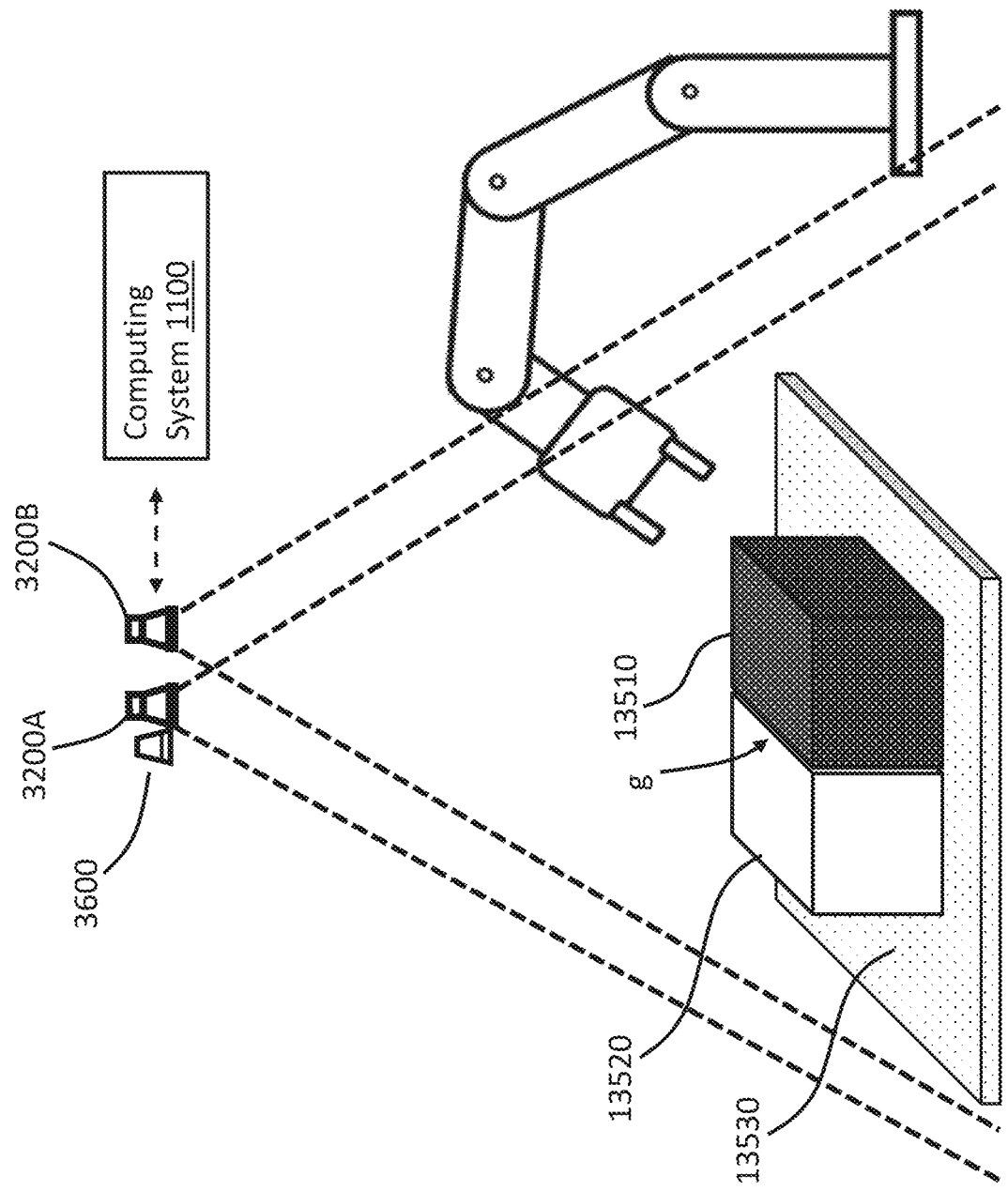
FIGS. 13A-13C illustrate an image intensity profile for an image that represents two objects which are separated by a physical gap, and in which one object is darker than the other object, according to an embodiment hereof.

While the above steps of method 4000 are illustrated with respect to the objects 3510-3550 of FIGS. 3A-3C, FIG. 12A illustrates the above steps with respect to object 12510, while FIG. 13A illustrates the above steps with respect to objects 13510-13520. In an embodiment, the object 12510 of FIG. 12A may be a box having a top surface with a first physical region 12512 that is darker than a second, immediately adjacent physical region 12514. For instance, the first physical region 12512 may have more ink printed thereon relative to the second physical region 12514. The object 12510 may be disposed on object 12520, which may be a pallet on which the box is disposed. FIG. 12B illustrates a 2D image 12600 which may be generated to represent the object 12510. More particularly, the 2D image 12600 may include a first image region 12603 that represents the first physical region 12512, and include a second image region 12605 that represents the second physical region 12514. The computing system 1100 in this embodiment may identify a first candidate edge $12601_1$ based on a border between the first image region 12603 and the second image region 12605.

In an embodiment, the computing system 1100 may determine that the 2D image 12600 does not satisfy a defined darkness condition at the first candidate edge $12601_1$. For instance, the computing system 1100 may determine that the 2D image 12600 has an image intensity profile 12001 which has a step-shaped change in image intensity at the first candidate edge $12601_1$. The image intensity profile may be measured along an axis 12609 that extends along a u-axis of the image. In some implementations, the computing system 1100 may determine that the image intensity profile 12001, or more specifically the image regions 12603 and 12605, do not satisfy the spiked intensity profile criterion. The computing system 1100 may further determine that the defined darkness condition is not satisfied at the first candidate edge $12601_1$. As a result, the computing system 1100 may filter out the first candidate edge $12601_1$ from edge detection information 1126.

Figure 13B:
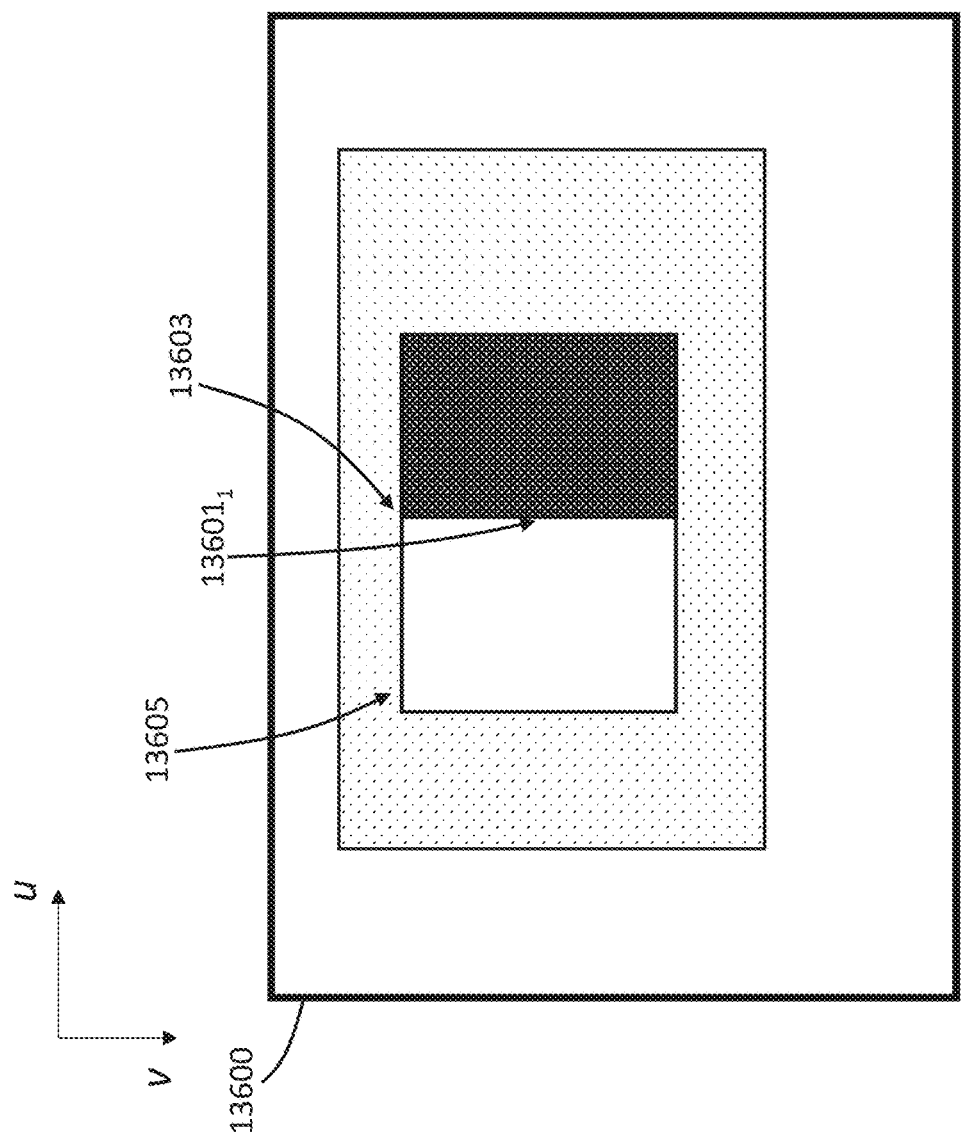

In the embodiment of FIG. 13A, objects 13510 and 13520 may each be a box, and may be disposed on an object 13530, which may be a pallet or other platform. In this embodiment, the object 13510 may be darker than the object 13520 (e.g., as a result of being made of a darker cardboard or other material). Further, the two objects may be separated by a narrow physical gap g. FIG. 13B illustrates a 2D image 13600 that includes a first image region 13603 that represents the first object 13510, and a second image region 13605 that represents the second object 13530. The computing system 1100 in this embodiment may identify a candidate edge $13601_1$ based on a border between the two image regions 13605, 13605.

Figure 13C:
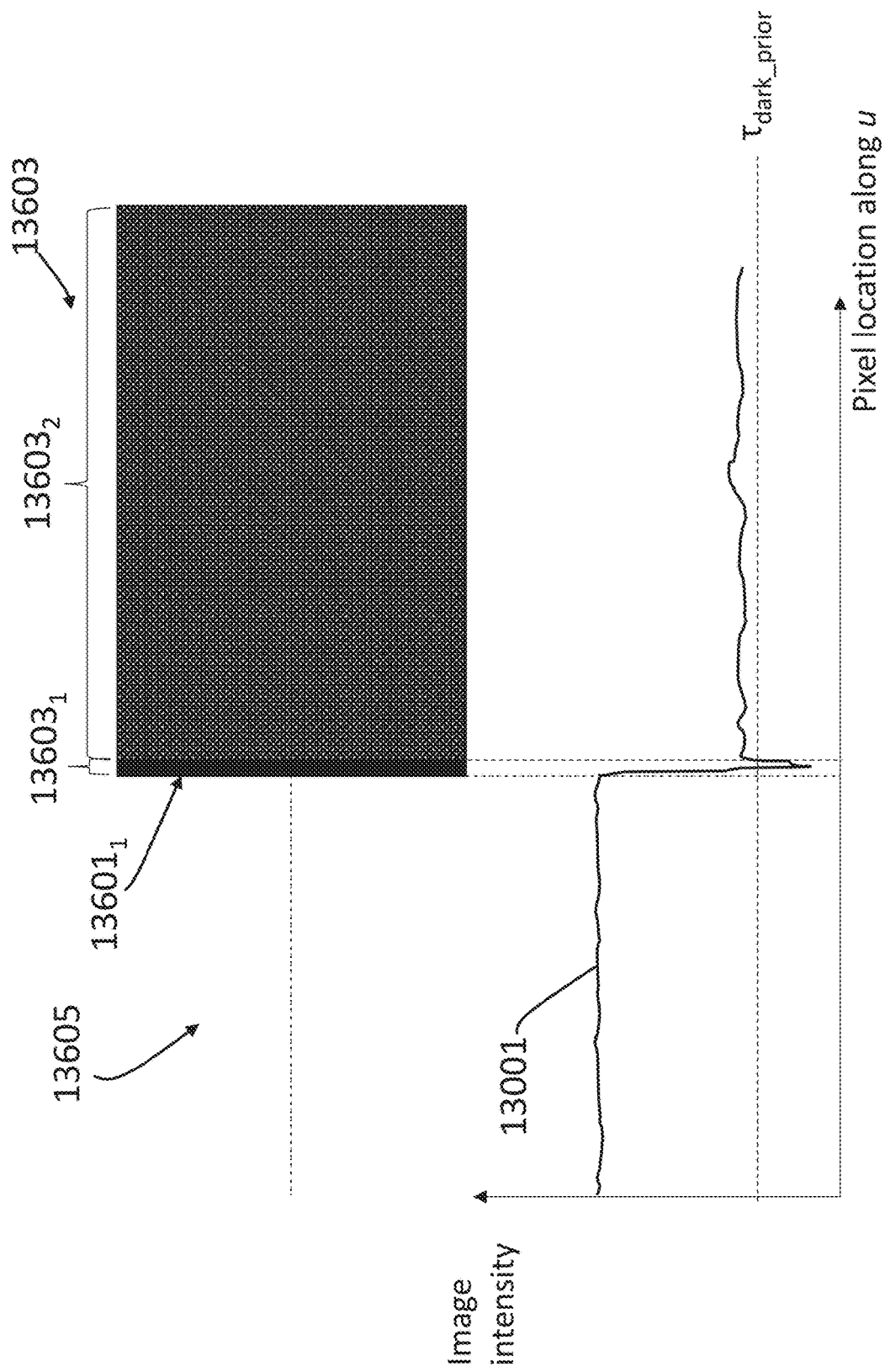

As illustrated in FIGS. 12B and 13B, the images 12600 and 13600 may have similar appearances. However, as illustrated in FIG. 13C, the image 13600 may have an image intensity profile that includes a spiked reduction in image intensity. More particularly, the image region 13603 of the image 13600 may more specifically include an image region $13603_1$ for representing the physical gap g between the objects 13510, 13520, and include an image region $13603_2$ for representing the object 13520. In this embodiment, the image region $13603_1$ may include the spiked reduction in image intensity, and may have a minimum pixel intensity value which is less than a defined darkness threshold. Thus, the computing system 1100 may determine that the image region $13603_1$ satisfies the defined spiked intensity profile criterion and/or the defined darkness threshold criterion. As a result, the computing system 1100 may determine that the image 13600 satisfies the defined darkness condition at the first candidate edge $13603_1$. The computing system 1100 may thus determine to use the first candidate edge $13603_1$ to represent one of the physical edges of the objects 13510, 13520.

Additional Discussion of Various Embodiments

Embodiment 1 includes a computing system or a method performed by the computing system. The computing system may comprise a communication interface and at least one processing circuit. The communication interface may be configured to communicate with a robot and with a camera having a camera field of view. The at least one processing circuit may be configured, when a group of objects are in the camera field of view, to perform the following: receiving image information representing the group of objects, wherein the image information is generated by the camera; identifying, from the image information, a plurality of candidate edges associated with the group of objects, wherein the plurality of candidate edges are or include respective sets of image locations or physical locations that form respective candidates for representing physical edges of the group of objects; determining, when the plurality of candidate edges include a first candidate edge which is formed based on a border between a first image region and a second image region, whether the image information satisfies a defined darkness condition at the first candidate edge, wherein the first image region is darker than the second image region, wherein the first image region and the second image region are respective regions described by the image information; selecting a subset of the plurality of candidate edges to form a selected subset of candidate edges for representing the physical edges of the group of objects, wherein the selecting includes: determining, based on whether the image information satisfies the defined darkness condition at the first candidate edge, whether to retain the first candidate edge as a candidate for representing at least one of the physical edges of the group of objects by including the first candidate edge in the selected subset of candidate edges; and outputting a robot interaction movement command, wherein the robot interaction movement command is for robot interaction between the robot and at least one object of the group of objects, and is generated based on the selected subset of candidate edges. In this embodiment, the at least one processing circuit is configured to determine that the image information satisfies the defined darkness condition at the first candidate edge in response to a determination that the first image region satisfies at least one of a defined darkness threshold criterion or a defined spiked intensity profile criterion. Further in this embodiment, the at least one processing circuit is configured to determine whether the first image region satisfies the defined darkness threshold criterion by determining whether the first image region has at least one portion which is darker in image intensity than a defined darkness threshold. Further in this embodiment, the at least one processing circuit is configured to determine whether the first image region satisfies the spiked intensity profile criterion by determining whether the first image region has an image intensity profile which includes: (i) a first profile portion in which image intensity increases in darkness within the first image region as a function of location, to reach a peak level of darkness at a location within the first image region, followed by (ii) a second profile portion in which image intensity decreases in darkness within the first image region, away from the peak level of darkness, as a function of location.

Embodiment 2 includes the computing system of embodiment 1, wherein the first image region is a first pixel region that forms a band of pixels which represents a physical gap between a first object and a second object of the group of objects, wherein the second image region is a second pixel region immediately adjacent to the first pixel region, such that the border which forms the first candidate edge is between the first pixel region and the second pixel region.

Embodiment 3 includes the computing system of embodiment 2, wherein the at least one processing circuit is configured to determine whether the first image region satisfies the defined darkness threshold criterion by determining whether the first image region has pixel intensity values that are less than the defined darkness threshold.

Embodiment 4 includes the computing system of embodiment 2 or 3, wherein the image intensity profile of the first image region describes respective pixel intensity values for a series of pixels extending across a width dimension of the first image region, and wherein the at least one processing circuit is configured to determine whether the first image region satisfies the spiked intensity profile criterion by determining whether the image intensity profile has a shape in which the respective pixel intensity values decrease toward a minimum pixel intensity value in the first image region, and then switches to increase away from the minimum pixel intensity value, wherein the minimum pixel intensity value is associated with the peak level of darkness in the first image region.

Embodiment 5 includes the computing system of any one of embodiments 1 to 4, wherein the at least one processing circuit is configured to determine that the first image region satisfies the defined darkness condition only in response to a determination that the first image region satisfies the spiked intensity profile criterion.

Embodiment 6 includes the computing system any one of embodiments 1 to 5, wherein the at least one processing circuit is configured to determine that the first image region satisfies the defined darkness condition only in response to a determination that the first image region satisfies the defined darkness threshold criterion.

Embodiment 7 includes the computing system of embodiment 1, wherein the at least one processing circuit is configured to determine that the first image region satisfies the defined darkness condition only in response to a determination that the first image region satisfies both the defined darkness threshold criterion and the defined spiked intensity profile criterion.

Embodiment 8 includes the computing system of any one of embodiments 1-7, wherein the at least one processing circuit is configured, when the image information includes 2D image information and 3D image information, to identify the first candidate edge, which is formed based on the border between the first image region and the second image region, based on the 2D image information, wherein the 3D image information includes depth information for locations in the camera field of view.

Embodiment 9 includes the computing system of embodiment 8, wherein the at least one processing circuit is configured to perform the determining of whether to retain the first candidate edge as a candidate for representing at least one of the physical edges of the group of objects when: (i) the 3D image information is missing depth information for one or more locations corresponding to the first candidate edge, or (ii) a portion of the 3D image information that corresponds to the first candidate image is affected by a level of imaging noise which is greater than a defined noise tolerance threshold.

Embodiment 10 includes the computing system of embodiment 8 or 9, wherein the at least one processing circuit is configured to perform the determining of whether to retain the first candidate edge as a candidate for representing at least one of the physical edges of the group of objects when: the 3D image information does not satisfy a defined depth discontinuity condition at one or more locations corresponding to the first candidate edge.

Embodiment 11 includes the computing system of embodiment 10, wherein the at least one processing circuit is configured to determine that the 3D image information does not satisfy the defined depth discontinuity condition at one or more locations corresponding to the first candidate edge in response to a determination that the 3D image information does not describe a depth change at the one or more locations which exceeds a defined depth difference threshold.

Embodiment 12 includes the computing system of any one of embodiments 8-11, wherein the at least one processing circuit is configured to identify a second candidate edge of the plurality of candidate edges based on the 3D image information.

Embodiment 13 includes the computing system of claim 12, wherein the at least one processing circuit is configured to identify the second candidate edge based on the 3D image information by: identifying a first surface of the group of objects based on a first set of locations described by the 3D image information which have respective depth values that do not deviate from each other by more than a defined measurement variance threshold; identifying a second surface of the group of objects based on a second set of locations described by the 3D image information which have respective depth values that are within the defined measurement variance threshold; determining, as a first average depth value, an average depth value associated with the first surface; determining, as a second average depth value, an average depth value associated with the second surface; identifying, in response to a determination that a difference between the first average depth value and the second average depth value exceeds a defined depth difference threshold, the second candidate edge based on a location at which there is a transition between the first surface and the second surface.

Embodiment 14 includes the computing system of embodiment 12 or 13, wherein the at least one processing circuit is configured to identify the second candidate edge based on the 3D image information when the second candidate edge maps to a candidate edge which is in the 2D image information and which is formed based on a border between two image regions that do not satisfy the defined darkness condition.

Embodiment 15 includes the computing system of embodiments 1-14, wherein the at least one processing circuit is configured to perform an object recognition operation or object registration operation based on the selected subset of candidate edges, wherein the robot interaction movement command is generated based on a result of the object recognition operation or object registration operation.

Embodiment 16 includes the computing system of any one of embodiments claim 1-15, wherein the at least one processing circuit is configured to selecting the subset of the plurality of candidate edges by determining which candidate edges to filter from the plurality of candidate edges, wherein the plurality of candidate edges, after being filtered, forms the subset of candidate edges.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). For instance, method 4000 may be modified to omit step 4002. While various embodiments discussed above relate to steps 4002-4008 of method 4000, another method of the present disclosure may include identifying a candidate edge based on 3D image information, as discussed above with respect to FIG. 11B or 11C, and may omit steps 4002-4008. In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
 a communication interface configured to communicate with a robot and with a camera having a camera field of view;
 at least one processing circuit configured, when a group of objects are in the camera field of view, to perform the following:
   receiving image information representing the group of objects, the image information including 2D image information and 3D image information, wherein the image information is generated by the camera;
   identifying, from the image information, a plurality of candidate edges associated with the group of objects based on the 2D image information and the 3D image information, wherein the plurality of candidate edges are or include respective sets of image locations or physical locations that form respective candidates for representing physical edges of the group of objects;
   determining, when the plurality of candidate edges include a first candidate edge which is formed based on a border between a first image region and a second image region, whether the image information satisfies a defined darkness condition at the first candidate edge, wherein the first image region is darker than the second image region, wherein the first image region and the second image region are respective regions described by the image information;

selecting a subset of the plurality of candidate edges to form a selected subset of candidate edges for representing the physical edges of the group of objects, wherein the selecting includes: determining, based on whether the image information satisfies the defined darkness condition at the first candidate edge, whether to retain the first candidate edge as a candidate for representing at least one of the physical edges of the group of objects by including the first candidate edge in the selected subset of candidate edges; and outputting a robot interaction movement command, wherein the robot interaction movement command is for robot interaction between the robot and at least one object of the group of objects, and is generated based on the selected subset of candidate edges, wherein the at least one processing circuit is configured to determine that the image information satisfies the defined darkness condition at the first candidate edge in response to a determination that the first image region satisfies at least one of a defined darkness threshold criterion or a defined spiked intensity profile criterion, wherein the at least one processing circuit is configured to determine whether the first image region satisfies the defined darkness threshold criterion by determining whether the first image region has at least one portion which is darker in image intensity than a defined darkness threshold, and wherein the at least one processing circuit is configured to determine whether the first image region satisfies the spiked intensity profile criterion by determining whether the first image region has an image intensity profile which includes: (i) a first profile portion in which image intensity increases in darkness within the first image region as a function of location, to reach a peak level of darkness at a location within the first image region, followed by (ii) a second profile portion in which image intensity decreases in darkness within the first image region, away from the peak level of darkness, as a function of location.

2. The computing system of claim 1, wherein the first image region is a first pixel region that forms a band of pixels which represents a physical gap between a first object and a second object of the group of objects, wherein the second image region is a second pixel region immediately adjacent to the first pixel region, such that the border which forms the first candidate edge is between the first pixel region and the second pixel region.

3. The computing system of claim 2, wherein the at least one processing circuit is configured to determine whether the first image region satisfies the defined darkness threshold criterion by determining whether the first image region has pixel intensity values that are less than the defined darkness threshold.

4. The computing system of claim 2, wherein the image intensity profile of the first image region describes respective pixel intensity values for a series of pixels extending across a width dimension of the first image region, and wherein the at least one processing circuit is configured to determine whether the first image region satisfies the spiked intensity profile criterion by determining whether the image intensity profile has a shape in which the respective pixel intensity values decrease toward a minimum pixel intensity value in the first image region, and then switches to increase away from the minimum pixel intensity value, wherein the minimum pixel intensity value is associated with the peak level of darkness in the first image region.

5. The computing system of claim 1, wherein the at least one processing circuit is configured to determine that the first image region satisfies the defined darkness condition only in response to a determination that the first image region satisfies the spiked intensity profile criterion.

6. The computing system of claim 1, wherein the at least one processing circuit is configured to determine that the first image region satisfies the defined darkness condition only in response to a determination that the first image region satisfies the defined darkness threshold criterion.

7. The computing system of claim 1, wherein the at least one processing circuit is configured to determine that the first image region satisfies the defined darkness condition only in response to a determination that the first image region satisfies both the defined darkness threshold criterion and the defined spiked intensity profile criterion.

8. The computing system of claim 1, wherein the at least one processing circuit is configured to identify the first candidate edge, which is formed based on the border between the first image region and the second image region, based on the 2D image information, wherein the 3D image information includes depth information for locations in the camera field of view.

9. The computing system of claim 8, wherein the at least one processing circuit is configured to perform the determining of whether to retain the first candidate edge as a candidate for representing at least one of the physical edges of the group of objects when: (i) the 3D image information is missing depth information for one or more locations corresponding to the first candidate edge, or (ii) a portion of the 3D image information that corresponds to the first candidate edge is affected by a level of imaging noise which is greater than a defined noise tolerance threshold.

10. The computing system of claim 8, wherein the at least one processing circuit is configured to perform the determining of whether to retain the first candidate edge as a candidate for representing at least one of the physical edges of the group of objects when: the 3D image information does not satisfy a defined depth discontinuity condition at one or more locations corresponding to the first candidate edge.

11. The computing system of claim 10, wherein the at least one processing circuit is configured to determine that the 3D image information does not satisfy the defined depth discontinuity condition at one or more locations corresponding to the first candidate edge in response to a determination that the 3D image information does not describe a depth change at the one or more locations which exceeds a defined depth difference threshold.

12. The computing system of claim 8, wherein the at least one processing circuit is configured to identify a second candidate edge of the plurality of candidate edges based on the 3D image information.

13. The computing system of claim 12, wherein the at least one processing circuit is configured to identify the second candidate edge based on the 3D image information by:

identifying a first surface of the group of objects based on a first set of locations described by the 3D image information which have respective depth values that do not deviate from each other by more than a defined measurement variance threshold;

identifying a second surface of the group of objects based on a second set of locations described by the 3D image information which have respective depth values that are within the defined measurement variance threshold;

determining, as a first average depth value, an average depth value associated with the first surface;

determining, as a second average depth value, an average depth value associated with the second surface;

identifying, in response to a determination that a difference between the first average depth value and the second average depth value exceeds a defined depth difference threshold, the second candidate edge based on a location at which there is a transition between the first surface and the second surface.

14. The computing system of claim 12, wherein the at least one processing circuit is configured to identify the second candidate edge based on the 3D image information when the second candidate edge maps to a candidate edge which is in the 2D image information and which is formed based on a border between two image regions that do not satisfy the defined darkness condition.

15. The computing system of claim 1, wherein the at least one processing circuit is configured to perform an object recognition operation or object registration operation based on the selected subset of candidate edges, wherein the robot interaction movement command is generated based on a result of the object recognition operation or object registration operation.

16. The computing system of claim 1, wherein the at least one processing circuit is configured to selecting the subset of the plurality of candidate edges by determining which candidate edges to filter from the plurality of candidate edges, wherein the plurality of candidate edges, after being filtered, forms the subset of candidate edges.

17. A non-transitory computer-readable medium having instructions that, when executed by at least one processing circuit of a computing system, causes the at least one processing circuit to perform the following:

receiving image information by the at least one processing circuit of the computing system, the image information including 2D image information and 3D image information, wherein the computing system is configured to communicate with: (i) a robot, and (ii) a camera having a camera field of view, wherein the image information is for representing a group of objects in the camera field of view, and is generated by the camera;

identifying, from the image information, a plurality of candidate edges associated with the group of objects based on the 2D image information and the 3D image information, wherein the plurality of candidate edges are or include respective sets of image locations or physical locations that form respective candidates for representing physical edges of the group of objects;

determining, when the plurality of candidate edges include a first candidate edge which is formed based on a border between a first image region and a second image region, whether the image information satisfies a defined darkness condition at the first candidate edge, wherein the first image region is darker than the second image region, wherein the first image region and the second image region are respective regions described by the image information;

selecting a subset of the plurality of candidate edges to form a selected subset of candidate edges for representing the physical edges of the group of objects, wherein the selecting includes: determining, based on whether the image information satisfies the defined darkness condition at the first candidate edge, whether to retain the first candidate edge as a candidate for representing at least one of the physical edges of the group of objects by including the first candidate edge in the selected subset of candidate edges; and outputting a robot interaction movement command, wherein the robot interaction movement command is for robot interaction between the robot and at least one object of the group of objects, and is generated based on the selected subset of candidate edges, wherein the instructions cause the at least one processing circuit to determine that the image information satisfies the defined darkness condition at the first candidate edge in response to a determination that the first image region satisfies at least one of a defined darkness threshold criterion or a defined spiked intensity profile criterion, wherein the instructions cause the at least one processing circuit to determine whether the first image region satisfies the defined darkness threshold criterion by determining whether the first image region has at least one portion which is darker in image intensity than a defined darkness threshold, and wherein the instructions cause the at least one processing circuit to determine whether the first image region satisfies the spiked intensity profile criterion by determining whether the first image region has an image intensity profile which includes: (i) a first profile portion in which image intensity increases in darkness within the first image region as a function of location, to reach a peak level of darkness at a location within the first image region, followed by (ii) a second profile portion in which image intensity decreases in darkness within the first image region, away from the peak level of darkness, as a function of location.

18. The non-transitory computer-readable medium of claim 17, wherein the first image region is a first pixel region that forms a band of pixels which represents a physical gap between a first object and a second object of the group of objects, wherein the second image region is a second pixel region immediately adjacent to the first pixel region, such that the border which forms the first candidate edge is between the first pixel region and the second pixel region.

19. The non-transitory computer-readable medium of claim 18, wherein the instructions cause the at least one processing circuit to determine whether the first image region satisfies the defined darkness threshold criterion by determining whether the first image region has one or more pixel intensity values that are less than the defined darkness threshold.

20. A method performed by a computing system, the method comprising:

receiving image information by the computing system, the image information including 2D image information and 3D image information, wherein the computing system is configured to communicate with: (i) a robot, and (ii) a camera having a camera field of view, wherein the image information is for representing a group of objects in the camera field of view, and is generated by the camera;

identifying, from the image information, a plurality of candidate edges associated with the group of objects based on the 2D image information and the 3D image information, wherein the plurality of candidate edges are or include respective sets of image locations or physical locations that form respective candidates for representing physical edges of the group of objects;

determining, when the plurality of candidate edges include a first candidate edge which is formed based on a border between a first image region and a second image region, whether the image information satisfies a defined darkness condition at the first candidate edge, wherein the first image region is darker than the second image region, wherein the first image region and the second image region are respective regions described by the image information;

selecting a subset of the plurality of candidate edges to form a selected subset of candidate edges for representing the physical edges of the group of objects, wherein the selecting includes: determining, based on whether the image information satisfies the defined darkness condition at the first candidate edge, whether to retain the first candidate edge as a candidate for representing at least one of the physical edges of the group of objects by including the first candidate edge in the selected subset of candidate edges; and outputting a robot interaction movement command, wherein the robot interaction movement command is for robot interaction between the robot and at least one object of the group of objects, and is generated based on the selected subset of candidate edges, wherein the image information satisfies the defined darkness condition at the first candidate edge when the first image region satisfies at least one of a defined darkness threshold criterion or a defined spiked intensity profile criterion, wherein the determining of whether the first image region satisfies the defined darkness threshold criterion is performed by determining whether the first image region has at least one portion which is darker in image intensity than a defined darkness threshold, and wherein the determining of whether the first image region satisfies the spiked intensity profile criterion is performed by determining whether the first image region has an image intensity profile which includes: (i) a first profile portion in which image intensity increases in darkness within the first image region as a function of location, to reach a peak level of darkness at a location within the first image region, followed by (ii) a second profile portion in which image intensity decreases in darkness within the first image region, away from the peak level of darkness, as a function of location.

* * * * *